United States Patent
Huang et al.

(10) Patent No.: US 10,581,512 B2
(45) Date of Patent: Mar. 3, 2020

(54) METHOD AND SYSTEM FOR REPLACING RELAY, D2D USER EQUIPMENT AND CONTROL NODE

(71) Applicant: ZTE CORPORATION, Shenzhen, Guangdong (CN)

(72) Inventors: Ying Huang, Shenzhen (CN); Lin Chen, Shenzhen (CN); Feng Xie, Shenzhen (CN)

(73) Assignee: ZTE CORPORATION (CN)

( * ) Notice: Subject to any disclaimer, the term of this patent is extended or adjusted under 35 U.S.C. 154(b) by 52 days.

(21) Appl. No.: 15/574,470

(22) PCT Filed: May 13, 2016

(86) PCT No.: PCT/CN2016/082076
§ 371 (c)(1),
(2) Date: Nov. 15, 2017

(87) PCT Pub. No.: WO2016/184370
PCT Pub. Date: Nov. 24, 2016

(65) Prior Publication Data
US 2018/0152234 A1      May 31, 2018

(30) Foreign Application Priority Data

May 15, 2015   (CN) .......................... 2015 1 0249223

(51) Int. Cl.
*H04B 7/155*        (2006.01)
*H04L 29/12*        (2006.01)
(Continued)

(52) U.S. Cl.
CPC ..... *H04B 7/15557* (2013.01); *H04B 7/15528* (2013.01); *H04L 61/2007* (2013.01);
(Continued)

(58) Field of Classification Search
CPC ................. H04B 7/2606; H04B 7/155; H04L 2001/0097; H04W 88/04; H04W 16/26
(Continued)

(56) References Cited

U.S. PATENT DOCUMENTS

2009/0029645 A1    1/2009   Leroudier
2013/0089023 A1    4/2013   Shin
(Continued)

FOREIGN PATENT DOCUMENTS

CN     101841824 A     9/2010
CN     102780993 A     11/2012
(Continued)

OTHER PUBLICATIONS

International Search Report in international application No. PCT/CN2016/082076, dated Jul. 21, 2016.
(Continued)

*Primary Examiner* — Gbemileke J Onamuti
*Assistant Examiner* — Sanjay K Dewan
(74) *Attorney, Agent, or Firm* — McDonald Hopkins LLC

(57) ABSTRACT

A method for replacing a relay, comprising: a first D2D UE receives D2D relay node replacement indication information transmitted by a control node; and the first D2D UE communicates, according to the D2D relay node replacement indication information, through a new D2D relay node. Also disclosed are another method and system for replacing a relay node, a D2D UE and a control node.

20 Claims, 16 Drawing Sheets

(51) Int. Cl.
*H04L 29/06* (2006.01)
*H04W 4/70* (2018.01)
*H04W 36/06* (2009.01)
*H04W 76/23* (2018.01)
*H04W 36/00* (2009.01)
*H04W 88/04* (2009.01)
*H04W 88/02* (2009.01)

(52) U.S. Cl.
CPC ............... *H04L 63/20* (2013.01); *H04W 4/70* (2018.02); *H04W 36/03* (2018.08); *H04W 36/06* (2013.01); *H04W 76/23* (2018.02); *H04W 88/02* (2013.01); *H04W 88/04* (2013.01)

(58) Field of Classification Search
USPC .......................................................... 370/315
See application file for complete search history.

(56) References Cited

U.S. PATENT DOCUMENTS

| | | | |
|---|---|---|---|
| 2014/0135019 A1 | 5/2014 | Jang | |
| 2015/0045033 A1* | 2/2015 | Kim | H04B 7/15507 455/436 |
| 2015/0230114 A1 | 8/2015 | Delsol et al. | |
| 2018/0092017 A1* | 3/2018 | Freda | H04W 76/14 |

FOREIGN PATENT DOCUMENTS

| | | | |
|---|---|---|---|
| CN | 103428789 A | 12/2013 | |
| CN | 103607750 A | 2/2014 | |
| CN | 104936247 A | 9/2015 | |
| CN | 105451282 A | 3/2016 | |
| EP | 2733988 A2 | 5/2014 | |
| JP | WO 2014/069064 A1 * | 5/2014 | ............ H04W 36/30 |
| JP | WO 2014/069064 A1 * | 8/2014 | ............ H04W 36/30 |
| WO | 2014069064 A1 | 5/2014 | |
| WO | 2015004142 A1 | 1/2015 | |

OTHER PUBLICATIONS

English Translation of the Written Opinion of the International Search Authority in international application No. PCT/CN2016/082076, dated Jul. 21, 2016.
Feng, Wenji, Key Technology Research on D2D Communications Based on LTE-Advanced, CDMD, Communication Technology Set, No. 4, Apr. 15, 2015 (Apr. 5, 2015) ISSN: 1674-0246, pp. 45-47.
Supplementary European Search Report in European application No. 16795857.8, dated Feb. 27, 2018.
ZTE: "Relay selection and reselection", 3GPP Draft; R2-152547—Relay Selection and Reselection, 3rd Generation Partnership Project (3GPP), Mobile Competence Centre ; 650, Route Des Lucioles ; F-06921 Sophia-Antipolis Cedex; France , vol. RAN WG2, No. Fukuoka, Japan; May 25, 2015-May 29, 2015 May 16, 2015 (May 16, 2015).

* cited by examiner

METHOD AND SYSTEM FOR REPLACING RELAY, D2D USER EQUIPMENT AND CONTROL NODE

TECHNICAL FIELD

The present disclosure relates, but is not limited, to wireless multimedia technology, and in particular to a method and system for replacing a relay, a Device-to-Device (D2D) User Equipment (UE) and a control node.

BACKGROUND

With development of wireless multimedia services, there is an increasing need for enhanced data rate and enhanced user experience are put forward, demanding more from capacity and coverage of a conventional cellular network system. On the other hand, popularity of applications, such as for social networking, short-distance data sharing, local advertising, etc., leads to an increasing need for knowledge of, and communication with, a nearby person or thing of interest (which may be referred to as a proximity service). A cell-based conventional cellular network can provide but limited support to an enhanced data rate as well as a proximity service. Birth of D2D technology, well in response to such needs, signals a replacement trend of future development of communication. Using D2D technology, traffic on a cellular network may be offloaded, battery power consumption at a UE may be reduced, data rate may be enhanced, and robustness of a network infrastructure may be improved, well meeting the needs for the enhanced data rate and the proximity service.

D2D technology may operate at an authorized or unauthorized frequency band, and allow multiple UE supporting D2D function (referred to as D2D UE) to perform direct discovery/direct communication with or without a network infrastructure. D2D communication applies mainly in three modes as follows.

1) In a mode 1 as shown in FIG. 1, a UE 1 and a UE 2 exchange data covered by a cellular network, where user-plane data go through no network infrastructure.

2) In a mode 2 as shown in FIG. 1, relayed transmission, for a UE4 with a poor signal in an area of weak or no coverage, allows the UE4 to communicate with a network via a nearby UE 3 covered by the network, which helps an operator in extending coverage and enhancing capacity.

3) In a mode 3 as shown in FIG. 1, direct inter-device communication is allowed, such as in case of a cellular network failure due to an earthquake or another emergency, where single-hop or multi-hop communication of both control-plane data and user plane data is performed among a UE5, a UE6 and a UE7, through no network infrastructure.

D2D technology generally involves D2D discovery and D2D communication. D2D discovery is for determining proximity of two or more D2D UE to each other (such as within a range of direct D2D communication), or for determining proximity of a first UE to a second UE. With D2D communication, part of or all communication data may be transmitted directly between two D2D UE without going through a network infrastructure.

In the modes 2 and 3 as shown in FIG. 1, D2D UE may serve as a relay, such that a remote D2D UE at the edge of, or outside, coverage of a cellular network may communicate with the cellular network via the relay UE, and two D2D UE may perform D2D communication with each other via the relay UE.

The inventor/inventors finds/find out that existing D2D technology is disadvantageous at least as follows.

When a condition of D2D UE and/or a relay D2D UE (that serves as a relay of the D2D UE) changes, such as in response to determining that the D2D UE and/or the relay D2D UE moves, the relay UE serving the D2D UE has to be replaced. There is no solution for replacing relay UE in relayed transmission of D2D communication, impacting smooth D2D communication of D2D UE through the relay UE.

SUMMARY

Below is an overview of a subject matter elaborated herein. The overview is not intended to limit the scope of the claims.

According to an embodiment herein, a method for replacing a relay includes:

receiving, by first Device-to-Device (D2D) User Equipment (UE), a relay replacing indication sent by a control node, the relay replacing indication instructing to replace a serving D2D relay; and performing, by the first D2D UE, communication via a replacement D2D relay according to the relay replacing indication.

The performing, by the first D2D UE, communication via a replacement D2D relay may include:

performing, by the first D2D UE, communication by accessing a cellular network via the replacement D2D relay; or performing, by the first D2D UE, D2D communication with second D2D UE via the replacement D2D relay, the second D2D UE being target D2D UE with which the first D2D UE is to communicate.

The method may further include: before the performing, by the first D2D UE, D2D communication with second D2D UE via the replacement D2D relay, sending, by the first D2D UE to the second D2D UE via the replacement D2D relay, information for relay update, for updating, by the second D2D UE, relay information maintained at the second D2D UE.

The information for relay update may include at least one of: information on an identification (ID) of the first D2D UE, information on an ID of the second D2D UE, information on an ID of the replacement D2D relay, and information on configuration for D2D communication between the second D2D UE and the replacement D2D relay.

The method may further include: before the receiving, by first Device-to-Device (D2D) User Equipment (UE), a relay replacing indication sent by a control node, sending, by the first D2D UE to the control node, D2D-relay-related information, for determining, by the control node, the replacement D2D relay.

The D2D-relay-related information may include at least one of:

information on a D2D relay discovered by the first D2D UE; a result of measuring, by the first D2D UE, a received D2D relay discovery message; information on a geolocation of the first D2D UE; information on an ID of the first D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on an ID of target D2D UE with which the first D2D UE is to communicate; information on a priority of the first D2D UE; information on a priority of the D2D communication group to which the first D2D UE belongs; information on a priority of a D2D communication service of the first D2D UE.

The method may further include: before the sending, by the first D2D UE to the control node, D2D-relay-related information, receiving, by the first D2D UE, information on relay discovery and/or measurement configuration sent by the control node for discovering, and/or performing measurement on, a candidate D2D relay; and determining, by the first D2D UE, the D2D-relay-related information according to the information on the relay discovery and/or measurement configuration.

The information on the relay discovery and/or measurement configuration may include at least one of:

information on a resource or a resource pool in a time domain and/or a frequency domain used by the candidate D2D relay for D2D discovery, and information on an identification (ID) of the candidate D2D relay.

The method may further include: before the sending, by the first D2D UE to the control node, D2D-relay-related information, receiving, by the first D2D UE, a relay-discovery trigger threshold sent by the control node, the relay-discovery trigger threshold applying to measurement by the first D2D UE on the serving D2D relay being accessed by the first D2D UE; and in response to determining a measurement on the serving D2D relay that is lower than the relay-discovery trigger threshold, starting, by the first D2D UE, D2D relay discovery.

The method may further include: after the receiving, by first D2D UE, a relay replacing indication, returning, by the first D2D UE to the control node, a relay replacing acknowledgement.

The method may further include:

receiving, by the first D2D UE via the replacement D2D relay, a relay update acknowledgement returned by the second D2D UE.

The relay update acknowledgement may include: information on an identification (ID) of the first D2D UE, information on an ID of the second D2D UE, and information on an ID of the replacement D2D relay.

The relay replacing indication may include at least one of: information on an identification (ID) of the first D2D UE; information on an ID of second D2D UE; information on an ID of the replacement D2D relay; information on configuration for D2D communication between the replacement D2D relay and the first D2D UE and/or the second D2D UE; a relay status indication; a relay suspending indication; a relay-connection releasing indication; and an Internet Protocol (IP) address allocated by the replacement D2D relay to the first D2D UE. The second D2D UE may be target D2D UE with which the first D2D UE is to communicate.

According to an embodiment herein, a method for replacing a relay includes:

sending, by a control node to first Device-to-Device (D2D) User Equipment (UE), a relay replacing indication, so that the first D2D UE performs communication via a replacement D2D relay according to the relay replacing indication.

The control node may include at least one of: a Base Station (BS), a D2D relay, a Proximity Service functional entity (ProSe function), a Proximity Service (ProSe) application server, and a D2D relay managing Network Element (NE).

The relay replacing indication may include at least one of: information on an identification (ID) of the first D2D UE; information on an ID of second D2D UE; information on an ID of the replacement D2D relay; information on configuration for D2D communication between the replacement D2D relay and the first D2D UE and/or the second D2D UE; a relay status indication; a relay suspending indication; a relay-connection releasing indication, etc. The second D2D UE may be target D2D UE with which the first D2D UE is to communicate.

The method may further include: before the sending, by a control node to first Device-to-Device (D2D) User Equipment (UE), a relay replacing indication, determining, by the control node according to D2D-relay-related information, the replacement D2D relay; and/or determining, by the control node, that the first D2D UE is allowed to perform D2D communication relayed by the replacement D2D relay.

The method may further include: before the determining, by the control node according to D2D-relay-related information, the replacement D2D relay, receiving, by the control node, the D2D-relay-related information sent by the first D2D UE.

The D2D-relay-related information may include at least one of:

information on a D2D relay discovered by the first D2D UE; a result of measuring, by the first D2D UE, a received D2D relay discovery message; information on a geolocation of the first D2D UE; information on an ID of the first D2D UE; information on Quality of Service (QoS) required by a communication service of the first D2D UE; information on D2D security capability of the first D2D UE; information on a D2D-security-related parameter of the first D2D UE; information on an D of a D2D communication group to which the first D2D UE belongs; a D2D relay type requested by the first D2D UE; information on an ID of target D2D UE with which the first D2D UE is to communicate; information on a priority of the first D2D UE; information on a priority of the D2D communication group to which the first D2D UE belongs; information on a priority of a D2D communication service of the first D2D UE.

The method may further include: before the receiving, by the control node, the D2D-relay-related information sent by the first D2D UE, sending, by the control node to the first D2D UE, information on relay discovery and/or measurement configuration for discovering, and/or performing measurement on, a candidate D2D relay, such that the first D2D UE determines the D2D-relay-related information according to the information on the relay discovery and/or measurement configuration.

The sending, by the control node to the first D2D UE, information on relay discovery and/or measurement configuration may include:

sending, by the control node to the first D2D UE, the information on the relay discovery and/or measurement configuration via an interface-Uu system message, Radio Resource Control (RRC) dedicated signaling, and/or a PC5 interface.

The information on the relay discovery and/or measurement configuration may include at least one of:

information on a resource or a resource pool in a time domain and/or a frequency domain used by the candidate D2D relay for D2D discovery, and information on an identification (ID) of the candidate D2D relay.

The method may further include: before the receiving, by the control node, the D2D-relay-related information sent by the first D2D UE, sending, by the control node to the first D2D UE, a relay-discovery trigger threshold applying to measurement by the first D2D UE on the serving D2D relay being accessed by the first D2D UE, such that the first D2D UE starts D2D relay discovery according to the relay-discovery trigger threshold.

The determining, by the control node, that the first D2D UE is allowed to perform D2D communication relayed by the replacement D2D relay may include:

determining, by the control node, that the first D2D UE is to perform D2D communication relayed by the replacement D2D relay, by interacting with the replacement D2D relay, or by interacting with a central control node and the replacement D2D relay.

The determining that the first D2D UE is to perform D2D communication relayed by the replacement D2D relay by interacting with the replacement D2D relay may include:

sending, by the control node to the replacement D2D relay, a relay access request; and receiving, by the control node, a relay access response returned by the replacement D2D relay indicating that the replacement D2D relay allows the first D2D UE to perform D2D communication relayed by the replacement D2D relay.

The relay access response may include an Internet Protocol (IP) address allocated by the replacement D2D relay to the first D2D UE.

The determining, by the control node, that the first D2D UE is to perform D2D communication relayed by the replacement D2D relay by interacting with the central control node and the replacement D2D relay may include:

sending, by the control node to the central control node, a relay access request; and receiving, by the control node, a relay access response sent by the central control node.

The replacement D2D relay may receive a relay access request sent by the central control node. The replacement D2D relay may determine that the replacement D2D relay allows the first D2D UE to perform D2D communication relayed by the replacement D2D relay. The replacement D2D relay may return the relay access response to the central control node.

The relay access response may include an Internet Protocol (IP) address allocated by the replacement D2D relay to the first D2D UE.

The relay access request may include at least one of:

information on an identification (ID) of the first D2D UE; information on an ID, or a list of IDs, of a second D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on a priority of the first D2D UE; information on a priority of the D2D communication group to which the first D2D UE belongs; information on a priority of a D2D communication service of the first D2D UE; and information on configuration for D2D communication between the replacement D2D relay and the first D2D UE. The second D2D UE may be target D2D UE with which the first D2D UE is to communicate.

The information on the configuration for D2D communication may include at least one of: information on configuration of a bearer of the D2D communication between the replacement D2D relay and the first D2D UE, and information on security related configuration.

The D2D relay type may be UE-to-UE relay or UE-to-Network relay.

The relay access response may include at least one of:

information on an identification (ID) of the first D2D UE, information on an ID of a second D2D UE accessible via the replacement D2D relay, and information on configuration for D2D communication between the first D2D UE and the replacement D2D relay.

The method may further include: after the sending, by a control node to first Device-to-Device (D2D) User Equipment (UE), a relay replacing indication, receiving, by the control node, a relay replacing acknowledgement returned by the first D2D UE.

The method may further include:

sending, by the control node to the second D2D UE, information for relay update, for updating, by the second D2D UE, relay information maintained at the second D2D UE. The second D2D UE may be target D2D UE with which the first D2D UE is to communicate.

The information for relay update may include at least one of: information on an identification (ID) of the first D2D UE, information on an ID of the second D2D UE, information on an ID of the replacement D2D relay, and information on configuration for D2D communication between the second D2D UE and the replacement D2D relay.

According to an embodiment herein, Device-to-Device (D2D) User Equipment (UE) includes a receiving module and a communicating module.

The receiving module is arranged for: receiving a relay replacing indication sent by a control node instructing to replace a serving D2D relay, The communicating module is arranged for: performing communication via a replacement D2D relay according to the relay replacing indication.

The communicating module may be arranged for:

performing communication by accessing a cellular network via the replacement D2D relay, or performing D2D communication with second D2D UE via the replacement D2D relay, the second D2D UE being target D2D UE with which the D2D UE is to communicate.

The communicating module may be further arranged for: before performing D2D communication with the second D2D UE via the replacement D2D relay, sending, to the second D2D UE via the replacement D2D relay, information for relay update, such that the second D2D UE may update relay information maintained at the second D2D UE accordingly.

The D2D UE may further include a sending module arranged for: sending, to the control node, D2D-relay-related information, for determining, by the control node, the replacement D2D relay.

The receiving module may be further arranged for: before the D2D-relay-related information is sent to the control node, receiving information on relay discovery and/or measurement configuration sent by the control node for discovering, and/or performing measurement on, a candidate D2D relay, The sending module may be further arranged for: determining the D2D-relay-related information according to the information on the relay discovery and/or measurement configuration.

The D2D UE may further include a discovering module.

The receiving module may be further arranged for: before the D2D-relay-related information is sent to the control node, receiving a relay-discovery trigger threshold sent by the control node. The relay-discovery trigger threshold may apply to measurement by the D2D UE on the serving D2D relay being accessed by the D2D UE.

The discovering module may be arranged for: in response to determining a measurement on the serving D2D relay that is lower than the relay-discovery trigger threshold, starting D2D relay discovery.

The sending module may be further arranged for: after the relay replacing indication is received, returning, to the control node, a relay replacing acknowledgement.

The receiving module may be further arranged for: receiving, via the replacement D2D relay, a relay update acknowledgement returned by the second D2D UE.

According to an embodiment herein, a control node includes a storing unit and a sending unit.

The storing unit is arranged for storing a relay replacing indication.

The sending unit is arranged for: sending, to first Device-to-Device (D2D) User Equipment (UE), the relay replacing indication, so that the first D2D UE performs communication via a replacement D2D relay according to the relay replacing indication.

The control node may further include a determining unit arranged for:

determining, according to D2D-relay-related information, the replacement D2D relay; and/or determining that the first D2D UE is allowed to perform D2D communication relayed by the replacement D2D relay.

The control node may further include a receiving unit arranged for: before the replacement D2D relay is determined, receiving the D2D-relay-related information sent by the first D2D UE.

The sending unit may be further arranged for: before the D2D-relay-related information sent by the first D2D UE is received, sending, to the first D2D UE, information on relay discovery and/or measurement configuration for discovering, and/or performing measurement on, a candidate D2D relay, such that the first D2D UE may determine the D2D-relay-related information according to the information on the relay discovery and/or measurement configuration.

The sending unit may be further arranged for: before the D2D-relay-related information sent by the first D2D UE is received, sending, to the first D2D UE, a relay-discovery trigger threshold, which may apply to measurement by the first D2D UE on the serving D2D relay being accessed by the first D2D UE, such that the first D2D UE may start D2D relay discovery according to the relay-discovery trigger threshold.

The receiving unit may be further arranged for: after the relay replacing indication is sent, receiving a relay replacing acknowledgement returned by the first D2D UE.

The sending unit may be further arranged for: sending, to the second D2D UE, information for relay update, such that the second D2D UE may update relay information maintained at the second D2D UE. The second D2D UE may be target D2D UE with which the first D2D UE is to communicate.

According to an embodiment herein, a system for replacing a relay includes a control node, first Device-to-Device (D2D) User Equipment (UE), and a replacement D2D relay.

The control node is arranged for sending, to the first D2D UE, a relay replacing indication.

The first D2D UE is arranged for: receiving the relay replacing indication sent by the control node; and performing communication via the replacement D2D relay according to the relay replacing indication.

The control node may be further arranged for: before sending the relay replacing indication to the first D2D UE, determining, according to D2D-relay-related information, the replacement D2D relay; and/or determining that the first D2D UE is allowed to perform D2D communication relayed by the replacement D2D relay.

The control node may be further arranged for: before determining the replacement D2D relay, receiving the D2D-relay-related information sent by the first D2D UE.

The control node may be further arranged for: before receiving the D2D-relay-related information sent by the first D2D UE, sending, to the first D2D UE, information on relay discovery and/or measurement configuration for discovering, and/or performing measurement on, a candidate D2D relay.

The first D2D UE is further arranged for: determining the D2D-relay-related information according to the information on the relay discovery and/or measurement configuration.

The control node may be further arranged for: before receiving the D2D-relay-related information sent by the first D2D UE, sending, to the first D2D UE, a relay-discovery trigger threshold, which may apply to measurement by the first D2D UE on the serving D2D relay being accessed by the first D2D UE.

The first D2D UE may be further arranged for: in response to determining a measurement on the serving D2D relay that is lower than the relay-discovery trigger threshold, starting D2D relay discovery.

The control node may be arranged for: determining that the first D2D UE is to perform D2D communication relayed by the replacement D2D relay by interacting with the replacement D2D relay.

The system may further include a central control node.

The control node may be arranged for: determining that the first D2D UE is to perform D2D communication relayed by the replacement D2D relay by interacting with the central control node and the replacement D2D relay.

The central control node may be a D2D relay. The central control node may be arranged for acquiring information related to a D2D relay near the central control node.

The central control node may be arranged for: acquiring information related to a relay near the central control node by monitoring a relay discovery message or broadcast information, or acquiring, from a relay, information related to the relay.

The first D2D UE may be further arranged for, having received the relay replacing indication, returning, to the control node, a relay replacing acknowledgement.

The control node may be further arranged for receiving the relay replacing acknowledgement.

The first D2D UE may be arranged for performing communication by accessing a cellular network via the replacement D2D relay.

The system may further include second D2D UE.

The first D2D UE may be arranged for performing D2D communication with the second D2D UE via the replacement D2D relay. The second D2D UE may be target D2D UE with which the first D2D UE is to communicate.

The first D2D UE may be further arranged for: before performing D2D communication with the second D2D UE via the replacement D2D relay, sending, to the second D2D UE via the replacement D2D relay, information for relay update.

The second D2D UE may be further arranged for updating relay information maintained at the second D2D UE according to the information for relay update.

The system may further include second D2D UE. The second D2D UE may be target D2D UE with which the first D2D UE is to communicate.

The control node may be further arranged for sending, to the second D2D UE, information for relay update.

The second D2D UE may be arranged for updating relay information maintained at the second D2D UE according to the information for relay update.

The replacement D2D relay may be further arranged for sending information for relay update to the second D2D UE.

The second D2D UE may be arranged for updating relay information maintained at the second D2D UE according to the information for relay update.

The second D2D UE may be further arranged for, having received information for relay update, returning, to the replacement D2D relay, a relay update acknowledgement.

The system may further include a serving D2D relay arranged for: in response to determining that the first D2D UE performs communication via the replacement D2D relay, releasing a connection with the first D2D UE.

The serving D2D relay may be arranged for releasing the connection with the first D2D UE upon expiration of a timing period of a timer maintained at the serving D2D relay, or upon receiving information on a relay-connection releasing indication sent by the first D2D UE or the control node.

The serving D2D relay may be further arranged for starting or restarting the timer upon receiving D2D communication data sent by the first D2D UE or upon sending D2D communication data to the first D2D UE.

The information on the relay-connection releasing indication may include at least one of: a release indication, information on an identification (ID) of the first D2D UE, information on an ID of second D2D UE, and a cause of release.

The second D2D UE may be target D2D UE with which the first D2D UE is to communicate.

The control node may be further arranged for: before sending the information on the relay-connection releasing indication to the serving D2D relay, receiving a relay replacing acknowledgement sent by the first D2D UE, or receiving an indication of access by the first D2D UE sent by the replacement D2D relay.

According to an embodiment herein, a computer-readable storage medium has stored therein instructions that when executed by a processor, cause the processor to perform an aforementioned method for replacing a relay.

With embodiments herein, a control node sends, to first D2D UE, a relay replacing indication instructing to replace a serving D2D relay. The first D2D UE receives the relay replacing indication sent by the control node. The first D2D UE performs communication via a replacement D2D relay according to the relay replacing indication. Accordingly, a serving relay for D2D UE in relayed transmission of D2D communication is replaced in time, allowing the D2D UE to access a proper replacement relay in time, ensuring smooth D2D communication.

Additional features and advantages of embodiments herein will be set forth, and part of them will be readily seen or understood via detailed description below. Other beneficial effect and/or advantages herein will be implemented and acquired using structures specified in the specification, claims, figures herein.

Other aspects herein may be understood upon reading and appreciating the drawings and the detailed description.

BRIEF DESCRIPTION OF THE DRAWINGS

A drawing illustrated herein is provided for further understanding of an embodiment herein, and forms a part of the present disclosure. An illustrative embodiment herein and description thereof are for explaining the present disclosure, and may not form improper limitations to the present disclosure.

DETAILED DESCRIPTION

To clearly show a technical problem to be solved, a technical solution, and beneficial effects of the present disclosure, the present disclosure is further elaborated below with reference to the drawings and embodiments. Note that embodiments herein and features thereof can be combined with each other as long as no conflict results from the combination.

Figure 1:
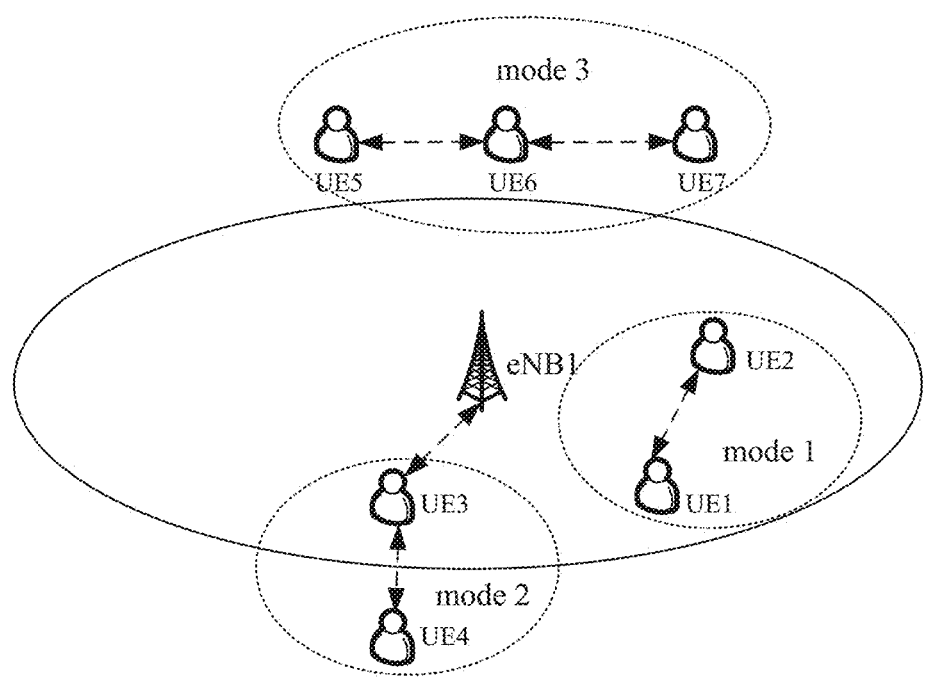
FIG. 1 is a diagram of modes in which D2D technology may apply.
Figure 2:
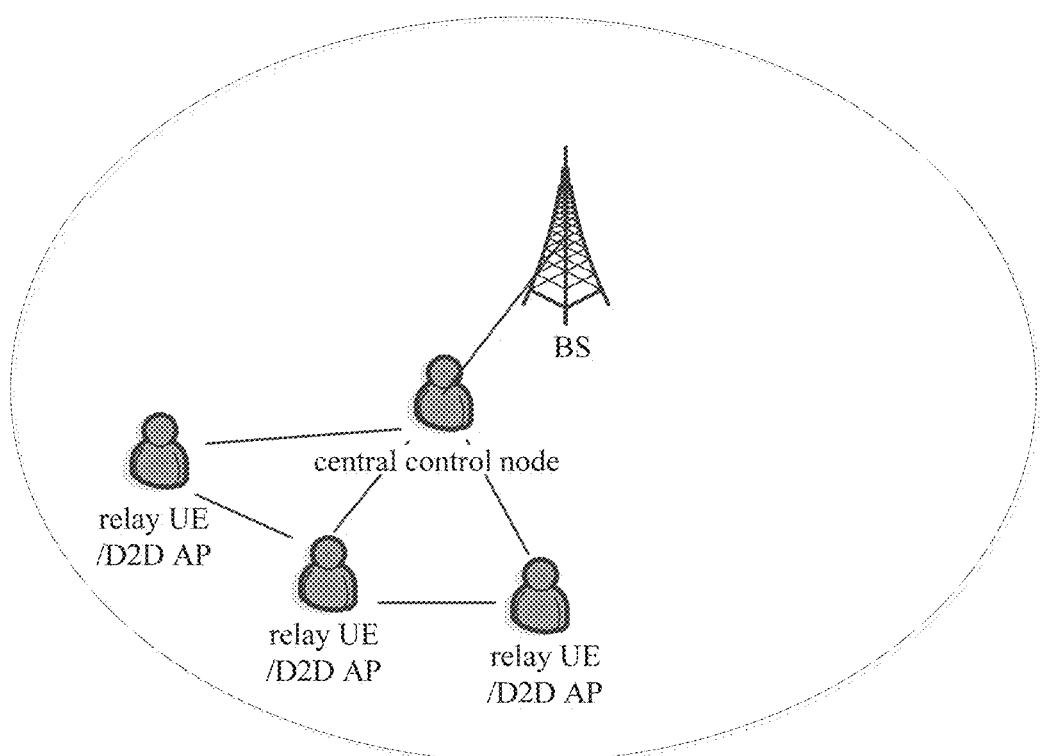
FIG. 2 is a diagram of D2D relay, with existence of a central control node, according to an embodiment herein.

Note that in an embodiment herein, a relay may be referred to as relay UE or a D2D Access Point (AP), DP for short. A relay may forward D2D and/or cellular communication data of D2D UE. A relay UE may serve as a central control node (referred to as a DP head) that takes on some control and/or management. FIG. 2 is a diagram of D2D relay, with existence of a central control node, according to an embodiment herein. As shown in FIG. 2, a D2D relay, which may be referred to as relay UE or a D2D AP, may be connected to the central control node via a PC5 interface. A D2D relay may be connected to and interact with another D2D relay also via a PC5 interface. The central control node may be connected to a Base Station (BS) via an air interface. The central control node as well as a D2D relay may be located outside coverage of a BS. In this case, a D2D relay may as well be connected to a central control node or another D2D relay near the D2D relay via a PC5 interface. A central control node may acquire relay-related information related to a nearby relay covered by the central control node. The relay-related information related to a relay may include a relay type of the relay, a relay status of the relay, information on a geolocation of the relay, D2D UE connected to the relay, and information on a load of the relay. A central control node may acquire relay-related information corresponding to a relay near the central control node by monitoring a relay discovery message or broadcast information. A central control node may acquire, from a relay, relay-related information corresponding to the relay via a PC5 interface.

In embodiments herein, a control node sends, to first D2D UE, a relay replacing indication instructing to replace a serving D2D relay. The first D2D UE receives the relay replacing indication sent by the control node. The first D2D UE performs communication via the replacement D2D relay according to the relay replacing indication.

A control node may be a Base Station (BS), a D2D relay, a Proximity Service functional entity (ProSe function), a Proximity Service (ProSe) application server, a D2D relay managing Network Element (NE), etc.

Embodiment 1

According to an embodiment herein, a method for replacing a relay applies at first D2D UE, and includes the step(s) as follows.

First D2D UE receives a relay replacing indication sent by a control node. The relay replacing indication instructs to replace a serving D2D relay.

The first D2D UE performs communication via a replacement D2D relay according to the relay replacing indication.

A control node may be a Base Station (BS), a D2D relay, a Proximity Service functional entity (ProSe function), a Proximity Service (ProSe) application server, a D2D relay managing Network Element (NE), etc.

The relay replacing indication may include at least one of: information on an identification (ID) of the first D2D UE; information on an ID of second D2D UE; information on an ID of the replacement D2D relay; information on configuration for D2D communication between the replacement D2D relay and the first D2D UE and/or the second D2D UE; a relay status indication; a relay suspending indication; a relay-connection releasing indication; and an Internet Protocol (IP) address allocated by the replacement D2D relay to the first D2D UE. The second D2D UE may be target D2D UE with which the first D2D UE is to communicate.

The first D2D UE may perform communication via the replacement D2D relay as follows.

The first D2D UE may perform communication by accessing a cellular network via the replacement D2D relay.

The first D2D UE may perform D2D communication with second D2D UE via the replacement D2D relay.

Before the first D2D UE performs D2D communication with the second D2D UE via the replacement D2D relay, the first D2D UE may send, to the second D2D UE via the replacement D2D relay, information for relay update. The second D2D UE may update relay information maintained at the second D2D UE according to the information for relay update.

The control node may send, to the second D2D UE, information for relay update. The second D2D UE may update relay information maintained at the second D2D UE according to the information for relay update.

The replacement D2D relay may send information for relay update to the target D2D UE. The second D2D UE may update relay information maintained at the second D2D UE according to the information for relay update.

The information for relay update may include at least one of: information on an identification (ID) of the first D2D UE, information on an ID of the second D2D UE, information on an ID of the replacement D2D relay, and information on configuration for D2D communication between the second D2D UE and the replacement D2D relay.

The second D2D UE may receive the information for relay update. The second D2D UE may then return a relay update acknowledgement to the first D2D UE via the replacement D2D relay. The first D2D UE may receive, via the replacement D2D relay, the relay update acknowledgement returned by the second D2D UE.

The information for relay update may include information on at least one of: the ID of the first D2D UE, the ID of the second D2D UE, the ID of the replacement D2D relay, etc.

After receiving the information for relay update, the second D2D UE may perform D2D communication with the first D2D UE via the replacement D2D relay.

Before receiving the relay replacing indication sent by the control node, the first D2D UE may send, to the control node, D2D-relay-related information. The control node may determine the replacement D2D relay according to the D2D-relay-related information.

The D2D-relay-related information may be a result of D2D relay discovery or information measured for a D2D relay.

The D2D-relay-related information may include at least one of:

information on a D2D relay discovered by the first D2D UE; a result of measuring, by the first D2D UE, a received D2D relay discovery message; information on a geolocation of the first D2D UE; information on an ID of the first D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on an ID of target D2D UE with which the first D2D UE is to communicate; information on a priority of the first D2D UE; information on a priority of the D2D communication group to which the first D2D UE belongs; information on a priority of a D2D communication service of the first D2D UE.

Before sending, to the control node, D2D-relay-related information, the first D2D UE may receive information on relay discovery and/or measurement configuration sent by the control node for discovering, and/or performing measurement on, a candidate D2D relay.

The first D2D UE may determine the D2D-relay-related information according to the information on the relay discovery and/or measurement configuration.

After receiving the relay replacing indication, the first D2D UE may return, to the control node, a relay replacing acknowledgement.

The information on the relay discovery and/or measurement configuration may include at least one of: information on a resource or a resource pool in a time domain and/or a frequency domain used by the candidate D2D relay for D2D discovery, and information on an identification (ID) of the candidate D2D relay.

Before sending, to the control node, the D2D-relay-related information, the first D2D UE may receive a relay-discovery trigger threshold sent by the control node. The relay-discovery trigger threshold may apply to measurement by the first D2D UE on the serving D2D relay being accessed by the first D2D UE.

When a measurement on the serving D2D relay is lower than the relay-discovery trigger threshold, the first D2D UE may start D2D relay discovery.

According to an embodiment herein, a method for replacing a relay applies at a control node, and includes the step(s) as follows.

The control node sends, to first D2D UE, a relay replacing indication, so that the first D2D UE performs communication via a replacement D2D relay according to the relay replacing indication.

A control node may be a Base Station (BS), a D2D relay, a Proximity Service functional entity (ProSe function), a Proximity Service (ProSe) application server, a D2D relay managing Network Element (NE), etc.

The relay replacing indication may include at least one of: information on an identification (ID) of the first D2D UE; information on an ID of second D2D UE; information on an ID of the replacement D2D relay; information on configuration for D2D communication between the replacement D2D relay and the first D2D UE and/or the second D2D UE; a relay status indication; a relay suspending indication; a relay-connection releasing indication; and an Internet Protocol (IP) address allocated by the replacement D2D relay to the first D2D UE. The second D2D UE may be target D2D UE with which the first D2D UE is to communicate.

Before sending, to the first D2D UE, the relay replacing indication, the control node may determine, according to D2D-relay-related information, the replacement D2D relay.

The control node may determine that the first D2D UE is allowed to perform D2D communication relayed by the replacement D2D relay.

Before determining the replacement D2D relay, the control node may receive the D2D-relay-related information sent by the first D2D UE.

The D2D-relay-related information may be a result of D2D relay discovery or information measured for a D2D relay.

The D2D-relay-related information may include at least one of:
information on a D2D relay discovered by the first D2D UE; a result of measuring, by the first D2D UE, a received D2D relay discovery message; information on a geolocation of the first D2D UE; information on an ID of the first D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on an ID of second D2D UE; information on a priority of the first D2D UE; information on a priority of the D2D communication group to which the first D2D UE belongs; information on a priority of a D2D communication service of the first D2D UE.

The first D2D UE may discover the information on the D2D relay according to a received D2D relay discovery message.

Before receiving the D2D-relay-related information sent by the first D2D UE, the control node may send, to the first D2D UE, information on relay discovery and/or measurement configuration for discovering, and/or performing measurement on, a candidate D2D relay, such that the first D2D UE may determine the D2D-relay-related information according to the information on the relay discovery and/or measurement configuration.

The information on the relay discovery and/or measurement configuration may include at least one of:
information on a resource or a resource pool in a time domain and/or a frequency domain used by the candidate D2D relay for D2D discovery, and information on an identification (ID) of the candidate D2D relay.

The control node may send, to the first D2D UE, the information on the relay discovery and/or measurement configuration via an interface-Uu system message, Radio Resource Control (RRC) dedicated signaling, a PC5 interface, etc.

Before receiving the D2D-relay-related information sent by the first D2D UE, the control node may send, to the first D2D UE, a relay-discovery trigger threshold. The relay-discovery trigger threshold may apply to measurement by the first D2D UE on the serving D2D relay being accessed by the first D2D UE. The first D2D UE may start D2D relay discovery according to the relay-discovery trigger threshold.

The control node may determine that the first D2D UE is allowed to perform D2D communication relayed by the replacement D2D relay as follows.

The control node may determine that the first D2D UE may perform D2D communication relayed by the replacement D2D relay, by interacting with the replacement D2D relay, or by interacting with a central control node and the replacement D2D relay.

The control node may send, to the second D2D UE, information for relay update, such that the second D2D UE may update relay information maintained at the second D2D UE according to the information for relay update.

The information for relay update may include at least one of: information on an identification (ID) of the first D2D UE, information on an ID of the second D2D UE, information on an ID of the replacement D2D relay, and information on configuration for D2D communication between the second D2D UE and the replacement D2D relay.

A D2D relay may serve as the central control node, to acquire relay-related information related to a D2D relay near the central control node. The relay-related information related to a relay may include a relay type of the relay, a relay status of the relay, information on a geolocation of the relay, D2D UE connected to the relay, and information on a load of the relay. The central control node may acquire relay-related information related to a relay near the central control node by monitoring a relay discovery message or broadcast information. The central control node may acquire, from a relay, relay-related information related to the relay.

The control node may determine that the first D2D UE may perform D2D communication relayed by the replacement D2D relay by interacting with the replacement D2D relay as follows.

The control node may send, to the replacement D2D relay, a relay access request.

The control node may receive a relay access response returned by the replacement D2D relay indicating that the replacement D2D relay allows the first D2D UE to perform D2D communication relayed by the replacement D2D relay.

The relay access response may include an Internet Protocol (IP) address allocated by the replacement D2D relay to the first D2D UE.

The control node may determine that the first D2D UE may perform D2D communication relayed by the replacement D2D relay by interacting with the central control node and the replacement D2D relay as follows.

The control node may send, to the central control node, a relay access request.

The control node may receive a relay access response sent by the central control node.

The replacement D2D relay may receive a relay access request sent by the central control node. The replacement D2D relay may determine that the replacement D2D relay allows the first D2D UE to perform D2D communication relayed by the replacement D2D relay. The replacement D2D relay may return the relay access response to the central control node.

The relay access request may include at least one of:
information on an identification (ID) of the first D2D UE; information on an ID, or a list of IDs, of a second D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on a priority of the first D2D UE; information on a priority of the D2D communication group to which the first D2D UE belongs; information on a priority of a D2D communication service of the first D2D UE; and information on configuration for D2D communication between the replacement D2D relay and the first D2D UE.

The information on the configuration for D2D communication may include at least one of: information on configuration of a bearer of the D2D communication between the replacement D2D relay and the first D2D UE, and information on security related configuration.

The relay access response may include an Internet Protocol (IP) address allocated by the replacement D2D relay to the first D2D UE.

The relay access response may include at least one of:
information on an identification (ID) of the first D2D UE, information on an ID, or a list of IDs, of target D2D UE accessible via the replacement D2D relay, and information on configuration for D2D communication between the first D2D UE and the replacement D2D relay.

The D2D relay type may be UE-to-UE relay or UE-to-Network relay.

After sending the relay replacing indication, the control node may receive a relay replacing acknowledgement returned by the first D2D UE.

Figure 3:
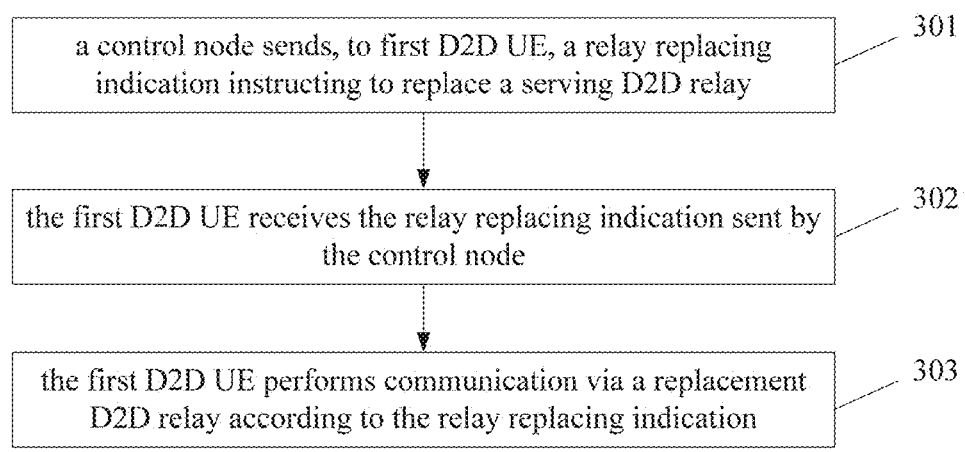
FIG. 3 is a flowchart of a method for replacing a relay according to an Embodiment 1 herein.

According to an embodiment herein, a method for replacing a relay which, as shown in FIG. 3, includes the step(s) as follows.

In step 301, a control node sends, to first D2D UE, a relay replacing indication instructing to replace a serving D2D relay.

The control node may be a Base Station (BS), a D2D relay, a Proximity Service functional entity (ProSe function), a Proximity Service (ProSe) application server, a D2D relay managing Network Element (NE), etc.

The relay replacing indication may include at least one of: information on an identification (ID) of the first D2D UE; information on an ID of second D2D UE; information on an ID of the replacement D2D relay; information on configuration for D2D communication between the replacement D2D relay and the first D2D UE and/or the second D2D UE; a relay status indication; a relay suspending indication; a relay-connection releasing indication; and an Internet Protocol (IP) address allocated by the replacement D2D relay to the first D2D UE. The second D2D UE may be target D2D UE with which the first D2D UE is to communicate.

Before sending, to the first D2D UE, the relay replacing indication, the control node may determine, according to D2D-relay-related information, the replacement D2D relay.

The control node may determine that the first D2D UE is allowed to perform D2D communication relayed by the replacement D2D relay.

Before determining the replacement D2D relay, the control node may receive the D2D-relay-related information sent by the first D2D UE.

The D2D-relay-related information may be a result of D2D relay discovery or information measured for a D2D relay.

The D2D-relay-related information may include at least one of:
information on a D2D relay discovered by the first D2D UE; a result of measuring, by the first D2D UE, a received D2D relay discovery message; information on a geolocation of the first D2D UE; information on an ID of the first D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on an ID of second D2D UE; information on a priority of the first D2D UE; information on a priority of the D2D communication group to which the first D2D UE belongs; information on a priority of a D2D communication service of the first D2D UE.

The first D2D UE may discover the information on the D2D relay according to a received D2D relay discovery message.

Before receiving the D2D-relay-related information sent by the first D2D UE, the control node may send, to the first D2D UE, information on relay discovery and/or measurement configuration for discovering, and/or performing measurement on, a candidate D2D relay.

The first D2D UE may determine the D2D-relay-related information according to the information on the relay discovery and/or measurement configuration.

The information on the relay discovery and/or measurement configuration may include at least one of:
information on a resource or a resource pool in a time domain and/or a frequency domain used by the candidate D2D relay for D2D discovery, and information on an identification (ID) of the candidate D2D relay.

The control node may send, to the first D2D UE, the information on the relay discovery and/or measurement configuration via an interface-Uu system message, Radio Resource Control (RRC) dedicated signaling, a PC5 interface, etc.

Before receiving the D2D-relay-related information sent by the first D2D UE, the control node may send, to the first D2D UE, a relay-discovery trigger threshold. The relay-discovery trigger threshold may apply to measurement by the first D2D UE on the serving D2D relay being accessed by the first D2D UE.

When a measurement on the serving D2D relay is lower than the relay-discovery trigger threshold, the first D2D UE may start D2D relay discovery.

The control node may determine that the first D2D UE is allowed to perform D2D communication relayed by the replacement D2D relay as follows.

The control node may determine that the first D2D UE may perform D2D communication relayed by the replacement D2D relay, by interacting with the replacement D2D relay, or by interacting with a central control node and the replacement D2D relay.

A D2D relay may serve as the central control node, to acquire relay-related information related to a D2D relay near the central control node. The relay-related information related to a relay may include a relay type of the relay, a relay status of the relay, information on a geolocation of the relay, D2D UE connected to the relay, and information on a load of the relay. The central control node may acquire relay-related information related to a relay near the central control node by monitoring a relay discovery message or broadcast information. The central control node may acquire, from a relay, relay-related information related to the relay.

The control node may determine that the first D2D UE may perform D2D communication relayed by the replacement D2D relay by interacting with the replacement D2D relay as follows.

The control node may send, to the replacement D2D relay, a relay access request.

Having determined that the replacement D2D relay allows the first D2D UE to perform D2D communication relayed by the replacement D2D relay, the replacement D2D relay may return the relay access response to the central control node.

The relay access response may include an Internet Protocol (IP) address allocated by the replacement D2D relay to the first D2D UE.

The control node may determine that the first D2D UE may perform D2D communication relayed by the replacement D2D relay by interacting with the central control node and the replacement D2D relay as follows.

The control node may send, to the central control node, a relay access request.

The central control node may send, to the replacement D2D relay, a relay access request.

The replacement D2D relay may determine that the replacement D2D relay allows the first D2D UE to perform D2D communication relayed by the replacement D2D relay. The replacement D2D relay may return the relay access response to the central control node.

Having received the relay access response, the central control node may return the relay access response to the control node.

The relay access request may include at least one of: information on an identification (ID) of the first D2D UE; information on an ID, or a list of IDs, of a second D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on a priority of the first D2D UE; information on a priority of the D2D communication group to which the first D2D UE belongs; information on a priority of a D2D communication service of the first D2D UE; and information on configuration for D2D communication between the replacement D2D relay and the first D2D UE.

The information on the configuration for D2D communication may include at least one of: information on configuration of a bearer of the D2D communication between the replacement D2D relay and the first D2D UE, and information on security related configuration.

The relay access response may include an Internet Protocol (IP) address allocated by the replacement D2D relay to the first D2D UE.

The relay access response may include at least one of: information on an identification (ID) of the first D2D UE, information on an ID, or a list of IDs, of target D2D UE accessible via the replacement D2D relay, and information on configuration for D2D communication between the first D2D UE and the replacement D2D relay.

The D2D relay type may be UE-to-UE relay or UE-to-Network relay.

In step 302, the first D2D UE receives the relay replacing indication sent by the control node.

After receiving the relay replacing indication, the first D2D UE may return, to the control node, a relay replacing acknowledgement.

In step 303, the first D2D UE performs communication via a replacement D2D relay according to the relay replacing indication.

The first D2D UE may perform communication via the replacement D2D relay as follows.

The first D2D UE may perform communication by accessing a cellular network via the replacement D2D relay.

The first D2D UE may perform D2D communication with second D2D UE via the replacement D2D relay.

Before the first D2D UE performs D2D communication with the second D2D UE via the replacement D2D relay, the first D2D UE may send, to the second D2D UE via the replacement D2D relay, information for relay update. The second D2D UE may update relay information maintained at the second D2D UE according to the information for relay update.

The control node may send, to the second D2D UE, information for relay update. The second D2D UE may update relay information maintained at the second D2D UE according to the information for relay update.

The replacement D2D relay may send information for relay update to the second D2D UE. The second D2D UE may update relay information maintained at the second D2D UE according to the information for relay update.

The information for relay update may include at least one of: information on an identification (ID) of the first D2D UE, information on an ID of the second D2D UE, information on an ID of the replacement D2D relay, and information on configuration for D2D communication between the second D2D UE and the replacement D2D relay.

Having received the information for relay update, the second D2D UE may return, to the replacement D2D relay, a relay update acknowledgement.

The information for relay update may include information on at least one of: the ID of the first D2D UE, the ID of the second D2D UE, the ID of the replacement D2D relay, etc.

After the first D2D UE starts communication via the replacement D2D relay, a serving D2D relay of the first D2D UE may release a connection with the first D2D UE.

The serving D2D relay may release the connection with the first D2D UE upon expiration of a timing period of a timer maintained at the serving D2D relay. The serving D2D relay may release the connection with the first D2D UE upon receiving information on a relay-connection releasing indication sent by the first D2D UE or the control node.

The serving D2D relay may start or restart the timer upon receiving D2D communication data sent by the first D2D UE or upon sending D2D communication data to the first D2D UE.

The information on the relay-connection releasing indication may include at least one of:

a release indication, information on an identification (ID) of the first D2D UE, information on an ID of second D2D UE, and a cause of release.

Before sending the information on the relay-connection releasing indication to the serving D2D relay, the control node may receive a relay replacing acknowledgement sent by the first D2D UE, or receive an indication of access by the first D2D UE sent by the replacement D2D relay.

With the method for replacing a relay according to embodiments herein, a control node sends, to first D2D UE, a relay replacing indication instructing to replace a serving D2D relay. The first D2D UE receives the relay replacing indication sent by the control node. The first D2D UE performs communication via a replacement D2D relay according to the relay replacing indication. Accordingly, a serving relay for D2D UE in relayed transmission of D2D communication is replaced in time, allowing the D2D UE to access a proper replacement relay in time, ensuring smooth D2D communication.

Embodiment 2

In the embodiment, D2D UE 1, D2D UE 2, relay UE 1, and relay UE 2 may be D2D UE covered by a cellular communication network. Each of the relay UE 1 and the relay UE 2 may serve as a relay node to provide a relay service to other D2D UE. D2D UE may be connected to different relay UE. D2D UE may send D2D data to different target D2D UE through different relay UE.

Figure 4:
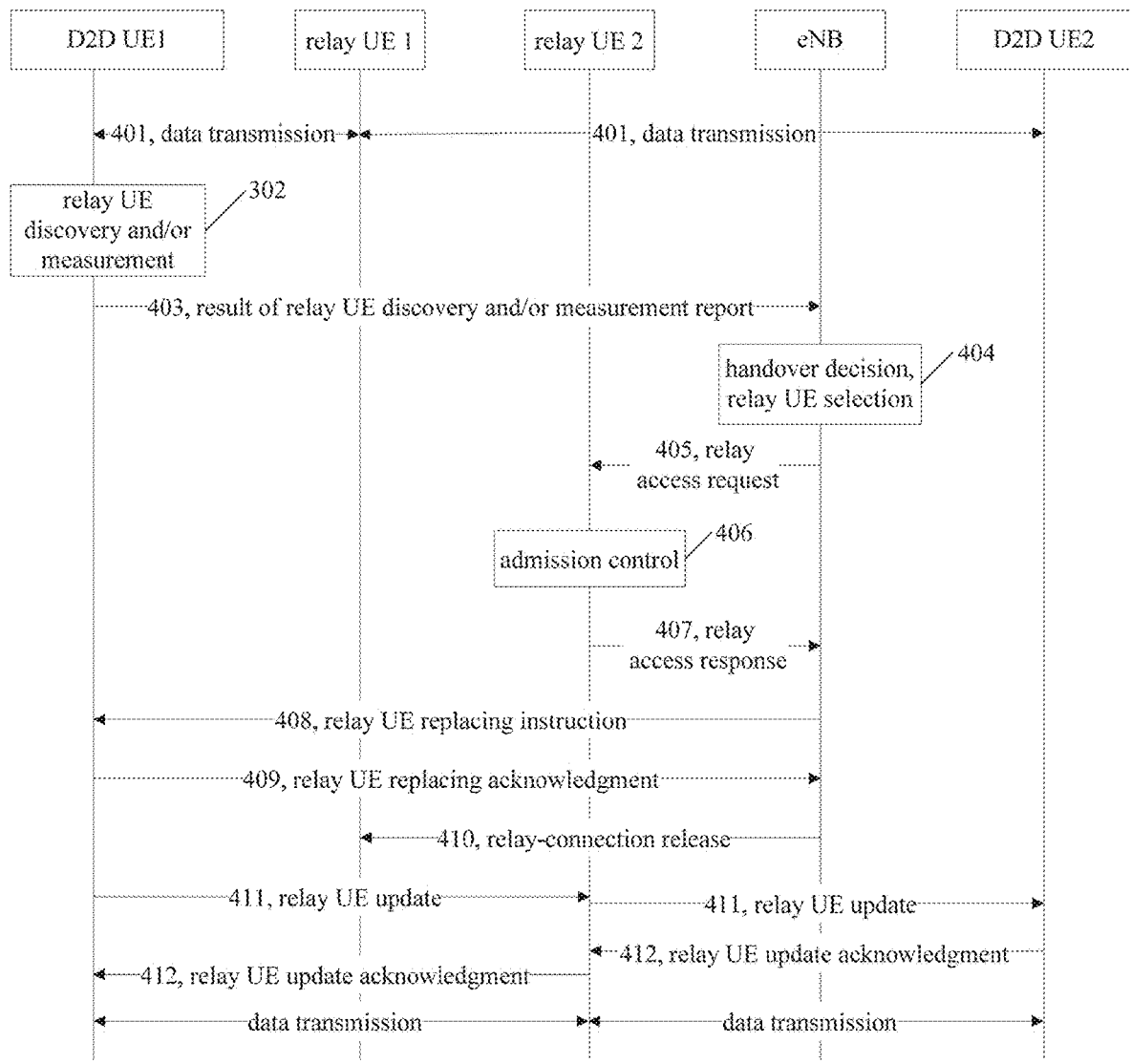
FIG. 4 is a flowchart of a method for replacing a relay according to an Embodiment 2 herein.

As shown in FIG. 4, a method for replacing a relay in UE-to-UE relay according to the embodiment may include the step(s) as follows.

In step 401, D2D UE 1 and D2D UE 2 perform, with each other, D2D communication relayed by relay UE 1. It is determined that relay UE replacement is required for the D2D UE 1.

It may be determined that relay UE replacement is required for the D2D UE 1 as follows.

In a Mode 1, at least one of the D2D UE 1, the D2D UE 2, and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may trigger relay UE replacement by the D2D UE 1 by sending, to the D2D UE 1 by D2D broadcast and/or unicast, at least one of a low-battery indication, a relay suspending indication, a relay status indication, a relay-connection releasing indication, etc. That is, the D2D UE 1 is triggered to execute relay UE discovery and/or measurement.

In a Mode 3, a BS may send a relay-discovery trigger threshold to the D2D UE 1. The relay-discovery trigger threshold may apply to measurement by the D2D UE 1 on the relay UE 1 being accessed by the D2D UE 1. In response to determining a measurement on the relay UE 1 that is lower than the relay-discovery trigger threshold, the D2D UE 1 may start D2D relay discovery.

In the Mode 1, before performing relay UE discovery and/or measurement, the D2D UE 1 may receive, such as via System Information Blocks (SIB), information on configuration of a resource used by candidate relay UE for D2D discovery sent by a BS. When relay UE discovery is needed, the D2D UE 1 may send a D2D-relay-UE-discovery indication to a BS. The BS may then send, to the D2D UE 1, the information on the configuration of the resource used by candidate relay UE for D2D discovery.

The information on the configuration of the resource used for D2D discovery may include information on at least one of: a frequency, a sub-frame, a Physical Resource Block (PRB), an ID of candidate relay UE, etc.

In step 402, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a Public Land Mobile Network (PLMN) to which a radio carrier frequency used for D2D communication between D2D UE and the relay UE belongs. The D2D discovery message may include connection-related information that identifies connection information available at UE-to-Network relay UE, such as information on an Access Point Name (APN). The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on configuration of resources used by candidate relay UE for discovery and/or measurement. The information on configuration of resources may include information on a resource in a time domain and/or a frequency domain used by candidate relay UE for D2D discovery, and/or information on an ID of the candidate relay UE. The D2D UE 1 may perform relay UE discovery and/or measurement according to received information on configuration of resources.

In step 403, the D2D UE 1 may send a result of relay UE discovery and/or a measurement report to a BS (eNB).

The result of relay UE discovery and/or the measurement report may include information on a relay ID (e.g., a ProSe ID) in a D2D relay discovery message received by the D2D UE 1 and/or a result of measurement performed by the D2D UE 1 on a received relay UE discovery message (e.g., signal intensity).

The D2D UE 1 may send information on a geolocation of the D2D UE 1 to the eNB.

The D2D UE 1 may send, to the eNB, at least one of: information on an ID of the D2D UE 1; information on QoS required by a communication service of the D2D UE 1; information on D2D security capability of the D2D UE 1; information on a D2D-security-related parameter of the D2D UE 1; information on an ID of a D2D communication group to which the D2D UE 1 belongs; a D2D relay type requested by the D2D UE 1; information on an ID, or a list of IDs, of target D2D UE with which the D2D UE 1 is to communicate; information on a priority of the D2D UE information on a priority of the D2D communication group to which the D2D UE 1 belongs; information on a priority of a D2D communication service of the D2D UE 1. The D2D relay type may be UE-to-UE relay or UE-to-Network relay.

In step 404, the eNB may select, for the D2D UE 1 according to the result of relay UE discovery and/or the measurement report received, one or more candidate replacement relay UE.

For example, the eNB may select, among UE-discovered relay UE, relay UE with a quality signal as a candidate replacement relay.

It may be assumed that the candidate replacement relay is relay UE 2.

In step 405, the eNB may send a relay access request to the relay UE 2.

The relay access request may include at least one of: information on an ID of the D2D UE 1; information on an ID, or a list of IDs, of target D2D UE with which the D2D UE 1 is to communicate (such as the ID of the D2D UE 2); information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QoS Class Identifier (QCI), an Allocation and Retention Priority (ARP), indication of 'Guaranteed Bit Rate (GBR) or not', a GBR, a MultiBand Radio (MBR), etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

In step 406, having received the relay access request, the relay UE 2 may perform admission control to determine whether to allow the D2D UE 1 to perform, with the target D2D UE (D2D UE 2) of the D2D UE 1, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

The relay UE 2 may discover D2D UE near the relay UE 2 by monitoring a D2D discovery signal and acquire information on an ID of the D2D UE discovered. The relay UE 2 may determine, according to information on the D2D UE discovered, whether the relay UE 2 is capable of forwarding D2D communication data of the D2D UE 1 to the D2D UE 2.

In step 407, having determined to allow access by the D2D UE 1 and having determined that the relay UE 2 is capable of forwarding D2D communication data of the D2D UE 1 to the D2D UE 2, the relay UE 2 may send a relay access response to the eNB.

The relay access response may include information on at least one of: an ID of the D2D UE 1; an ID, or a list of IDs, of D2D UE 2 capable of being routed via the relay UE 2; configuration for D2D communication between the D2D UE 1 and the relay UE 2; an IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

Having determined to reject access by the D2D UE 1, or having determined that the relay UE 2 is incapable of forwarding D2D communication data of the D2D UE 1 to the D2D UE 2, the relay UE 2 may return a rejection to the eNB. The eNB may select other candidate relay UE for the D2D UE 1.

In step 408, having received the relay access response, the eNB may send, to the D2D UE 1, a relay UE replacing instruction instructing the D2D UE 1 to access a replacement relay UE.

The relay UE replacing instruction may include information on at least one of: the ID of the replacement D2D relay (namely the relay UE 2); the ID of the D2D UE 1; the ID, or the list of IDs, of D2D UE 2 capable of being routed via the replacement D2D relay; configuration for D2D communication between the D2D UE 1 and the relay UE 2; the IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

In step 409, the D2D UE 1 may send, to the eNB, a relay UE replacing acknowledgment confirming to perform, with the D2D UE 2, D2D communication relayed by the relay UE 2.

In step 410, having received the relay UE replacing acknowledgment, the eNB may send, to a serving relay UE of the D2D UE 1 (namely, the relay UE 1), a relay-connection release message. Having received the relay-connection release message, the relay UE 1 may release the context information related to the relay UE 1.

The relay-connection release message may include information on at least one of: a release indication, the ID of the D2D UE 1, the ID of target D2D UE with which the D2D UE 1 is to communicate (namely, the D2D UE 2), a cause of release, etc.

Having received the relay-connection release message, the relay UE 1 may send, to the D2D UE 1, a relay-connection release message instructing the D2D UE 1 to release a connection with the relay UE 1. The relay UE 1 may determine whether to release the connection with the D2D UE 1 based on a timer maintained at the relay UE 1. Upon receiving a D2D communication packet sent by the D2D UE 1, the relay UE 1 may start or restart the timer. The relay UE 1 may release the connection with the D2D UE 1 upon expiration of a timing period of the timer. The relay UE 1 may then delete context related to the D2D UE 1.

In step 411, the D2D UE 1 may send, to the D2D UE 2 via the replacement D2D relay (the relay UE 2), information for relay update, such that the replacement D2D relay (the relay UE 2) may update relay information maintained at the D2D UE 2 according to the received information for relay update.

The information for relay update may include information on at least one of: the ID of the D2D UE 1, the ID of target D2D UE with which the D2D UE 1 is to communicate (namely the D2D UE 2), the ID of the replacement D2D relay (namely the relay UE 2), configuration for D2D communication between the D2D UE 2 and the relay UE 2, etc.

In step 412, having received the information for relay update, the D2D UE 2 may update the relay information maintained at the D2D UE 2, and send, to the D2D UE 1 via the replacement D2D relay (the relay UE 2), a relay update acknowledgement.

The relay update acknowledgement may include information on at least one of: the ID of the D2D UE 1, the ID of target D2D UE with which the D2D UE 1 is to communicate (namely the D2D UE 2), the ID of the replacement D2D relay (namely the relay UE 2), etc.

The D2D UE 2 may then perform, with the D2D UE 1, D2D communication relayed by the replacement D2D relay (namely, the relay UE 2).

Note that the solution according to the embodiment may apply to UE-to-Network relay as well. In applying the solution according to the embodiment to UE-to-Network relay, no information on the ID of the target D2D UE has to be included in an aforementioned message. No relay update is required, either. That is, steps 411 and 412 may be omitted.

Embodiment 3

In the embodiment, D2D UE 1, D2D UE 2, relay UE 1, and relay UE 2 may be D2D UE covered by a cellular communication network. Each of the relay UE 1 and the relay UE 2 may serve as a relay node to provide a relay service to other D2D UE. D2D UE may be connected to different relay UE. D2D UE may send D2D data to different target D2D UE through different relay UE.

Figure 5:
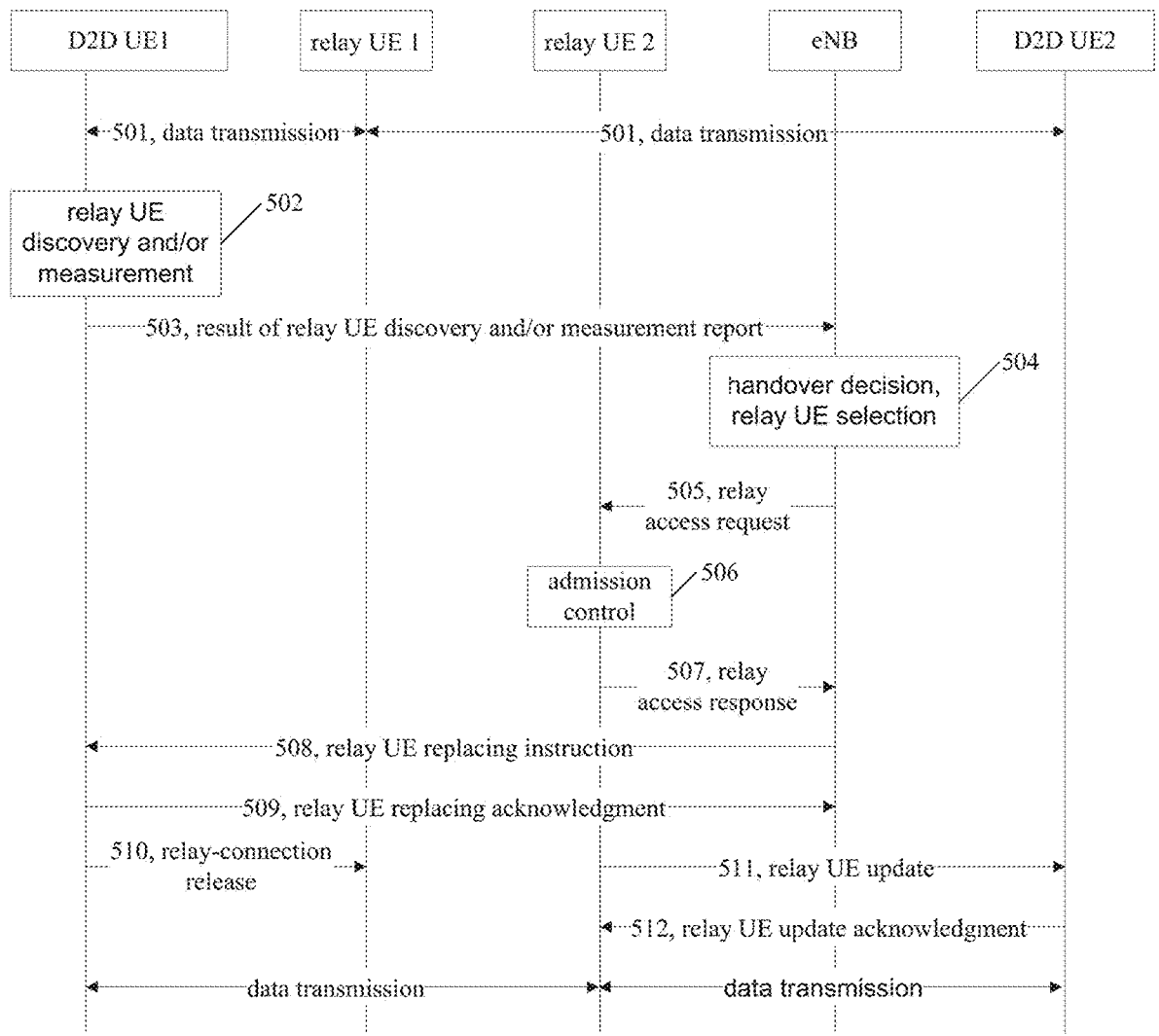
FIG. 5 is a flowchart of a method for replacing a relay according to an Embodiment 3 herein.

As shown in FIG. 5, a method for replacing a relay in UE-to-UE relay according to the embodiment may include the step(s) as follows.

In step 501, D2D UE 1 and D2D UE 2 perform, with each other, D2D communication relayed by relay UE 1. It is determined that relay UE replacement is required for the D2D UE 1.

It may be determined that relay UE replacement is required for the D2D UE 1 as follows.

In a Mode 1, at least one of the D2D UE 1, the D2D UE 2, and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may send, by D2D broadcast and/or unicast, at least one of a low-battery indication, a relay suspending indication, a relay status indication, a relay-connection releasing indication, etc.

In a Mode 3, a BS may send a relay-discovery trigger threshold to the D2D UE 1. The relay-discovery trigger threshold may apply to measurement by the D2D UE 1 on the relay UE 1 being accessed by the D2D UE 1. In response to determining a measurement on the relay UE 1 that is lower than the relay-discovery trigger threshold, the D2D UE 1 may start D2D relay discovery.

In the Mode 1, before performing relay UE discovery and/or measurement, the D2D UE 1 may receive, such as via SIBs, information on configuration of a resource used by candidate relay UE for D2D discovery sent by a BS. When relay UE discovery is needed, the D2D UE 1 may send a D2D-relay-UE-discovery indication to a BS. The BS may then send, to the D2D UE 1, the information on the configuration of the resource used by candidate relay UE for D2D discovery.

The information on the configuration of the resource used for D2D discovery may include information on at least one of: a frequency, a sub-frame, a PRB, an ID of candidate relay UE, etc.

In step 502, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on relay discovery and/or measurement configuration for discovering, and/or performing measurement on, a candidate D2D relay. The information on relay discovery and/or measurement configuration may include information on a resource in a time domain and/or a frequency domain used by candidate relay UE for D2D discovery, and/or information on an ID of the candidate relay UE. The D2D UE 1 may perform relay UE discovery and/or measurement according to the received information on relay discovery and/or measurement configuration.

In step 503, the D2D UE 1 may send a result of relay UE discovery and/or a measurement report to an eNB.

The result of relay UE discovery and/or the measurement report may include information on a relay ID (e.g., a ProSe ID) in a D2D relay discovery message received by the D2D UE 1 and/or a result of measurement performed by the D2D UE 1 on a received relay UE discovery message (e.g., signal intensity).

The D2D UE 1 may send information on a geolocation of the D2D UE 1 to the eNB.

The D2D UE 1 may send, to the eNB, at least one of: information on an ID of the D2D UE 1; information on QoS required by a communication service of the D2D UE; information on D2D security capability of the D2D UE 1; information on a D2D-security-related parameter of the D2D UE 1; information on an ID of a D2D communication group to which the D2D UE 1 belongs; a D2D relay type requested by the D2D UE 1; information on an ID, or a list of IDs, of target D2D UE with which the D2D UE 1 is to communicate; information on a priority of the D2D UE information on a priority of the D2D communication group to which the D2D UE 1 belongs; information on a priority of a D2D communication service of the D2D UE 1. The D2D relay type may be UE-to-UE relay or UE-to-Network relay.

In step 504, the eNB may select, for the D2D UE 1 according to the result of relay UE discovery and/or the measurement report received, one or more candidate replacement relay UE.

For example, the eNB may select, among UE-discovered relay UE, relay UE with a quality signal as a candidate replacement relay.

It may be assumed that the candidate replacement relay is relay UE 2.

In step 505, the eNB may send a relay access request to the relay UE 2.

The relay access request may include at least one of: information on an ID of the D2D UE 1; information on an ID, or a list of IDs, of target D2D UE with which the D2D UE 1 is to communicate (such as the ID of the D2D UE 2); information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QCI, an ARP, indication of 'GBR or not', a GBR, an MBR, etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

In step 506, having received the relay access request, the relay UE 2 may perform admission control to determine whether to allow the D2D UE 1 to perform, with the D2D UE 2, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

The relay UE 2 may discover D2D UE near the relay UE 2 by monitoring a D2D discovery signal and acquire information on an ID of the D2D UE discovered. The relay UE 2 may determine, according to information on the D2D UE discovered, whether the relay UE 2 is capable of forwarding D2D communication data of the D2D UE 1 to the D2D UE 2.

In step 507, having determined to allow access by the D2D UE 1 and having determined that the relay UE 2 is capable of forwarding D2D communication data of the D2D UE 1 to the D2D UE 2, the relay UE 2 may send a relay access response to the eNB.

The relay access response may include information on at least one of: an ID of the D2D UE 1; an ID, or a list of IDs, of D2D UE 2 capable of being routed via the relay UE 2; configuration for D2D communication between the D2D UE 1 and the relay UE 2; an IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

Having determined to reject access by the D2D UE 1, or having determined that the relay UE 2 is incapable of forwarding D2D communication data of the D2D UE 1 to the D2D UE 2, the relay UE 2 may return a rejection to the eNB. The eNB may select other candidate relay UE for the D2D UE 1.

In step 508, having received the relay access response, the eNB may send, to the D2D UE 1, a relay UE replacing instruction instructing the D2D UE 1 to access a replacement relay UE.

The relay UE replacing instruction may include information on at least one of: the ID of the replacement D2D relay (namely the relay UE 2); the ID of the D2D UE 1; the ID, or the list of IDs, of D2D UE 2 capable of being routed via the replacement D2D relay; configuration for D2D communication between the D2D UE 1 and the relay UE 2; the IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

In step 509, the D2D UE 1 may send, to the eNB, a relay UE replacing acknowledgment confirming to perform, with the D2D UE 2, D2D communication relayed by the relay UE 2.

In step 510, having sent the relay UE replacing acknowledgment to the eNB, the D2D UE 1 may send, to a serving relay UE of the D2D UE 1 (namely, the relay UE 1), a relay-connection release message to release a connection of the D2D UE 1 with the relay UE 1. Having received the relay-connection release message, the relay UE 1 may release the context information related to the relay UE 1.

The relay-connection release message may include information on at least one of: a release indication, the ID of the D2D UE 1, the ID of target D2D UE with which the D2D UE 1 is to communicate (namely, the D2D UE 2), a cause of release, etc.

In practical application, having received the relay-connection release message, the relay UE 1 may send, to the D2D UE 1, a relay-connection release message instructing the D2D UE 1 to release the connection with the relay UE 1.

In step 511, the replacement D2D relay (the relay UE 2) for the D2D UE 1 may send, to target D2D UE with which the D2D UE 1 is to communicate (including at least the D2D UE 2), information for relay update, such that relay information maintained at the target D2D UE (D2D UE 2) may be updated according to the received information for relay update.

The information for relay update may include information on at least one of: the ID of the D2D UE 1, the ID of target D2D UE with which the D2D UE 1 is to communicate (namely the D2D UE 2), the ID of the replacement D2D relay (namely the relay UE 2), configuration for D2D communication between the D2D UE 2 and the relay UE 2, etc.

In step 512, having received the information for relay update, the D2D UE 2 may update the relay information maintained at the D2D UE 2, and send a relay update acknowledgement to the relay UE 2, The relay update acknowledgement may include information on at least one of: the ID of the D2D UE 1, the ID of target D2D UE with which the D2D UE 1 is to communicate (namely the D2D UE 2), the ID of the replacement D2D relay (namely the relay UE 2), etc.

The D2D UE 2 may then perform, with the D2D UE 1, D2D communication relayed by the replacement D2D relay (namely, the relay UE 2).

Note that the solution according to the embodiment may apply to UE-to-Network relay as well. In applying the solution according to the embodiment to UE-to-Network relay, no information on the ID of the target D2D UE has to be included in an aforementioned message. No relay update is required, either. That is, steps 511 and 512 may be omitted.

Embodiment 4

In the embodiment, D2D UE 1, D2D UE 2, relay UE 1, and relay UE 2 may be D2D UE covered by a cellular communication network. Each of the relay UE 1 and the relay UE 2 may serve as a relay node to provide a relay service to other D2D UE. D2D UE may be connected to different relay UE. D2D UE may send D2D data to different target D2D UE through different relay UE.

Figure 6:
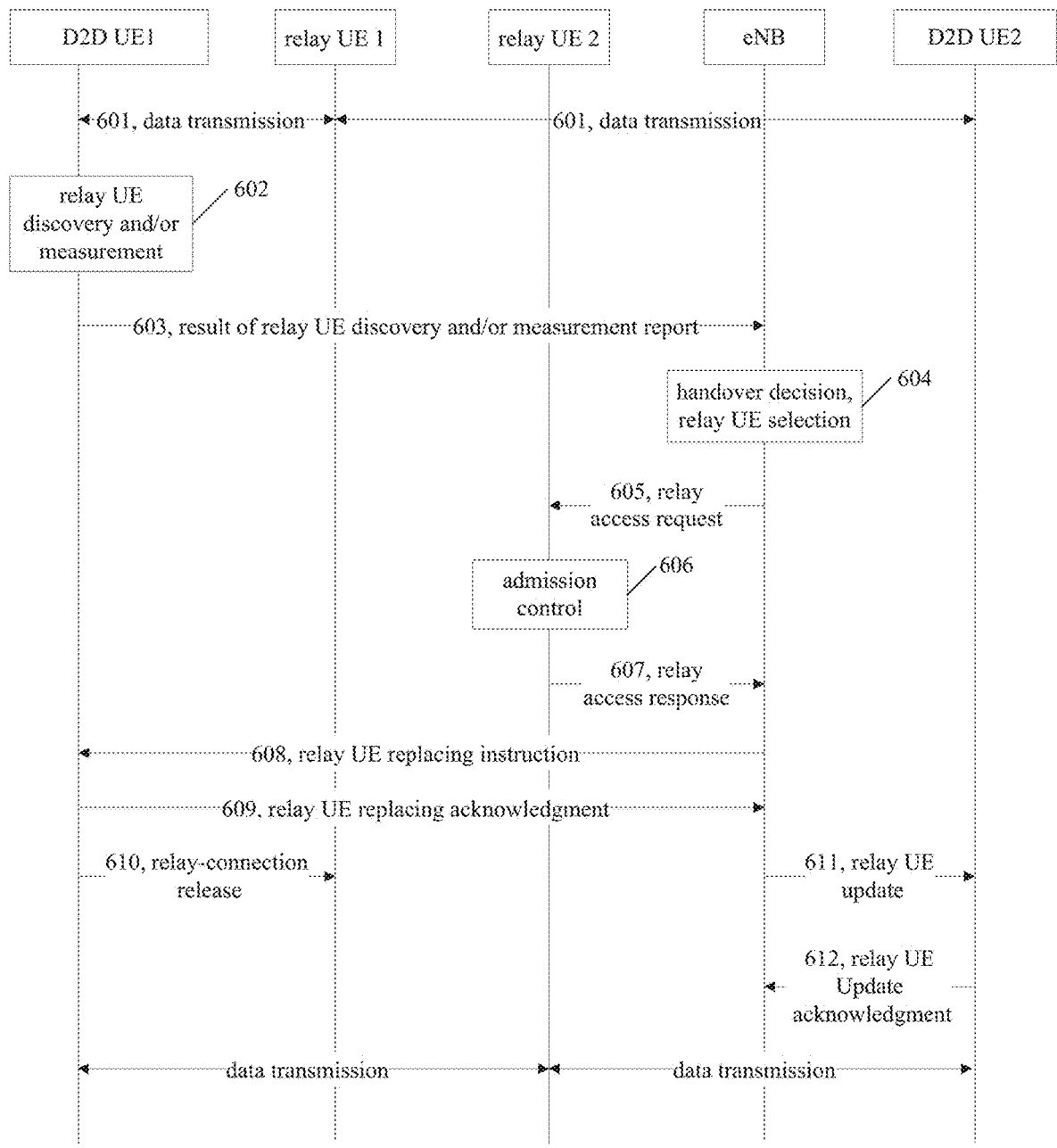
FIG. 6 is a flowchart of a method for replacing a relay according to an Embodiment 4 herein.

As shown in FIG. 6, a method for replacing a relay in UE-to-UE relay according to the embodiment may include the step(s) as follows.

In step 601, D2D UE 1 and D2D UE 2 perform, with each other, D2D communication relayed by relay UE 1. It is determined that relay UE replacement is required for the D2D UE 1.

It may be determined that relay UE replacement is required for the D2D UE 1 as follows.

In a Mode 1, at least one of the D2D UE 1, the D2D UE 2, and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may send, by D2D broadcast and/or unicast, at least one of a low-battery indication, a relay suspending indication, a relay status indication, a relay-connection releasing indication, etc.

In a Mode 3, a BS may send a relay-discovery trigger threshold to the D2D UE 1. The relay-discovery trigger threshold may apply to measurement by the D2D UE 1 on the relay UE 1 being accessed by the D2D UE 1. In response to determining a measurement on the relay UE 1 that is lower than the relay-discovery trigger threshold, the D2D UE 1 may start D2D relay discovery.

In the Mode 1, before performing relay UE discovery and/or measurement, the D2D UE 1 may receive, such as via SIBs, information on configuration of a resource used by candidate relay UE for D2D discovery sent by a BS. When relay UE discovery is needed, the D2D UE 1 may send a D2D-relay-UE-discovery indication to a BS. The BS may then send, to the D2D UE 1, the information on the configuration of the resource used by candidate relay UE for D2D discovery.

The information on the configuration of the resource used for D2D discovery may include information on at least one of: a frequency, a sub-frame, a PRB, an ID of candidate relay UE, etc.

In step 602, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on configuration of resources used by candidate relay UE for discovery and/or measurement. The information on configuration of resources may include information on a resource in a time domain and/or a frequency domain used by candidate relay UE for D2D discovery and/or information on an ID of the candidate relay UE. The D2D UE 1 may perform relay UE discovery and/or measurement according to received information on configuration of resources.

In step 603, the D2D UE 1 may send a result of relay UE discovery and/or a measurement report to an eNB.

The result of relay UE discovery and/or the measurement report may include information on a relay ID (e.g., a ProSe ID) in a D2D relay discovery message received by the D2D UE 1 and/or a result of measurement performed by the D2D UE 1 on a received relay UE discovery message (e.g., signal intensity).

The D2D UE 1 may send information on a geolocation of the D2D UE 1 to the eNB.

The D2D UE 1 may send, to the eNB, at least one of: information on an ID of the D2D UE 1; information on QoS required by a communication service of the D2D UE; information on D2D security capability of the D2D UE 1; information on a D2D-security-related parameter of the D2D UE 1; information on an ID of a D2D communication group to which the D2D UE 1 belongs; a D2D relay type requested by the D2D UE 1; information on an ID, or a list of IDs, of target D2D UE with which the D2D UE 1 is to communicate; information on a priority of the D2D UE 1; information on a priority of the D2D communication group to which the D2D UE 1 belongs; information on a priority of a D2D communication service of the D2D UE 1. The D2D relay type may be UE-to-UE relay or UE-to-Network relay.

In step 604, the eNB may select, for the D2D UE 1 according to the result of relay UE discovery and/or the measurement report received, one or more candidate replacement relay UE.

For example, the eNB may select, among UE-discovered relay UE, relay UE with a quality signal as a candidate replacement relay.

It may be assumed that the candidate replacement relay is relay UE 2.

In step 605, the eNB may send a relay access request to the relay UE 2.

The relay access request may include at least one of: information on an ID of the D2D UE 1; information on an ID, or a list of IDs, of target D2D UE with which the D2D UE 1 is to communicate (such as the ID of the D2D UE 2); information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QCI, an ARP, indication of 'GBR or not', a GBR, an MBR, etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

In step 606, having received the relay access request, the relay UE 2 may perform admission control to determine whether to allow the D2D UE 1 to perform, with the D2D UE 2, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

The relay UE 2 may discover D2D UE near the relay UE 2 by monitoring a D2D discovery signal and acquire information on an ID of the D2D UE discovered. The relay UE 2 may determine, according to information on the D2D UE discovered, whether the relay UE 2 is capable of forwarding D2D communication data of the D2D UE 1 to the D2D UE 2.

In step 607, having determined to allow access by the D2D UE 1 and having determined that the relay UE 2 is capable of forwarding D2D communication data of the D2D UE 1 to the D2D UE 2, the relay UE 2 may send a relay access response to the eNB.

The relay access response may include information on at least one of an ID of the D2D UE 1; an ID, or a list of IDs, of D2D UE 2 capable of being routed via the relay UE 2; configuration for D2D communication between the D2D UE 1 and the relay UE 2; an IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

Having determined to reject access by the D2D UE 1, or having determined that the relay UE 2 is incapable of forwarding D2D communication data of the D2D UE 1 to the D2D UE 2, the relay UE 2 may return a rejection to the eNB. The eNB may select other candidate relay UE for the D2D UE 1.

In step 608, having received the relay access response, the eNB may send, to the D2D UE 1, a relay UE replacing instruction instructing the D2D UE 1 to access a replacement relay UE.

The relay UE replacing instruction may include information on at least one of: the ID of the replacement D2D relay (namely the relay UE 2); the ID of the D2D UE 1; the ID, or the list of IDs, of D2D UE 2 capable of being routed via the replacement D2D relay; configuration for D2D communication between the D2D UE 1 and the relay UE 2; the IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

In step 609, the D2D UE 1 may send, to the eNB, a relay UE replacing acknowledgment confirming to perform, with the D2D UE 2, D2D communication relayed by the relay UE 2.

In step 610, having sent the relay UE replacing acknowledgment to the eNB, the D2D UE 1 may send, to a serving relay UE of the D2D UE 1 (namely, the relay UE 1), a relay-connection release message to release a connection of the D2D UE 1 with the relay UE 1. Having received the relay-connection release message, the relay UE 1 may release the context information related to the relay UE 1.

The relay-connection release message may include information on at least one of: a release indication, the ID of the D2D UE 1, the ID of target D2D UE with which the D2D UE 1 is to communicate (namely the D2D UE 2), a cause of release, etc.

In practical application, having received the relay-connection release message, the relay UE 1 may send, to the D2D UE 1, a relay-connection release message instructing the D2D UE 1 to release the connection with the relay UE 1.

In step 611, having received the relay UE replacing acknowledgment sent by the D2D UE 1, the eNB may send, to target D2D UE with which the D2D UE 1 is to communicate (including at least the D2D UE 2), information for relay update, such that relay information maintained at the target D2D UE (D2D UE 2) may be updated according to the received information for relay update.

The information for relay update may include information on at least one of: the ID of the D2D UE 1, the ID of target D2D UE with which the D2D UE 1 is to communicate (namely the D2D UE 2), the ID of the replacement D2D relay (namely the relay UE 2), configuration for D2D communication between the D2D UE 2 and the relay UE 2, etc.

Note that this step may be executed before or after step 510.

In step 612, having received the information for relay update, the D2D UE 2 may update the relay information maintained at the D2D UE 2, and send a relay update acknowledgement to the eNB.

The relay update acknowledgement may include information on at least one of: the ID of the D2D UE 1, the ID of target D2D UE with which the D2D UE 1 is to communicate (namely the D2D UE 2), the ID of the replacement D2D relay (namely the relay UE 2), etc.

The D2D UE 2 may then perform, with the D2D UE 1, D2D communication relayed by the replacement D2D relay (namely, the relay UE 2).

Note that the solution according to the embodiment may apply to UE-to-Network relay as well. In applying the solution according to the embodiment to UE-to-Network relay, no information on the ID of the target D2D UE has to be included in an aforementioned message. No relay update is required, either. That is, steps 611 and 612 may be omitted.

Embodiment 5

In the embodiment, D2D UE 1, D2D UE 2, relay UE 1, and relay UE 2 may be D2D UE covered by a cellular communication network. Each of the relay UE 1 and the relay UE 2 may serve as a relay node to provide a relay service to other D2D UE. D2D UE may be connected to different relay UE. D2D UE may send D2D data to different target D2D UE through different relay UE.

Figure 7:
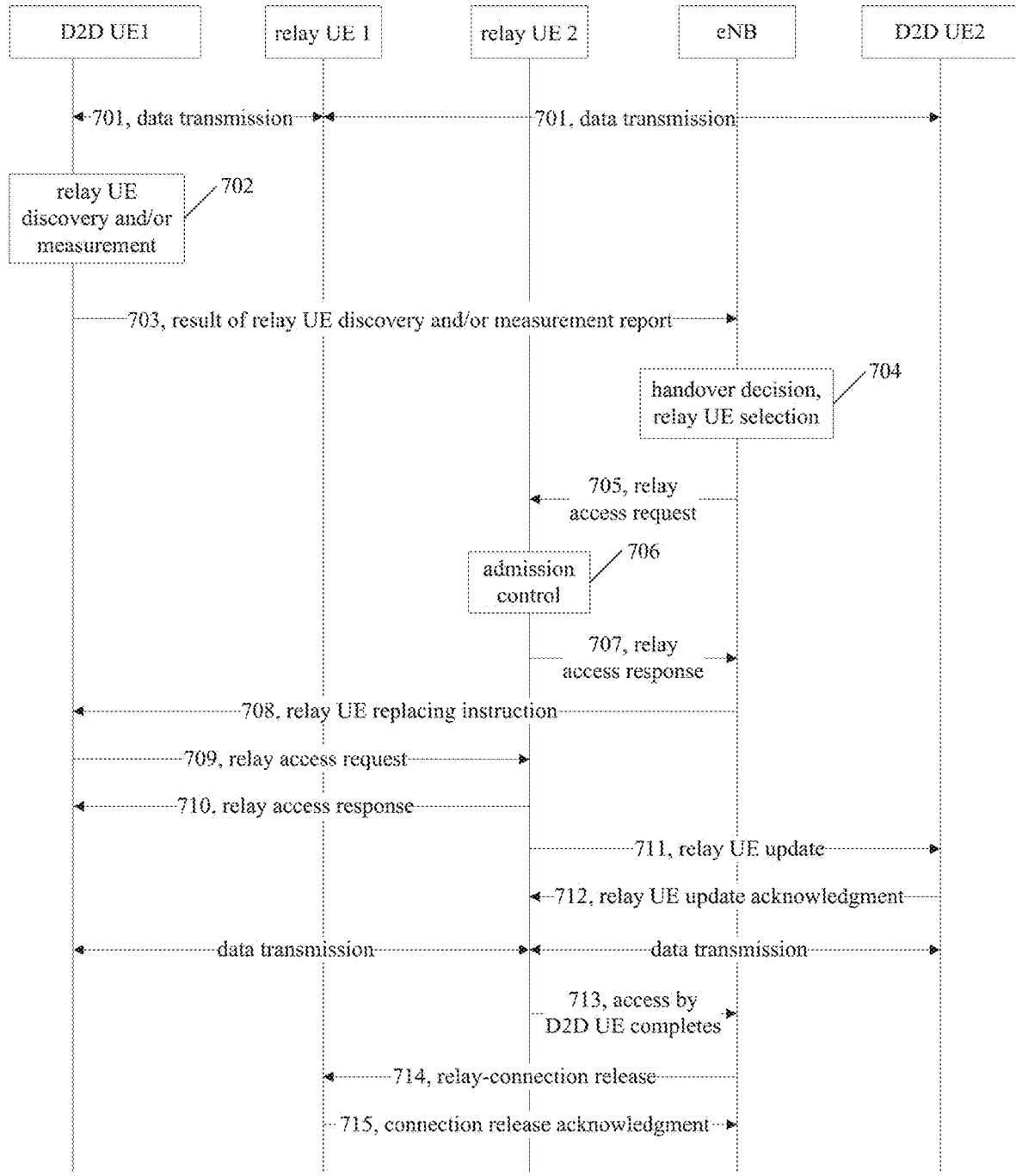
FIG. 7 is a flowchart of a method for replacing a relay according to an Embodiment 5 herein.

As shown in FIG. 7, a method for replacing a relay in UE-to-UE relay according to the embodiment may include the step(s) as follows.

In step 701, D2D UE 1 and D2D UE 2 perform, with each other, D2D communication relayed by relay UE 1. It is determined that relay UE replacement is required for the D2D UE 1.

It may be determined that relay UE replacement is required for the D2D UE 1 as follows.

In a Mode 1, at least one of the D2D UE 1, the D2D UE 2, and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may send, by D2D broadcast and/or unicast, at least one of a low-battery indication, a relay suspending indication, a relay status indication, a relay-connection releasing indication, etc.

In a Mode 3, a BS may send a relay-discovery trigger threshold to the D2D UE 1. The relay-discovery trigger threshold may apply to measurement by the D2D UE 1 on the relay UE 1 being accessed by the D2D UE 1. In response to determining a measurement on the relay UE 1 that is lower than the relay-discovery trigger threshold, the D2D UE 1 may start D2D relay discovery.

In the Mode 1, before performing relay UE discovery and/or measurement, the D2D UE 1 may receive, such as via SIBs, information on configuration of a resource used by candidate relay UE for D2D discovery sent by a BS. When relay UE discovery is needed, the D2D UE 1 may send a D2D-relay-UE-discovery indication to a BS. The BS may then send, to the D2D UE 1, the information on the configuration of the resource used by candidate relay UE for D2D discovery.

The information on the configuration of the resource used for D2D discovery may include information on at least one of: a frequency, a sub-frame, a PRB, an ID of candidate relay UE, etc.

In step 702, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on configuration of resources used by candidate relay UE for discovery and/or measurement. The information on configuration of resources may include information on a resource in a time domain and/or a frequency domain used by candidate relay UE for D2D discovery, and/or information on an ID of the candidate relay UE. The D2D UE 1 may perform relay UE discovery and/or measurement according to received information on configuration of resources.

In step 703, the D2D UE 1 may send a result of relay UE discovery and/or a measurement report to an eNB.

The result of relay UE discovery and/or the measurement report may include information on a relay ID (e.g., a ProSe ID) in a D2D relay discovery message received by the D2D UE 1 and/or a result of measurement performed by the D2D UE 1 on a received relay UE discovery message (e.g., signal intensity).

The D2D UE 1 may send information on a geolocation of the D2D UE 1 to the eNB.

The D2D UE 1 may send, to the eNB, at least one of: information on an ID of the D2D UE 1; information on QoS required by a communication service of the D2D UE; information on D2D security capability of the D2D UE 1; information on a D2D-security-related parameter of the D2D UE 1; information on an ID of a D2D communication group to which the D2D UE 1 belongs; a D2D relay type requested by the D2D UE 1; information on an ID, or a list of IDs, of target D2D UE with which the D2D UE 1 is to communicate; information on a priority of the D2D UE 1; information on a priority of the D2D communication group to which the D2D UE 1 belongs; information on a priority of a D2D communication service of the D2D UE 1. The D2D relay type may be UE-to-UE relay or UE-to-Network relay.

In step 704, the eNB may select, for the D2D UE 1 according to the result of relay UE discovery and/or the measurement report received, one or more candidate replacement relay UE.

For example, the eNB may select, among UE-discovered relay UE, relay UE with a quality signal as a candidate replacement relay.

It may be assumed that the candidate replacement relay is relay UE 2.

In step 705, the eNB may send a relay access request to the relay UE 2.

The relay access request may include at least one of: information on an ID of the D2D UE 1; information on an ID, or a list of IDs, of target D2D UE with which the D2D UE 1 is to communicate (such as the ID of the D2D UE 2); information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QCI, an ARP, indication of 'GBR or not', a GBR, an MBR, etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

In step 706, having received the relay access request, the relay UE 2 may perform admission control to determine whether to allow the D2D UE 1 to perform, with the D2D UE 2, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

The relay UE 2 may discover D2D UE near the relay UE 2 by monitoring a D2D discovery signal and acquire information on an ID of the D2D UE discovered. The relay UE 2 may determine, according to information on the D2D UE discovered, whether the relay UE 2 is capable of forwarding D2D communication data of the D2D UE 1 to the D2D UE 2.

Step 606 may be skipped. That is, step 607 may be executed following execution of step 605.

In step 707, having determined to allow access by the D2D UE 1 and having determined that the relay UE 2 is capable of forwarding D2D communication data of the D2D UE 1 to the D2D UE 2, the relay UE 2 may send a relay access response to the eNB.

The relay access response may include information on at least one of: an ID of the D2D UE 1; an ID, or a list of IDs, of D2D UE 2 capable of being routed via the relay UE 2; configuration for D2D communication between the D2D UE 1 and the relay UE 2; an IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

Having determined to reject access by the D2D UE 1, or having determined that the relay UE 2 is incapable of forwarding D2D communication data of the D2D UE 1 to the D2D UE 2, the relay UE 2 may return a rejection to the eNB. The eNB may select other candidate relay UE for the D2D UE 1.

In step 708, having received the relay access response, the eNB may send, to the D2D UE 1, a relay UE replacing instruction instructing the D2D UE 1 to access a replacement relay UE.

The relay UE replacing instruction may include information on at least one of: the ID of the replacement D2D relay (namely the relay UE 2); the ID of the D2D UE 1; the ID, or the list of IDs, of D2D UE 2 capable of being routed via the replacement D2D relay; configuration for D2D communication between the D2D UE 1 and the relay UE 2; the IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

In step 709, having received the relay UE replacing instruction, the D2D UE 1 may initiate a relay access request with the relay UE 2 by sending a relay access request to the relay UE 2.

The relay access request may include at least one of: information on an ID of the D2D UE 1; information on an ID of target D2D UE with which the D2D UE 1 is to communicate (including at least the D2D UE 2); information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QCI, an ARP, indication of 'GBR or not', a GBR, an MBR, etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

If the relay UE 2 has skipped step 506 after receiving a relay access request, then the relay UE 2 may have to perform admission control of step 506. In other words, after receiving the relay access request, the relay UE 2 may have to determine whether to allow the D2D UE 1 to perform, with the D2D UE 2, D2D communication relayed by the relay UE 2. The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1 and allow the D2D UE 1 to perform, with the D2D UE 2, D2D communication relayed by the relay UE 2.

In step 710, having determined to allow access by the D2D UE 1, the relay UE 2 may send a relay access response to the D2D UE 1.

The relay access response may include information on at least one of: the ID of the D2D UE 1; the ID of target D2D UE with which the D2D UE 1 is to communicate (namely, the D2D UE 2); configuration for D2D communication between the D2D UE 1 and the relay UE 2, etc. The information on the configuration for D2D communication between the D2D UE 1 and the relay UE 2 may include information on configuration of a bearer of the D2D communication and/or security related configuration.

In step 711, having determined to allow access by the D2D UE 1, the relay UE 2 may send, to target D2D UE with which the D2D UE 1 is to communicate (including at least the D2D UE 2), information for relay update, such that relay information maintained at the target D2D UE (namely, the D2D UE 2) may be updated according to the received information for relay update.

The information for relay update may include information on at least one of: the ID of the D2D UE 1, the ID of target D2D UE with which the D2D UE 1 is to communicate (namely the D2D UE 2), the ID of the replacement D2D relay (namely the relay UE 2), configuration for D2D communication between the D2D UE 2 and the relay UE 2, etc.

In step 712, having received the information for relay update, the D2D UE 2 may update the relay information maintained at the D2D UE 2, and send a relay update acknowledgement to the relay UE 2, The relay update acknowledgement may include information on at least one of: the ID of the D2D UE 1, the ID of target D2D UE with which the D2D UE 1 is to communicate (namely the D2D UE 2), the ID of the replacement D2D relay (namely the relay UE 2), etc.

The D2D UE 2 may then perform, with the D2D UE 1, D2D communication relayed by the replacement D2D relay (namely, the relay UE 2).

In step 713, after the D2D UE 1 has accessed the relay UE 2, the relay UE 2 may send, to the eNB, an access-complete message indicating that access by D2D UE completes.

The access-complete message may include information on at least one of: the ID of the D2D UE 1, the ID of target D2D UE with which the D2D UE 1 is to communicate (namely the D2D UE 2), the ID of the replacement D2D relay (namely the relay UE 2), etc.

In step 714, having received the access-complete message, the eNB may send, to a serving relay UE of the D2D UE 1 (namely, the relay UE 1), a relay-connection release message to release a connection of the D2D UE 1 with the relay UE 1. Having received the relay-connection release message, the relay UE 1 may release the context information related to the relay UE 1.

The relay-connection release message may include information on at least one of: a release indication, the ID of the D2D UE 1, the ID of target D2D UE with which the D2D UE 1 is to communicate (namely, the D2D UE 2), a cause of release, etc. Having received the relay-connection release message, the relay UE 1 may send, to the D2D UE 1, a relay-connection release message instructing the D2D UE 1 to release the connection with the relay UE 1.

In step 715, the relay UE 1 may return a relay-connection release acknowledgement to the eNB.

The step is optional.

Note that the solution according to the embodiment may apply to UE-to-Network relay as well. In applying the solution according to the embodiment to UE-to-Network relay, no information on the ID of the target D2D UE has to be included in an aforementioned message. No relay update is required, either. That is, there is no need to execute steps 710 and 711.

Embodiment 6

In the embodiment, D2D UE 1, D2D UE 2, relay UE 1, and relay UE 2 may be D2D UE located inside or outside coverage of a cellular communication network. Each of the relay UE 1 and the relay UE 2 may serve as a relay node to provide a relay service to other D2D UE. No signaling exchange with an eNB is required in relay UE replacement according to the embodiment. D2D UE may be connected to different relay UE. D2D UE may send D2D data to different target D2D UE through different relay UE.

Figure 8:
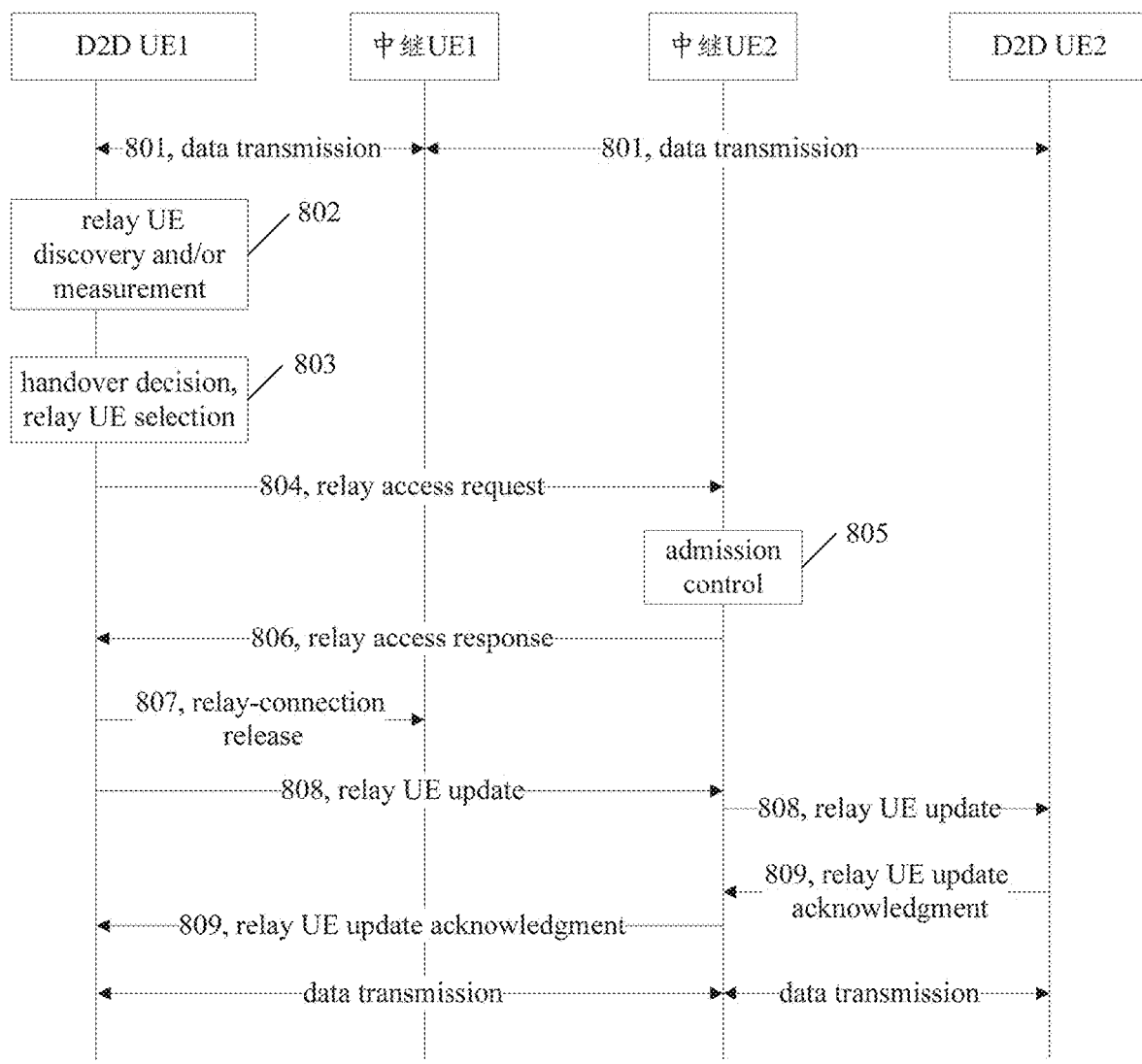
FIG. 8 is a flowchart of a method for replacing a relay according to an Embodiment 6 herein.

As shown in FIG. 8, a method for replacing a relay in UE-to-UE relay according to the embodiment may include the step(s) as follows.

In step 801, D2D UE 1 and D2D UE 2 perform, with each other, D2D communication relayed by relay UE 1. It is determined that relay UE replacement is required for the D2D UE 1.

It may be determined that relay UE replacement is required for the D2D UE 1 as follows.

In a Mode 1, at least one of the D2D UE 1, the D2D UE 2, and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may send, by D2D broadcast and/or unicast, at least one of a low-battery indication, a relay suspending indication, a relay status indication, a relay-connection releasing indication, etc.

In the Mode 1, before performing relay UE discovery and/or measurement, the D2D UE 1 may receive, from a BS such as via SIBs, or from a ProSe function by pre-configuration, information on configuration of a resource used by candidate relay UE for D2D discovery.

The information on the configuration of the resource used for D2D discovery may include information on at least one of: a frequency, a sub-frame, a PRB, an ID of candidate relay UE, etc.

In step 802, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on configuration of resources used by candidate relay UE for discovery and/or measurement. The information on configuration of resources may include information on a resource in a time domain and/or a frequency domain used by candidate relay UE for D2D discovery, and/or information on an ID of the candidate relay UE. The D2D UE 1 may perform relay UE discovery and/or measurement according to received information on configuration of resources.

In step 803, the D2D UE 1 may determine, according to a received relay UE discovery message or a result of measurement on the discovery message, one or more candidate replacement relay UE.

For example, the D2D UE 1 may select, among discovered relay UE, relay UE with a quality signal as a candidate replacement relay.

It may be assumed that the candidate replacement relay is relay UE 2.

In step 804, the D2D UE 1 may initiate a relay access request with the relay UE 2 by sending a relay access request to the relay UE 2.

The relay access request may include at least one of: information on an ID of the D2D UE 1; information on an ID, or a list of IDs, of target D2D UE with which the D2D UE 1 is to communicate (such as the ID of the D2D UE 2); information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QCI, an ARP, indication of 'GBR or not', a GBR, an MBR, etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

In step 805, the relay UE 2 may perform admission control.

Having received the relay access request, the relay UE 2 may determine whether to allow the D2D UE 1 to perform, with the D2D UE 2, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

The relay UE 2 may discover D2D UE near the relay UE 2 by monitoring a D2D discovery signal and acquire information on an ID of the D2D UE discovered. The relay UE 2 may determine, according to information on the D2D UE discovered, whether the relay UE 2 is capable of forwarding D2D communication data of the D2D UE 1 to the D2D UE 2.

In step 806, having determined to allow access by the D2D UE 1 and having determined that the relay UE 2 is capable of forwarding D2D communication data to target D2D UE of the D2D UE 1, the relay UE 2 may send a relay access response to the D2D UE 1.

The relay access response may include information on at least one of: the ID of the D2D UE 1; the ID, or the list of IDs, of target D2D UE capable of being routed via the relay UE 2 (such as the D2D UE 2); configuration for D2D communication between the D2D UE 1 and the relay UE 2, etc.

The information on the configuration for D2D communication between the D2D UE 1 and the relay UE 2 may include information on configuration of a bearer of the D2D communication and/or security related configuration.

Having determined to reject access by the D2D UE 1, or having determined that the relay UE 2 is incapable of forwarding D2D communication data to the target D2D UE of the D2D UE 1, the relay UE 2 may return a rejection to the D2D UE 1.

In step 807, having received the relay access response, the D2D UE 1 may send, to a serving D2D relay (relay UE 1), a relay-connection release message to release a connection of the D2D UE 1 with the relay UE 1. Having received the relay-connection release message, the relay UE 1 may release the context information related to the relay UE 1.

The relay-connection release message may include information on at east one of: a release indication, the ID of the D2D UE 1, the ID of target D2D UE with which the D2D UE 1 is to communicate (namely, the D2D UE 2), a cause of release, etc.

In step 808, the relay UE 2 may send, to the D2D UE 2 via the replacement D2D relay (relay UE 2), information for relay update, such that relay information maintained at the target D2D UE (namely, the D2D UE 2) may be updated according to the received information for relay update.

The information for relay update may include information on at least one of: the ID of the D2D UE 1, the ID of target D2D UE with which the D2D UE 1 is to communicate (namely the D2D UE 2), the ID of the replacement D2D relay (namely the relay UE 2), configuration for D2D communication between the D2D UE 2 and the relay UE 2, etc.

The step may be executed before or after step 807.

In step 809, having received the information for relay update, the D2D UE 2 may update the relay information maintained at the D2D UE 2, and send, to the D2D UE 1 via the replacement D2D relay (the relay UE 2), a relay update acknowledgement.

The relay update acknowledgement may include information on at least one of: the ID of the D2D UE 1, the ID of target D2D UE with which the D2D UE 1 is to communicate (namely the D2D UE 2), the ID of the replacement D2D relay (namely the relay UE 2), etc.

The D2D UE 2 may then perform, with the D2D UE 1, D2D communication relayed by the replacement D2D relay (namely, the relay UE 2).

Note that the solution according to the embodiment may apply to UE-to-Network relay as well. In applying the solution according to the embodiment to UE-to-Network relay, no information on the ID of the target D2D UE has to be included in an aforementioned message. No relay update is required, either. That is, there is no need to execute steps 808 and 809.

Embodiment 7

In the embodiment, D2D UE 1, D2D UE 2, relay UE 1, relay UE 2 and relay UE 3 may be D2D UE covered by a cellular communication network. Each of the relay UE 1, the relay UE 2 and the relay UE 3 may serve as a relay node to provide a relay service to other D2D UE. The relay UE 3 may serve as a central control node. Multiple relay UE (e.g., relay UE 1 and relay UE 2) may be connected to the central control node. The central control node may acquire relay-related information related to a relay near the central control node by monitoring a relay discovery message or broadcast information. The central control node may acquire, from a relay, relay-related information related to the relay. D2D UE may be connected to different relay UE. D2D UE may send D2D data to different target D2D UE through different relay UE.

Figure 9:
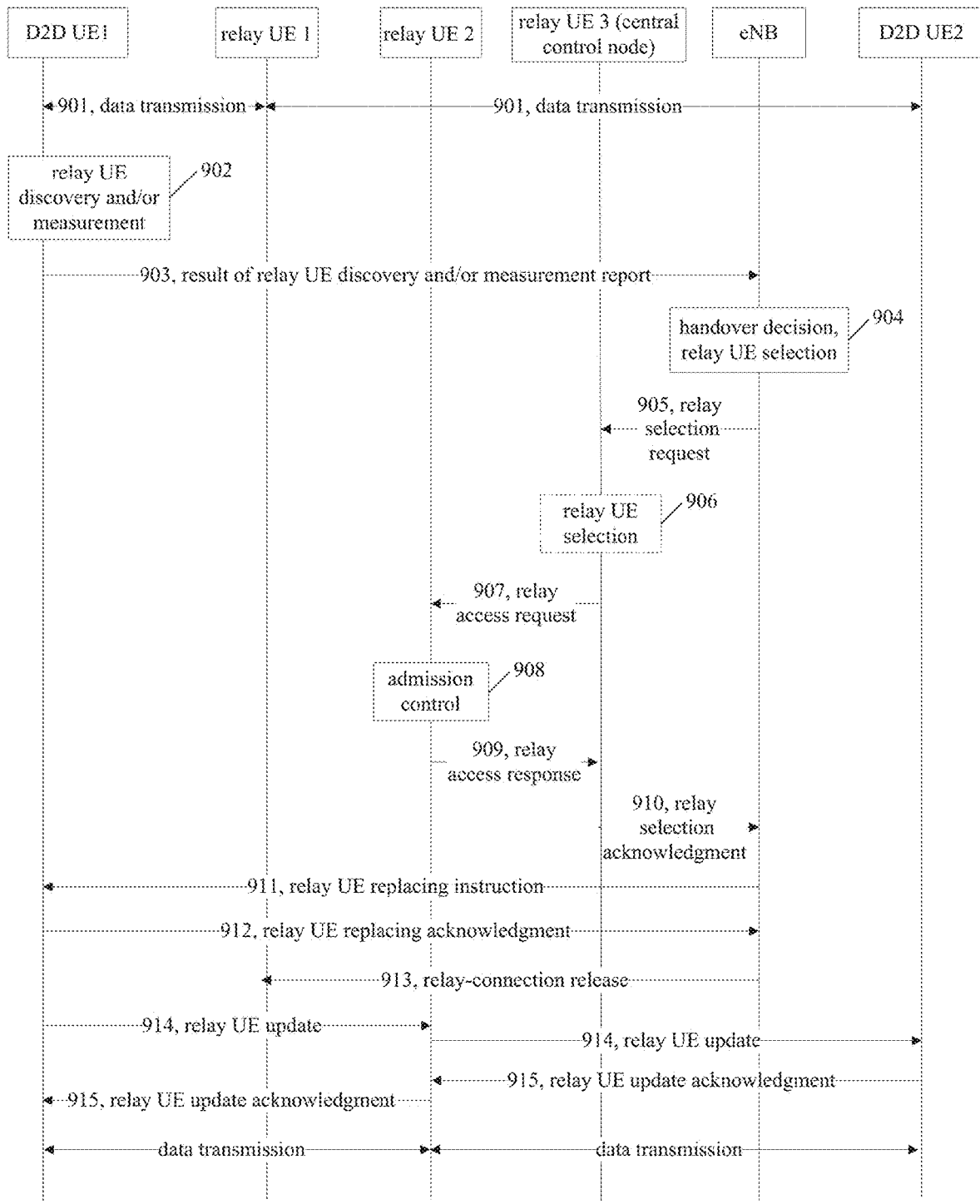
FIG. 9 is a flowchart of a method for replacing a relay according to an Embodiment 7 herein.

As shown in FIG. 9, a method for replacing a relay in UE-to-UE relay according to the embodiment may include the step(s) as follows.

In step 901, D2D UE 1 and D2D UE 2 perform, with each other, D2D communication relayed by relay UE 1. It is determined that relay UE replacement is required for the D2D UE 1.

It may be determined that relay UE replacement is required for the D2D UE 1 as follows.

In a Mode 1, at least one of the D2D UE 1, the D2D UE 2, and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may send, by D2D broadcast and/or unicast, at least one of a low-battery indication, a relay suspending indication, a relay status indication, a relay-connection releasing indication, etc.

In a Mode 3, a BS may send a relay-discovery trigger threshold to the D2D UE 1. The relay-discovery trigger threshold may apply to measurement by the D2D UE 1 on the relay UE 1 being accessed by the D2D UE 1. In response to determining a measurement on the relay UE 1 that is lower than the relay-discovery trigger threshold, the D2D UE 1 may start D2D relay discovery.

In the Mode 1, before performing relay UE discovery and/or measurement, the D2D UE 1 may receive, such as via SIBs, information on configuration of a resource used by candidate relay UE for D2D discovery sent by a BS. When relay UE discovery is needed, the D2D UE 1 may send a D2D-relay-UE-discovery indication to a BS. The BS may then send, to the D2D UE 1, the information on the configuration of the resource used by candidate relay UE for D2D discovery.

The information on the configuration of the resource used for D2D discovery may include information on at least one of: a frequency, a sub-frame, a PRB, an ID of candidate relay UE, etc.

In step 902, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on configuration of resources used by candidate relay UE for discovery and/or measurement. The information on configuration of resources may include information on a resource in a time domain and/or a frequency domain used by candidate relay UE for D2D discovery, and/or information on an ID of the candidate relay UE. The D2D UE 1 may perform relay UE discovery and/or measurement according to received information on configuration of resources.

In step 903, the D2D UE 1 may send a result of relay UE discovery and/or a measurement report to an eNB.

The result of relay UE discovery and/or the measurement report may include information on a relay ID (e.g., a ProSe ID) in a D2D relay discovery message received by the D2D UE 1 and/or a result of measurement performed by the D2D UE 1 on a received relay UE discovery message (e.g., signal intensity).

The D2D UE 1 may send information on a geolocation of the D2D UE 1 to the eNB.

The D2D UE 1 may send, to the eNB, at least one of: information on an ID of the D2D UE 1; information on QoS required by a communication service of the D2D UE; information on D2D security capability of the D2D UE 1; information on a D2D-security-related parameter of the D2D UE 1; information on an ID of a D2D communication group to which the D2D UE 1 belongs; a D2D relay type requested by the D2D UE 1; information on an ID, or a list of IDs, of target D2D UE with which the D2D UE 1 is to communicate; information on a priority of the D2D UE information on a priority of the D2D communication group to which the D2D UE 1 belongs; information on a priority of a D2D communication service of the D2D UE 1. The D2D relay type may be UE-to-UE relay or UE-to-Network relay.

In step 904, the eNB may determine, according to the result of relay UE discovery and/or the measurement report received, that a serving relay UE for the D2D UE 1 needs to be replaced.

The eNB may select, for the D2D UE 1 according to the result of relay UE discovery and/or the measurement report received, one or more candidate replacement relay UE.

In step 905, the eNB may send a relay selection (access) request to the relay UE 3 (central control node).

The message may include the result of relay UE discovery and/or the measurement report received by the eNB from the D2D UE 1 in step 803.

The message may include at least one of: information on an ID of the D2D UE 1; information on an ID, or a list of IDs, of target D2D UE with which the D2D UE 1 is to communicate (such as the ID of the D2D UE 2); information on an ID of target (candidate) relay UE selected for the D2D UE 1; information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

In step 906, the eNB may select no candidate replacement relay UE for the D2D UE 1, and the relay UE 3 may select a candidate replacement relay UE according to the relay selection (access) request received in step 905.

For example, the relay UE 3 may select, among UE-discovered relay UE, relay UE with a quality signal as a candidate replacement relay.

In step 907, the relay UE 3 may send a relay access request to the candidate replacement relay UE (relay UE 2).

The relay access request may include at least one of: information on an ID of the D2D UE 1; information on an ID, or a list of IDs, of target D2D UE with which the D2D UE 1 is to communicate (such as the ID of the D2D UE 2); information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QCI, an ARP, indication of 'GBR or not', a GBR, an MBR, etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

In step 908, having received the relay access request, the relay UE 2 may perform admission control to determine whether to allow the D2D UE 1 to perform, with the target D2D UE of the D2D UE 1, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

The relay UE may discover D2D UE near the relay UE 2 by monitoring a D2D discovery signal and acquire information on an ID of the D2D UE discovered. The relay UE 2 may determine, according to information on the D2D UE discovered, whether the relay UE 2 is capable of forwarding D2D communication data of the D2D UE 1 to the target D2D UE of the D2D UE 1.

In step 909, having determined to allow access by the D2D UE 1 and having determined that the relay UE 2 is capable of forwarding D2D communication data of the D2D UE 1 to the target D2D UE of the D2D UE 1, the relay UE 2 may send a relay access response to the relay UE 3.

The relay access response may include information on at least one of: an ID of the D2D UE 1; an ID, or a list of IDs, of target D2D UE of the D2D UE 1 capable of being routed via the relay UE 2 (such as the D2D UE 2); configuration for D2D communication between the D2D UE 1 and the relay UE 2; an IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

Having determined to reject access by the D2D UE 1, or having determined that the relay UE 2 is incapable of forwarding the D2D communication data to the target D2D UE of the D2D UE 1, the relay UE 2 may return a rejection to the relay UE 3.

In step 910, having received the relay access response, the relay UE 3 may return a relay selection (access) acknowledgement to the eNB.

The relay selection (access) acknowledgement may include information on at least one of: the ID of the D2D UE 1; the ID of the target relay UE; the ID, or the list of IDs, of target D2D UE of the D2D UE 1 capable of being routed via the relay UE 2 (such as the D2D UE 2); configuration for D2D communication between the D2D UE 1 and the relay UE 2; the IP address allocated by the relay UE 2 to the D2D UE 1, etc.

In step 911, the eNB may send, to the D2D UE 1, a relay UE replacing instruction instructing the D2D UE 1 to access a replacement relay UE.

The relay UE replacing instruction may include information on at least one of: the ID of the replacement D2D relay; the ID of the D2D UE 1; the ID, or the list of IDs, of target D2D UE of the D2D UE 1 capable of being routed via the replacement D2D relay (such as the D2D UE 2); configuration for D2D communication between the D2D UE 1 and the relay UE 2; the IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

In step 912, the D2D UE 1 may send, to the eNB, a relay UE replacing acknowledgment confirming to perform, with the D2D UE 2, D2D communication relayed by the relay UE 2.

In step 913, having received the relay UE replacing acknowledgment, the eNB may send, to a serving relay UE of the D2D UE 1 (namely, the relay UE 1), a relay-connection release message. Having received the relay-connection release message, the relay UE 1 may release the context information related to the relay UE 1.

The relay-connection release message may include information on at least one of: a release indication, the ID of the D2D UE 1, the ID of target D2D UE with which the D2D UE 1 is to communicate (namely, the D2D UE 2), a cause of release, etc.

The relay-connection release message may also be sent to the relay UE 1 by the relay UE 3. The eNB may send the relay-connection release message to the relay UE 3. The relay UE 3 may then forward the relay-connection release message to the relay UE 1.

Having received the relay-connection release message, the relay UE 1 may send, to the D2D UE 1, a relay-connection release message instructing the D2D UE 1 to release a connection with the relay UE 1. The relay UE 1 may determine whether to release the connection with the D2D UE 1 based on a timer maintained at the relay UE 1. Upon receiving a D2D communication packet sent by the D2D UE 1, the relay UE 1 may start or restart the timer. The relay UE 1 may release the connection with the D2D UE 1 upon expiration of a timing period of the timer. The relay UE 1 may then delete context related to the D2D UE 1.

In step 914, the D2D UE 1 may send, to the D2D UE 2 via the replacement D2D relay (the relay UE 2), information for relay update, such that the replacement D2D relay (the relay UE 2) may update relay information maintained at the D2D UE 2 according to the received information for relay update.

The information for relay update may include information on at least one of: the ID of the D2D UE 1, the ID of target D2D UE with which the D2D UE 1 is to communicate (namely the D2D UE 2), the ID of the replacement D2D relay (namely the relay UE 2), configuration for D2D communication between the D2D UE 2 and the relay UE 2, etc.

In step 915, having received the information for relay update, the D2D UE 2 may update the relay information maintained at the D2D UE 2, and send, to the D2D UE 1 via the replacement D2D relay (the relay UE 2), a relay update acknowledgement.

The relay update acknowledgement may include information on at least one of: the ID of the D2D UE 1, the ID of target D2D UE with which the D2D UE 1 is to communicate (namely the D2D UE 2), the ID of the replacement D2D relay (namely the relay UE 2), etc.

The D2D UE 2 may then perform, with the D2D UE 1, D2D communication relayed by the replacement D2D relay (namely, the relay UE 2).

Note that the solution according to the embodiment may apply to UE-to-Network relay as well. In applying the solution according to the embodiment to UE-to-Network relay, no information on the ID of the target D2D UE has to be included in an aforementioned message. No relay update is required, either. That is, there is no need to execute steps 914 and 915.

Embodiment 8

In the embodiment, D2D UE 1, D2D UE 2, relay UE 1, relay UE 2 and relay UE 3 may be D2D UE. Each of the relay UE 1, the relay UE 2 and the relay UE 3 may serve as a relay node to provide a relay service to other D2D UE. The relay UE 3 may serve as a central control node. Multiple relay UE (e.g., relay UE 1 and relay UE 2) may be connected to the central control node. The central control node may acquire relay-related information related to a relay near the central control node by monitoring a relay discovery message or broadcast information. The central control node may acquire, from a relay, relay-related information related to the relay. D2D UE may be connected to different relay UE. D2D UE may send D2D data to different target D2D UE through different relay UE. Note that a central control node may be relay UE (the relay UE 3 in the embodiment) or an eNB. The relay UE 3 may serve as the central control node in the embodiment.

Figure 10:
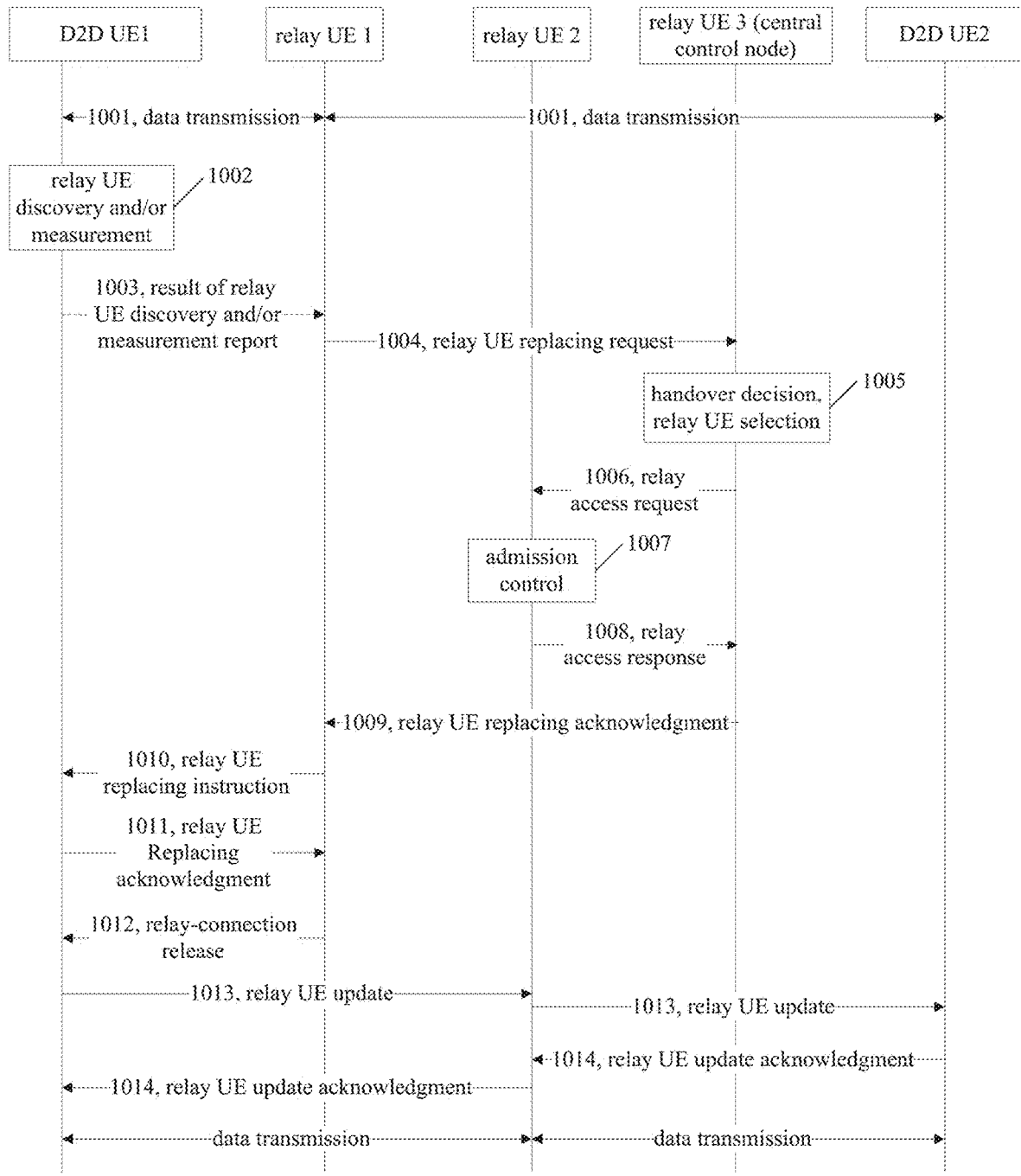
FIG. 10 is a flowchart of a method for replacing a relay according to an Embodiment 8 herein.

As shown in FIG. 10, a method for replacing a relay in UE-to-UE relay according to the embodiment may include the step(s) as follows.

In step 1001, D2D UE 1 and D2D UE 2 perform, with each other, D2D communication relayed by relay UE 1. It is determined that relay UE replacement is required for the D2D UE 1.

It may be determined that relay UE replacement is required for the D2D UE 1 as follows.

In a Mode 1, at least one of the D2D UE 1, the D2D UE 2, and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may send, by D2D broadcast and/or unicast, at least one of a low-battery indication, a relay suspending indication, a relay status indication, a relay-connection releasing indication, etc.

In a Mode 3, a BS may send a relay-discovery trigger threshold to the D2D UE 1. The relay-discovery trigger threshold may apply to measurement by the D2D UE 1 on the relay UE 1 being accessed by the D2D UE 1. In response to determining a measurement on the relay UE 1 that is lower than the relay-discovery trigger threshold, the D2D UE 1 may start D2D relay discovery.

In the Mode 1, before performing relay UE discovery and/or measurement, the D2D UE 1 may receive information on configuration of a resource used by candidate relay UE for D2D discovery sent by the relay UE 1. When relay UE discovery and/or measurement is needed, the D2D UE 1 may send a D2D-relay-UE-discovery indication to the relay UE 1. The relay UE 1 may then send, to the D2D UE 1, the information on the configuration of the resource used by candidate relay UE for D2D discovery.

The information on the configuration of the resource used for D2D discovery may include information on at least one of: a frequency, a sub-frame, a PRB, an ID of candidate relay UE, etc.

In step 1002, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on configuration of resources used by candidate relay UE for discovery and/or measurement. The information on configuration of resources may include information on a resource in a time domain and/or a frequency domain used by candidate relay UE for D2D discovery, and/or information on an ID of the candidate relay UE. The D2D UE 1 may perform relay UE discovery and/or measurement according to received information on configuration of resources.

In step 1003, the D2D UE 1 may send a result of relay UE discovery and/or a measurement report to the relay UE 1.

The result of relay UE discovery and/or the measurement report may include information on a relay ID (e.g., a ProSe ID) in a D2D relay discovery message received by the D2D UE 1 and/or a result of measurement performed by the D2D UE 1 on a received relay UE discovery message (e.g., signal intensity).

The D2D UE 1 may send information on a geolocation of the D2D UE 1 to the relay UE 1.

The D2D UE 1 may send, to the relay UE 1, at least one of: information on an ID of the D2D UE 1; information on QoS required by a communication service of the D2D UE; information on D2D security capability of the D2D UE 1; information on a D2D-security-related parameter of the D2D UE 1; information on an ID of a D2D communication group to which the D2D UE 1 belongs; a D2D relay type requested by the D2D UE 1; information on an ID of target D2D UE with which the D2D UE 1 is to communicate; information on a priority of the D2D UE 1; information on a priority of the D2D communication group to which the D2D UE 1 belongs; information on a priority of a D2D communication service of the D2D UE 1.

The D2D relay type may be UE-to-UE relay or UE-to-Network relay.

In step 1004, the relay UE 1 may determine, according to the result of relay UE discovery and/or the measurement report received, that a serving relay UE for the D2D UE 1 needs to be replaced. The relay UE 1 may send a relay UE replacing request to the central control node (the relay UE 3).

The relay UE 1 may select, for the D2D UE 1 according to the result of relay UE discovery and/or the measurement report received, one or more candidate replacement relay UE. For example, the relay UE 1 may select, among UE-discovered relay UE, relay UE with a quality signal as a candidate replacement relay.

The relay UE replacing request may include the result of relay UE discovery and/or the measurement report received by the relay UE 1 from the D2D UE 1 in step 903.

The relay UE replacing request may include at least one of: information on an ID of the D2D UE 1; information on an ID, or a list of IDs, of target D2D UE with which the D2D UE 1 is to communicate (such as the ID of the D2D UE 2); information on an ID of target (candidate) relay UE selected for the D2D UE 1; information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

In step 1005, the relay UE 1 may select no candidate replacement relay UE for the D2D UE 1, and the central control node (relay UE 3) may select a candidate replacement relay UE according to the relay UE replacing request received in step 904.

For example, the relay UE 3 may select, among UE-discovered relay UE, relay UE with a quality signal as a candidate replacement relay.

In step 1006, the relay UE 3 may send a relay access request to the candidate replacement relay UE (assumed to be the relay UE 2).

The relay access request may include at least one of: information on an ID of the D2D UE 1; information on an ID, or a list of IDs, of target D2D UE with which the D2D UE 1 is to communicate (such as the ID of the D2D UE 2); information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QCI, an ARP, indication of 'GBR or not', a GBR, an MBR, etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

In step 1007, having received the relay access request, the relay UE 2 may perform admission control to determine whether to allow the D2D UE 1 to perform, with the target D2D UE of the D2D UE 1, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

The relay UE 2 may discover D2D UE near the relay UE 2 by monitoring a D2D discovery signal and acquire information on an ID of the D2D UE discovered. The relay UE 2 may determine, according to information on the D2D UE discovered, whether the relay UE 2 is capable of forwarding D2D communication data of the D2D UE 1 to the target D2D UE of the D2D UE 1.

In step 1008, having determined to allow access by the D2D UE 1 and having determined that the relay UE 2 is capable of forwarding D2D communication data of the D2D UE 1 to the target D2D UE of the D2D UE 1, the relay UE 2 may send a relay access response to the relay UE 3.

The relay access response may include information on at least one of: an ID of the D2D UE 1; an ID, or a list of IDs, of target D2D UE of the D2D UE 1 capable of being routed via the relay UE 2 (such as the D2D UE 2); configuration for D2D communication between the D2D UE 1 and the relay UE 2; an IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

Having determined to reject access by the D2D UE 1, or having determined that the relay UE 2 is incapable of forwarding the D2D communication data to the target D2D UE of the D2D UE 1, the relay UE 2 may return a rejection to the relay UE 3.

In step 1009, having received the relay access response, the relay UE 3 may return a relay UE replacing acknowledgement to the relay UE 1.

The relay UE replacing acknowledgment may include information on at least one of: the ID of the D2D UE 1; the ID of the target relay UE; the ID, or the list of IDs, of target D2D UE of the D2D UE 1 capable of being routed via the relay UE 2 (such as the D2D UE 2); configuration for D2D communication between the D2D UE 1 and the relay UE 2; the IP address allocated by the relay UE 2 to the D2D UE 1, etc.

In step 1010, the relay UE 1 may send, to the D2D UE 1, a relay UE replacing instruction instructing the D2D UE 1 to access a replacement relay UE.

The relay UE replacing instruction may include information on at least one of: the ID of the replacement D2D relay; the ID of the D2D UE 1; the ID, or the list of IDs, of target D2D UE of the D2D UE 1 capable of being routed via the replacement D2D relay (such as the D2D UE 2); configuration for D2D communication between the D2D UE 1 and the relay UE 2; the IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

In step 1011, the D2D UE 1 may send, to the relay UE 1, a relay UE replacing acknowledgment confirming to perform, with the D2D UE 2, D2D communication relayed by the relay UE 2.

In step 1012, having received the relay UE replacing acknowledgement, the relay UE 1 may release a connection with the D2D UE 1.

The relay UE 1 may send a relay-connection release message to the D2D UE 1. The D2D UE 1 (or the relay UE 1) may release the connection between the relay UE 1 and the D2D UE 1 upon expiration of a timing period of a timer maintained at the D2D UE 1 (or the relay UE 1).

Upon receiving a D2D communication packet sent by the D2D UE 1 (or the relay UE 1), the relay UE 1 (or the D2D UE 1) may start or restart the local timer. The relay UE 1 (or the D2D UE 1) may release the connection between the relay UE 1 and the D2D UE 1 upon expiration of the timing period of the local timer. The relay UE 1 (or the D2D UE 1) may then delete context related to the D2D UE 1.

The relay-connection release message may include information on at least one of: a release indication, the ID of the D2D UE 1, the ID of target D2D UE with which the D2D UE 1 is to communicate (namely, the D2D UE 2), a cause of release, etc. The relay-connection release message may be sent to the relay UE 1 by the central control node (the relay UE 3), and then forwarded or relayed to the D2D UE 1 by the relay UE 1.

In step 1013, the D2D UE 1 may send, to the D2D UE 2 via the replacement D2D relay (the relay UE 2), information for relay update, such that the replacement D2D relay (the relay UE 2) may update relay information maintained at the D2D UE 2 according to the received information for relay update.

The information for relay update may include information on at least one of: the ID of the D2D UE 1, the ID of target D2D UE with which the D2D UE 1 is to communicate (namely the D2D UE 2), the ID of the replacement D2D relay (namely the relay UE 2), configuration for D2D communication between the D2D UE 2 and the relay UE 2, etc.

In step 1014, having received the information for relay update, the D2D UE 2 may update the relay information maintained at the D2D UE 2, and send, to the D2D UE 1 via the replacement D2D relay (the relay UE 2), a relay update acknowledgement.

The relay update acknowledgement may include information on at least one of: the ID of the D2D UE 1, the ID of target D2D UE with which the D2D UE 1 is to communicate (namely the D2D UE 2), the ID of the replacement D2D relay (namely the relay UE 2), etc.

The D2D UE 2 may then perform, with the D2D UE 1, D2D communication relayed by the replacement D2D relay (namely, the relay UE 2).

Note that the solution according to the embodiment may apply to UE-to-Network relay as well. In applying the solution according to the embodiment to UE-to-Network relay, no information on the ID of the target D2D UE has to be included in an aforementioned message. No relay update is required, either. That is, there is no need to execute steps 1013 and 1014.

Embodiment 9

In the embodiment, D2D UE 1, D2D UE 2, relay UE 1, and relay UE 2 may be D2D UE. Each of the relay UE 1 and the relay UE 2 may serve as a relay node to provide a relay service to other D2D UE. D2D UE may be connected to different relay UE. D2D UE may send D2D data to different target D2D UE through different relay UE.

Figure 11:
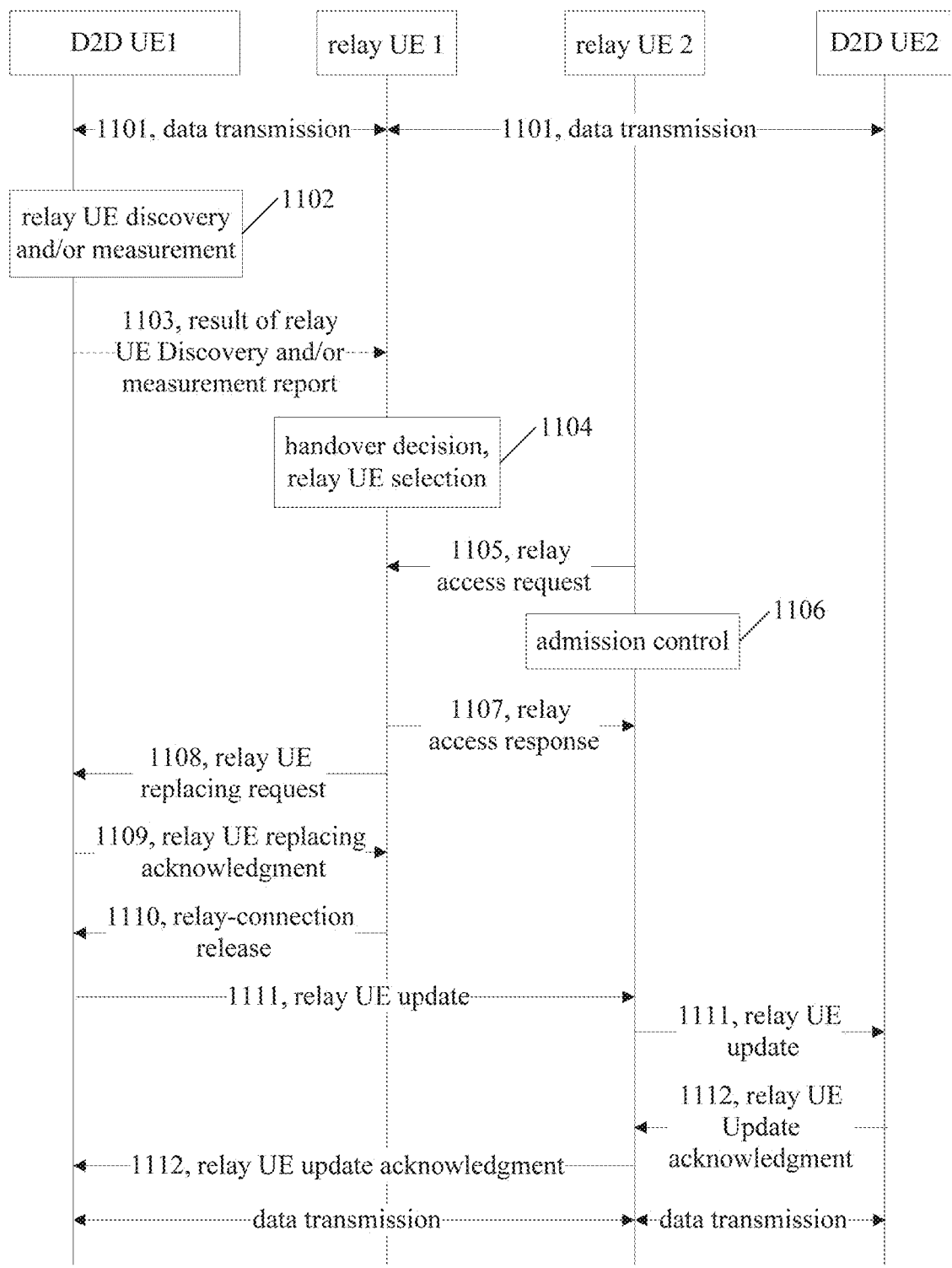
FIG. 11 is a flowchart of a method for replacing a relay according to an Embodiment 9 herein.

As shown in FIG. 11, a method for replacing a relay in UE-to-UE relay according to the embodiment may include the step(s) as follows.

In step 1101, D2D UE 1 and D2D UE 2 perform, with each other, D2D communication relayed by relay UE 1. It is determined that relay UE replacement is required for the D2D UE 1.

It may be determined that relay UE replacement is required for the D2D UE 1 as follows.

In a Mode 1, at least one of the D2D UE 1, the D2D UE 2, and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may send, by D2D broadcast and/or unicast, at least one of a low-battery indication, a relay suspending indication, a relay status indication, a relay-connection releasing indication, etc.

In the Mode 1, before performing relay UE discovery and/or measurement, the D2D UE 1 may receive, such as via SIBs, information on configuration of a resource used by candidate relay UE for D2D discovery sent by a BS. When relay UE discovery is needed, the D2D UE 1 may send a D2D-relay-UE-discovery indication to a BS. The BS may then send, to the D2D UE 1, the information on the configuration of the resource used by candidate relay UE for D2D discovery.

The information on the configuration of the resource used for D2D discovery may include information on at least one of: a frequency, a sub-frame, a PRB, an ID of candidate relay UE, etc.

In step 1102, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on configuration of resources used by candidate relay UE for discovery and/or measurement. The information on configuration of resources may include information on a resource in a time domain and/or a frequency domain used by candidate relay UE for D2D discovery, and/or information on an ID of the candidate relay UE. The D2D UE 1 may perform relay UE discovery and/or measurement according to received information on configuration of resources.

In step 1103, the D2D UE 1 may send a result of relay UE discovery and/or a measurement report to the relay UE 1.

The result of relay UE discovery and/or the measurement report may include information on a relay ID (e.g., a ProSe ID) in a D2D relay discovery message received by the D2D UE 1 and/or a result of measurement performed by the D2D UE 1 on a received relay UE discovery message (e.g., signal intensity).

The D2D UE 1 may send information on a geolocation of the D2D UE 1 to the relay UE 1.

The D2D UE 1 may send, to the relay UE 1, at least one of: information on an ID of the D2D UE 1; information on QoS required by a communication service of the D2D UE; information on D2D security capability of the D2D UE 1; information on a D2D-security-related parameter of the D2D UE 1; information on an ID of a D2D communication group to which the D2D UE 1 belongs; a D2D relay type requested by the D2D UE 1; information on an ID of target D2D UE with which the D2D UE 1 is to communicate; information on a priority of the D2D UE 1; information on a priority of the D2D communication group to which the D2D UE 1 belongs; information on a priority of a D2D communication service of the D2D UE 1.

The D2D relay type may be UE-to-UE relay or UE-to-Network relay.

In step 1104, the relay UE 1 may determine, according to the result of relay UE discovery and/or the measurement report, that a serving relay UE for the D2D UE 1 needs to be replaced.

The relay UE 1 may select, for the D2D UE 1 according to the result of relay UE discovery and/or the measurement report sent by the D2D UE 1, one or more candidate replacement relay UE. For example, the relay UE 1 may select, among UE-discovered relay UE, relay UE with a quality signal as a candidate replacement relay.

The relay UE 2 may discover D2D UE near the relay UE 2 by monitoring a D2D discovery signal and acquire information on an ID of the D2D UE discovered.

In step 1105, the relay UE 1 may send a relay access request to the candidate replacement relay UE (assumed to be the relay UE 2).

The relay access request may include the result of relay UE discovery and/or the measurement report received by the relay UE 1 from the D2D UE 1 in step 1003.

The relay access request may include at least one of: information on an ID of the D2D UE 1; information on an ID, or a list of IDs, of target D2D UE with which the D2D UE 1 is to communicate (such as the ID of the D2D UE 2); information on an ID of target (candidate) relay UE selected for the D2D UE 1; information on QoS required by a communication service of the D2D UE; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

In step 1106, having received the relay access request, the relay UE 2 may perform admission control to determine whether to allow the D2D UE 1 to perform, with the target D2D UE of the D2D UE 1, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

The relay UE 2 may discover D2D UE near the relay UE 2 by monitoring a D2D discovery signal and acquire information on an ID of the D2D UE discovered. The relay UE 2 may determine, according to information on the D2D UE discovered, whether the relay UE 2 is capable of forwarding D2D communication data of the D2D UE 1 to the target D2D UE of the D2D UE 1.

In step 1107, having determined to allow access by the D2D UE 1 and having determined that the relay UE 2 is capable of forwarding D2D communication data of the D2D UE 1 to the target D2D UE of the D2D UE 1, the relay UE 2 may send a relay access response to the relay UE 1.

The relay access response may include information on at least one of: an ID of the D2D UE 1; an ID, or a list of IDs, of target D2D UE of the D2D UE 1 capable of being routed via the relay UE 2 (such as the D2D UE 2); configuration for D2D communication between the D2D UE 1 and the relay UE 2; an IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

Having determined to reject access by the D2D UE 1, or having determined that the relay UE 2 is incapable of forwarding the D2D communication data to the target D2D UE of the D2D UE 1, the relay UE 2 may return a rejection to the relay UE 1.

In step 1108, having received the relay access response, the relay UE 1 may send, to the D2D UE 1, a relay UE replacing instruction instructing the D2D UE 1 to access a replacement relay UE.

The relay UE replacing instruction may include information on at least one of: the ID of the replacement D2D relay; the ID of the D2D UE 1; the ID, or the list of IDs, of target D2D UE of the D2D UE 1 capable of being routed via the replacement D2D relay (such as the D2D UE 2); configuration for D2D communication between the D2D UE 1 and the relay UE 2; the IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

In step 1109, the D2D UE 1 may send, to the relay UE 1, a relay UE replacing acknowledgment confirming to perform, with the D2D UE 2, D2D communication relayed by the relay UE 2.

In step 1110, having received the relay UE replacing acknowledgement, the relay UE 1 may release a connection with the D2D UE 1.

The relay UE 1 may send a relay-connection release message to the D2D UE 1. The D2D UE 1 (or the relay UE 1) may release the connection between the relay UE 1 and the D2D UE 1 upon expiration of a timing period of a timer maintained at the D2D UE 1 (or the relay UE 1). Upon receiving a D2D communication packet sent by the D2D UE 1 (or the relay UE 1), the relay UE 1 (or the D2D UE 1) may start or restart the local timer. The relay UE 1 (or the D2D UE 1) may release the connection between the relay UE 1 and the D2D UE 1 upon expiration of the timing period of the local timer. The relay UE 1 (or the D2D UE 1) may then delete context related to the D2D UE 1.

The relay-connection release message may include information on at least one of: a release indication, the ID of the D2D UE 1, the ID of target D2D UE with which the D2D UE 1 is to communicate (namely, the D2D UE 2), a cause of release, etc.

In step 1111, the D2D UE 1 may send, to the D2D UE 2 via the replacement D2D relay (the relay UE 2), information for relay update, such that the replacement D2D relay (the relay UE 2) may update relay information maintained at the D2D UE 2 according to the received information for relay update.

The information for relay update may include information on at least one of: the ID of the D2D UE 1, the ID of target D2D UE with which the D2D UE 1 is to communicate (namely the D2D UE 2), the ID of the replacement D2D relay (namely the relay UE 2), configuration for D2D communication between the D2D UE 2 and the relay UE 2, etc.

In step 1112, having received the information for relay update, the D2D UE 2 may update the relay information maintained at the D2D UE 2, and send, to the D2D UE 1 via the replacement D2D relay (the relay UE 2), a relay update acknowledgement.

The relay update acknowledgement may include information on at least one of: the ID of the D2D UE 1, the ID of target D2D UE with which the D2D UE 1 is to communicate (namely the D2D UE 2), the ID of the replacement D2D relay (namely the relay UE 2), etc.

The D2D UE 2 may then perform, with the D2D UE 1, D2D communication relayed by the replacement D2D relay (namely, the relay UE 2).

Note that the solution according to the embodiment may apply to UE-to-Network relay as well. In applying the solution according to the embodiment to UE-to-Network relay, no information on the ID of the target D2D UE has to be included in an aforementioned message. No relay update is required, either. That is, there is no need to execute steps 1111 and 1112.

Embodiment 10

In the embodiment, D2D UE 1, relay UE 1, and relay UE 2 may be D2D UE covered by a cellular communication network. Each of the relay UE 1 and the relay UE 2 may serve as a relay node to provide a relay service to other D2D UE.

Figure 12:
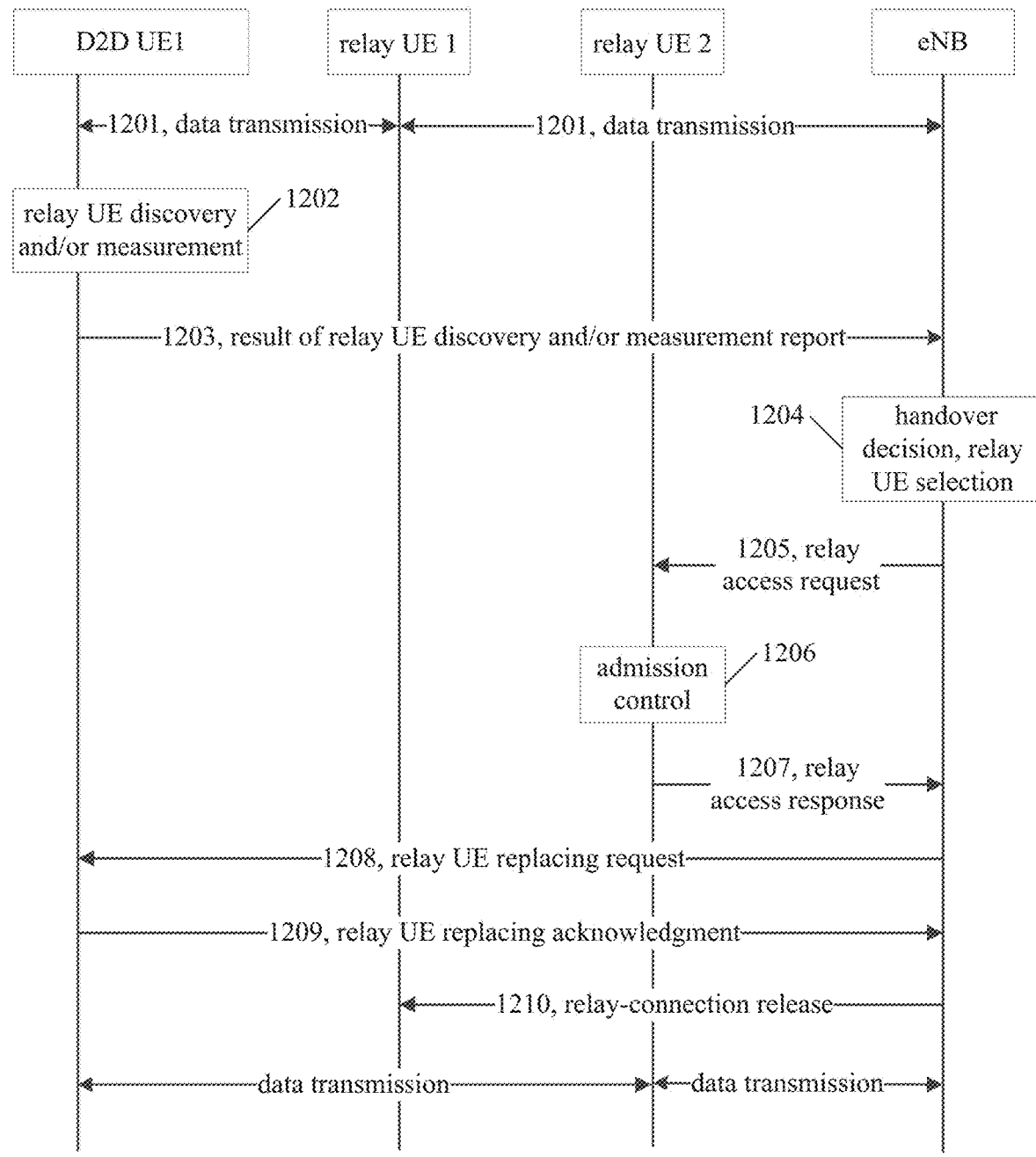
FIG. 12 is a flowchart of a method for replacing a relay according to an Embodiment 10 herein.

As shown in FIG. 12, a method for replacing a relay in UE-to-UE relay according to the embodiment may include the step(s) as follows.

In step 1201, the D2D UE 1 may perform communication by accessing a cellular network via the relay UE 1. It is determined that relay UE replacement is required for the D2D UE 1.

It may be determined that relay UE replacement is required for the D2D UE 1 as follows.

In a Mode 1, at least one of the D2D UE 1 and the relay UE 1 may have moved. The D2D UE 1 may detect deterioration of quality of a signal between the D2D UE 1 and the relay UE 1. A replacement relay has to be found for the D2D UE 1. Relay UE discovery and/or measurement may be performed.

In a Mode 2, the relay UE 1 may trigger relay UE replacement by the D2D UE 1. For instance, a battery level at the relay UE 1 may run low. The relay UE 1 may trigger relay UE replacement by the D2D UE 1 by sending, to the D2D UE 1 by D2D broadcast and/or unicast, at least one of a low-battery indication, a relay suspending indication, a relay status indication, a relay-connection releasing indication, etc. That is, the D2D UE 1 is triggered to execute relay UE discovery and/or measurement.

In a Mode 3, a BS may send a relay-discovery trigger threshold to the D2D UE 1. The relay-discovery trigger threshold may apply to measurement by the D2D UE 1 on the relay UE 1 being accessed by the D2D UE 1. In response to determining a measurement on the relay UE 1 that is lower than the relay-discovery trigger threshold, the D2D UE 1 may start D2D relay discovery.

In the Mode 1, before performing relay UE discovery and/or measurement, the D2D UE 1 may receive, such as via SIBs, information on configuration of a resource used by candidate relay UE for D2D discovery sent by a BS. When relay UE discovery is needed, the D2D UE 1 may send a D2D-relay-UE-discovery indication to a BS. The BS may then send, to the D2D UE 1, the information on the configuration of the resource used by candidate relay UE for D2D discovery.

The information on the configuration of the resource used for D2D discovery may include information on at least one of: a frequency, a sub-frame, a PRB, an ID of candidate relay UE, etc.

In step 1202, the D2D UE 1 may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE 1 may acquire, from a BS or a ProSe function, information on configuration of resources used by candidate relay UE for discovery and/or measurement. The information on configuration of resources may include information on a resource in a time domain and/or a frequency domain used by candidate relay UE for D2D discovery, and/or information on an ID of the candidate relay UE. The D2D UE 1 may perform relay UE discovery and/or measurement according to received information on configuration of resources.

In step 1203, the D2D UE 1 may send a result of relay UE discovery and/or a measurement report to an eNB.

The result of relay UE discovery and/or the measurement report may include information on a relay ID (e.g., a ProSe ID) in a D2D relay discovery message received by the D2D UE 1 and/or a result of measurement performed by the D2D UE 1 on a received relay UE discovery message (e.g., signal intensity).

The D2D UE 1 may send information on a geolocation of the D2D UE 1 to the eNB.

The D2D UE 1 may send, to the eNB, at least one of: information on an ID of the D2D UE 1; information on QoS required by a communication service of the D2D UE 1; information on D2D security capability of the D2D UE 1; information on a D2D-security-related parameter of the D2D UE 1; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1, etc. The D2D relay type may be UE-to-UE relay or UE-to-Network relay.

In step 1204, the eNB may select, for the D2D UE 1 according to the result of relay UE discovery and/or the measurement report received, one or more candidate replacement relay UE.

For example, the eNB may select, among UE-discovered relay UE, relay UE with a quality signal as a candidate replacement relay.

It may be assumed that the candidate replacement relay is relay UE 2.

In step 1205, the eNB may send a relay access request to the relay UE 2.

The relay access request may include at least one of: information on an ID of the D2D UE 1; information on QoS required by a communication service of the D2D UE 1; information on D2D security capability of the D2D UE; information on a D2D-security-related parameter of the D2D UE; information on an ID of a D2D communication group to which the D2D UE 1 belongs; a D2D relay type requested by the D2D UE 1; information on a priority of the D2D UE 1; information on a priority of the D2D communication group to which the D2D UE 1 belongs; information on a priority of a D2D communication service of the D2D UE 1; and information on configuration for D2D communication between the relay UE 2 and the D2D UE 1.

The information on QoS required by the communication service of the D2D UE may include information on at least one of: a QCI, an ARP, indication of 'GBR or not', a GBR, an MBR, etc.

The D2D relay type requested by the D2D UE 1 may be UE-to-UE relay or UE-to-Network relay.

The information on the configuration for D2D communication between the D2D UE 1 and the relay UE 2 may include information on configuration of a bearer of the D2D communication and/or security related configuration.

In step 1206, having received the relay access request, the relay UE 2 may perform admission control to determine whether to allow the D2D UE 1 to perform, with the target D2D UE of the D2D UE 1, D2D communication relayed by the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE 1.

In step 1207, having determined to allow access by the D2D UE 1, the relay UE 2 may send a relay access response to the eNB.

The relay access response may include information on at least one of: an ID of the D2D UE 1; configuration for D2D communication between the D2D UE 1 and the relay UE 2; an IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

Having determined to reject access by the D2D UE 1, the relay UE 2 may return a rejection to the eNB. The eNB may select other candidate relay UE for the D2D UE 1.

In step 1208, having received the relay access response, the eNB may send, to the D2D UE 1, a relay UE replacing instruction instructing the D2D UE 1 to access a replacement relay UE.

The relay UE replacing instruction may include information on at least one of: the ID of the replacement D2D relay (namely the relay UE 2); the ID of the D2D UE 1; configuration for D2D communication between the D2D UE 1 and the relay UE 2; the IP address allocated by the relay UE 2 to the D2D UE 1, etc.

The information on the configuration for D2D communication between the D2D UE 1 and the relay UE 2 may include information on configuration of a bearer of the D2D communication and/or security related configuration.

In step 1209, the D2D UE 1 may send, to the eNB, a relay UE replacing acknowledgment confirming to perform communication by accessing the cellular network via the relay UE 2.

In step 1210, having received the relay UE replacing acknowledgment, the eNB may send, to a serving relay UE of the D2D UE 1 (namely, the relay UE 1), a relay-connection release message. Having received the relay-connection release message, the relay UE 1 may release the context information related to the relay UE 1.

The relay-connection release message may include information on at least one of: a release indication, the ID of the D2D UE 1, a cause of release, etc.

Having received the relay-connection release message, the relay UE 1 may send, to the D2D UE 1, a relay-connection release message instructing the D2D UE 1 to release a connection with the relay UE 1. The relay UE 1 may determine whether to release the connection with the D2D UE 1 based on a timer maintained at the relay UE 1. Upon receiving a D2D communication packet sent by the D2D UE 1, the relay UE 1 may start or restart the timer. The relay UE 1 may release the connection with the D2D UE 1 upon expiration of a timing period of the timer. The relay UE 1 may then delete context related to the D2D UE 1.

Embodiment 11

In the embodiment, relay UE 1 and relay UE 2 may be covered by a cellular communication network. D2D UE may be at the edge of, or outside, a covered area of the cellular communication network. Each of the relay UE 1 and the relay UE 2 may serve as a relay node to provide a relay service to other D2D UE.

Figure 13:
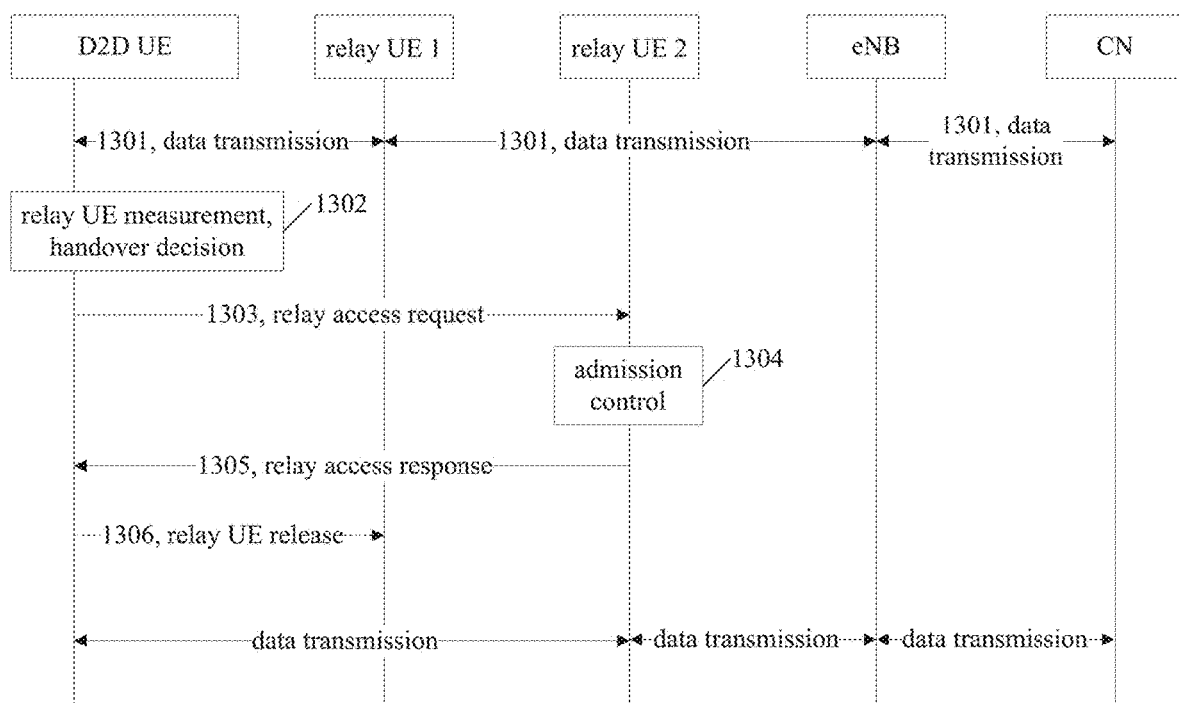
FIG. 13 is a flowchart of a method for replacing a relay according to an Embodiment 11 herein.

As shown in FIG. 13, a method for replacing a relay in UE-to-UE relay according to the embodiment may include the step(s) as follows.

In step 1301, the D2D UE may perform communication by accessing a cellular network (including an eNB and a Core Network, CN, as shown in FIG. 13) via the relay UE 1. It is determined that relay UE replacement is required for the D2D UE.

It may be determined that relay UE replacement is required for the D2D UE as follows.

In a Mode 1, at least one of the D2D UE and the relay UE 1 may have moved. The D2D UE may detect deterioration of quality of a signal between the D2D UE and the relay UE 1. A replacement relay has to be found for the D2D UE. Relay UE discovery and/or measurement may be performed.

In a Mode 2, the relay UE 1 may trigger relay UE replacement by the D2D UE. For instance, a battery level at the relay UE 1 may run low. The relay UE 1 may trigger relay UE replacement by the D2D UE by sending, to the D2D UE by D2D broadcast and/or unicast, at least one of a low-battery indication, a relay suspending indication, a relay status indication, a relay-connection releasing indication, etc.

In step 1302, the D2D UE may perform relay UE discovery and/or measurement.

Relay UE discovery and/or measurement may be performed in a Model A or a Model B. In the Model A, relay UE may broadcast a D2D discovery message. The D2D discovery message may include information on at least one of: the ID of the relay UE, an ID of a PLMN to which a radio carrier frequency used for D2D communication between D2D UE and the relay UE belongs. The D2D discovery message may include connection-related information that identifies connection information available at UE-to-Network relay UE, such as information on an APN. The D2D discovery message may include information on a relay status (e.g., relay-suspended, low-battery, etc.). In the Model B, D2D UE may broadcast a relay-discovering message. Having received the broadcasted relay-discovering message, candidate relay UE may send, to the D2D UE, a response.

Before performing relay UE discovery, the D2D UE may acquire, from a BS or a ProSe function, information on relay discovery and/or measurement configuration for discovering, and/or performing measurement on, a candidate D2D relay. The information on relay discovery and/or measurement configuration may include information on a resource in a time domain and/or a frequency domain used by candidate relay UE for D2D discovery, and/or information on an ID of the candidate relay UE. The D2D UE 1 may perform relay UE discovery and/or measurement according to the received information on relay discovery and/or measurement configuration.

In step 1303, the relay UE 1 may send a relay access request to a replacement relay UE (namely, the relay UE 2).

The relay access request may include at least one of: information on an ID of the D2D UE; information on QoS required by a communication service of the D2D UE; information on D2D security capability of the D2D UE; information on a D2D-security-related parameter of the D2D UE; information on an ID of a D2D communication group to which the D2D UE belongs; a D2D relay type requested by the D2D UE; information on a priority of the D2D UE; information on a priority of the D2D communication group to which the D2D UE belongs; information on a priority of a D2D communication service of the D2D UE; and information on configuration for D2D communication between the relay UE 2 and the D2D UE.

The information on QoS required by the communication service of the D2D UE may include information on at least one of: a QCI, an ARP, indication of 'GBR or not', a GBR, an MBR, etc.

The D2D relay type requested by the D2D UE may be UE-to-UE relay or UE-to-Network relay.

The information on the configuration for D2D communication between the D2D UE and the relay UE 2 may include information on configuration of a bearer of the D2D communication and/or security related configuration.

In step 1304, having received the relay access request, the relay UE 2 may perform admission control to determine whether to allow the D2D UE to perform communication by accessing the cellular network via the relay UE 2.

The relay UE 2 may determine, according to information on relay capacity of the relay UE 2, transceiving capability of the relay UE 2, a number of D2D UE accessing the relay UE 2, a priority of the relay UE 2, and QoS required by the communication service of the D2D UE, whether to allow access by the D2D UE.

In step 1305, having determined to allow access by the D2D UE, the relay UE 2 may send a relay access response to the D2D UE.

The relay access response may include information on at least one of: an ID of the D2D UE; configuration for D2D communication between the D2D UE and the relay UE 2, etc.

The information on the configuration for D2D communication between the D2D UE and the relay UE 2 may include information on configuration of a bearer of the D2D communication and/or security related configuration.

Having determined to reject access by the D2D UE, the relay UE 2 may return a rejection to the D2D UE. The D2D UE may select other candidate relay UE for the D2D UE.

In step 1306, having received the relay access response, the D2D UE may send, to a serving relay UE of the D2D UE (namely, the relay UE 1), a relay-connection release message. Having received the relay-connection release message, the relay UE 1 may release the context information related to the relay UE 1.

The relay-connection release message may include information on at least one of: a release indication, the ID of the D2D UE, a cause of release, etc.

The relay UE 1 may determine whether to release the connection with the D2D UE based on a timer maintained at the relay UE 1. Upon receiving a D2D communication packet sent by the D2D UE, the relay UE 1 may start or restart the timer. The relay UE 1 may release the connection with the D2D UE upon expiration of a timing period of the timer. The relay UE 1 may then delete context related to the D2D UE.

The step is optional.

Embodiment 12

Figure 14:
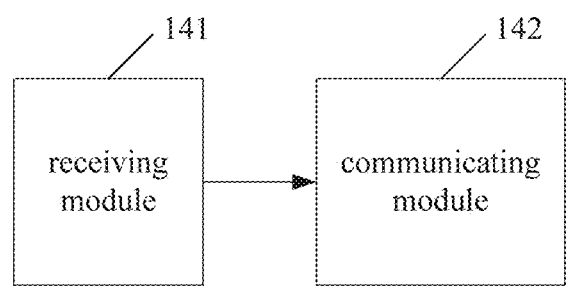
FIG. 14 is a diagram of a structure of D2D UE according to an Embodiment 12 herein.
Figure 15:
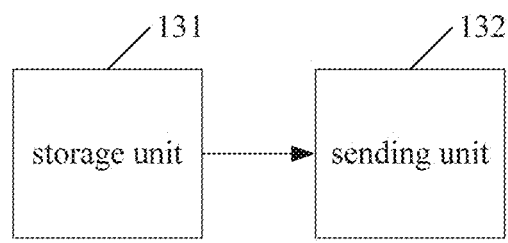
FIG. 15 is a diagram of a structure of a control node according to an Embodiment 12 herein.

As shown in FIG. 14, D2D UE according to the embodiment, which may be first D2D UE, includes a receiving module 141 and a communicating module 142.

The receiving module 141 is arranged for: receiving a relay replacing indication sent by a control node instructing to replace a serving D2D relay.

The communicating module 142 is arranged for: performing communication via a replacement D2D relay according to the relay replacing indication.

The control node may be a Base Station (BS), a D2D relay, a Proximity Service functional entity (ProSe function), a Proximity Service (ProSe) application server, a D2D relay managing Network Element (NE), etc.

The relay replacing indication may include at least one of: information on an identification (ID) of the first D2D UE; information on an ID of second D2D UE; information on an ID of the replacement D2D relay; information on configuration for D2D communication between the replacement D2D relay and the first D2D UE and/or the second D2D UE; a relay status indication; a relay suspending indication; a relay-connection releasing indication; and an Internet Protocol (IP) address allocated by the replacement D2D relay to the first D2D UE. The second D2D UE may be target D2D UE with which the first D2D UE is to communicate.

The communicating module 142 may be arranged for performing communication by accessing a cellular network via the replacement D2D relay. The communicating module 142 may be arranged for performing D2D communication with second D2D UE via the replacement D2D relay.

The communicating module may be further arranged for: before performing D2D communication with the second D2D UE via the replacement D2D relay, sending, to the second D2D UE via the replacement D2D relay, information for relay update, such that the second D2D UE may update relay information maintained at the second D2D UE accordingly.

The control node may send, to the second D2D UE, information for relay update. The second D2D UE may update relay information maintained at the second D2D UE according to the information for relay update.

The replacement D2D relay may send information for relay update to the target D2D UE. The second D2D UE may update relay information maintained at the second D2D UE according to the information for relay update.

The information for relay update may include at least one of: information on an identification (ID) of the first D2D UE, information on an ID of the second D2D UE, information on an ID of the replacement D2D relay, and information on configuration for D2D communication between the second D2D UE and the replacement D2D relay.

The replacement D2D relay may return a relay update acknowledgement to the first D2D UE. The receiving module 141 may be further arranged for: receiving, via the replacement D2D relay, a relay update acknowledgement returned by the second D2D UE.

The information for relay update may include information on at least one of: the ID of the first D2D UE, the ID of the second D2D UE, the ID of the replacement D2D relay, etc.

After receiving the information for relay update, the second D2D UE may perform D2D communication with the first D2D UE via the replacement D2D relay.

The D2D UE may further include a sending module (not shown in FIG. 14). The sending module may be arranged for: sending, to the control node, D2D-relay-related information, for determining, by the control node, the replacement D2D relay.

The D2D-relay-related information may be a result of D2D relay discovery or information measured for a D2D relay.

The D2D-relay-related information may include at least one of:

information on a D2D relay discovered by the first D2D UE; a result of measuring, by the first D2D UE, a received D2D relay discovery message; information on a geolocation of the first D2D UE; information on an ID of the first D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on an ID of target D2D UE with which the first D2D UE is to communicate; information on a priority of the first D2D UE; information on a priority of the D2D communication group to which the first D2D UE belongs; information on a priority of a D2D communication service of the first D2D UE.

The receiving module 141 may be further arranged for: before the D2D-relay-related information is sent to the control node, receiving information on relay discovery and/or measurement configuration sent by the control node for discovering, and/or performing measurement on, a candidate D2D relay.

The sending module may be further arranged for: determining the D2D-relay-related information according to the information on the relay discovery and/or measurement configuration.

The D2D UE may further include a discovering module (not shown in FIG. 14).

The receiving module may be further arranged for: before the D2D-relay-related information may be sent to the control node, receiving a relay-discovery trigger threshold sent by the control node. The relay-discovery trigger threshold may apply to measurement by the D2D UE on the serving D2D relay being accessed by the D2D UE.

The discovering module may be arranged for: in response to determining a measurement on the serving D2D relay that is lower than the relay-discovery trigger threshold, starting D2D relay discovery.

The sending module may be further arranged for: after the relay replacing indication is received, returning, to the control node, a relay replacing acknowledgement.

The information on the relay discovery and/or measurement configuration may include at least one of:
information on a resource or a resource pool in a time domain and/or a frequency domain used by the candidate D2D relay for D2D discovery, and information on an identification (ID) of the candidate D2D relay.

The receiving module 141, the communicating module 142, the sending module and the discovering module may be implemented by at least one of a Central Processing Unit (CPU), a Micro Processing Unit (MCU), a Digital Signal Processor (DSP), a Field-Programmable Gate Array (FPGA), a transceiver, etc., in the first D2D UE.

As shown in FIG. 5, a control node according to an embodiment herein includes a storing unit 151 and a sending unit 152.

The storing unit 151 is arranged for storing a relay replacing indication,

The sending unit 152 is arranged for: sending, to first Device-to-Device (D2D) User Equipment (UE), the relay replacing indication, so that the first D2D UE performs communication via a replacement D2D relay according to the relay replacing indication.

The control node may be a Base Station (BS), a D2D relay, a Proximity Service functional entity (ProSe function), a Proximity Service (ProSe) application server, a D2D relay managing Network Element (NE), etc.

The relay replacing indication may include at least one of:
information on an identification (ID) of the first D2D UE; information on an ID of second D2D UE; information on an ID of the replacement D2D relay; information on configuration for D2D communication between the replacement D2D relay and the first D2D UE and/or the second D2D UE; a relay status indication; a relay suspending indication; a relay-connection releasing indication; and an Internet Protocol (IP) address allocated by the replacement D2D relay to the first D2D UE. The second D2D UE may be target D2D UE with which the first D2D UE is to communicate.

The control node may further include a determining unit (not shown in FIG. 5). The determining unit may be arranged for determining, according to D2D-relay-related information, the replacement D2D relay. The determining unit may be arranged for determining that the first D2D UE is allowed to perform D2D communication relayed by the replacement D2D relay.

The control node may further include a receiving unit (not shown in FIG. 5). The receiving unit may be arranged for: before the replacement D2D relay is determined, receiving the D2D-relay-related information sent by the first D2D UE.

The D2D-relay-related information may be a result of D2D relay discovery or information measured for a D2D relay.

The D2D-relay-related information may include at least one of:
information on a D2D relay discovered by the first D2D UE; a result of measuring, by the first D2D UE, a received D2D relay discovery message; information on a geolocation of the first D2D UE; information on an ID of the first D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on an ID of second D2D UE; information on a priority of the first D2D UE; information on a priority of the D2D communication group to which the first D2D UE belongs; information on a priority of a D2D communication service of the first D2D UE.

The first D2D UE may discover the information on the D2D relay according to a received D2D relay discovery message.

The sending unit 151 may be further arranged for: before the D2D-relay-related information sent by the first D2D UE is received, sending, to the first D2D UE, information on relay discovery and/or measurement configuration for discovering, and/or performing measurement on, a candidate D2D relay, such that the first D2D UE may determine the D2D-relay-related information according to the information on the relay discovery and/or measurement configuration.

The information on the relay discovery and/or measurement configuration may include at least one of:
information on a resource or a resource pool in a time domain and/or a frequency domain used by the candidate D2D relay for D2D discovery, information on an identification (ID) of the candidate D2D relay, etc.

The sending unit 151 may be arranged for sending, to the first D2D UE, the information on the relay discovery and/or measurement configuration via an interface-Uu system message, Radio Resource Control (RRC) dedicated signaling, and/or a PC5 interface.

The sending unit 151 may be further arranged for: before the D2D-relay-related information sent by the first D2D UE is received, sending, to the first D2D UE, a relay-discovery trigger threshold. The relay-discovery trigger threshold may apply to measurement by the first D2D UE on the serving D2D relay being accessed by the first D2D UE. The first D2D UE may start D2D relay discovery according to the relay-discovery trigger threshold.

The determining unit may determine that the first D2D UE is allowed to perform D2D communication relayed by the replacement D2D relay as follows.

The determining unit may determine that the first D2D UE may perform D2D communication relayed by the replacement D2D relay, by interacting with the replacement D2D relay, or by interacting with a central control node and the replacement D2D relay.

The sending unit 151 may be further arranged for: sending, to the second D2D UE, information for relay update. The second D2D UE may then update relay information maintained at the second D2D UE accordingly.

The information for relay update may include at least one of: information on an identification (ID) of the first D2D UE, information on an ID of the second D2D UE, information on an ID of the replacement D2D relay, information on configuration for D2D communication between the second D2D UE and the replacement D2D relay, etc.

A D2D relay may serve as the central control node, to acquire relay-related information related to a D2D relay near the central control node. The relay-related information related to a relay may include a relay type of the relay, a relay status of the relay, information on a geolocation of the relay, D2D UE connected to the relay, and information on a load of the relay. The central control node may acquire relay-related information related to a relay near the central control node by monitoring a relay discovery message or broadcast information. The central control node may acquire, from a relay, relay-related information related to the relay.

The determining unit may determine that the first D2D UE may perform D2D communication relayed by the replacement D2D relay by interacting with the replacement D2D relay as follows.

The determining unit may send, to the replacement D2D relay, a relay access request.

The determining unit may receive a relay access response returned by the replacement D2D relay indicating that the replacement D2D relay allows the first D2D UE to perform D2D communication relayed by the replacement D2D relay.

The relay access response may include an Internet Protocol (IP) address allocated by the replacement D2D relay to the D2D UE.

The determining unit may determine that the first D2D UE may perform D2D communication relayed by the replacement D2D relay by interacting with the central control node and the replacement D2D relay as follows.

The determining unit may send, to the central control node, a relay access request.

The determining unit may receive a relay access response sent by the central control node.

The replacement D2D relay may receive a relay access request sent by the central control node. The replacement D2D relay may determine that the replacement D2D relay allows the first D2D UE to perform D2D communication relayed by the replacement D2D relay. The replacement D2D relay may return the relay access response to the central control node.

The relay access request may include at least one of: information on an identification (ID) of the first D2D UE; information on an ID, or a list of IDs, of a second D2D UE; information on Quality of Service (QoS) required by a communication service of the first D2D UE; information on D2D security capability of the first D2D UE; information on a D2D-security-related parameter of the first D2D UE; information on an ID of a D2D communication group to which the first D2D UE belongs; a D2D relay type requested by the first D2D UE; information on a priority of the first D2D UE; information on a priority of the D2D communication group to which the first D2D UE belongs; information on a priority of a D2D communication service of the first D2D UE; and information on configuration for D2D communication between the replacement D2D relay and the first D2D UE.

The information on the configuration for D2D communication may include at least one of: information on configuration of a bearer of the D2D communication between the replacement D2D relay and the first D2D UE, and information on security related configuration.

The relay access response may include an Internet Protocol (IP) address allocated by the replacement D2D relay to the first D2D UE.

The relay access response may include at least one of: information on an identification (ID) of the first D2D UE, information on an ID, or a list of IDs, of target D2D UE accessible via the replacement D2D relay, and information on configuration for D2D communication between the first D2D UE and the replacement D2D relay.

The D2D relay type may be UE-to-UE relay or UE-to-Network relay.

The receiving unit may be further arranged for: after the relay replacing indication is sent, receiving a relay replacing acknowledgement returned by the first D2D UE.

The storing unit 151 may be implemented by memory in the control node. The sending unit 152, the receiving unit, and the determining unit may be implemented by at least one of a CPU, an MCU, a DSP, an FPGA, a transceiver, etc., in the control node.

Figure 16:
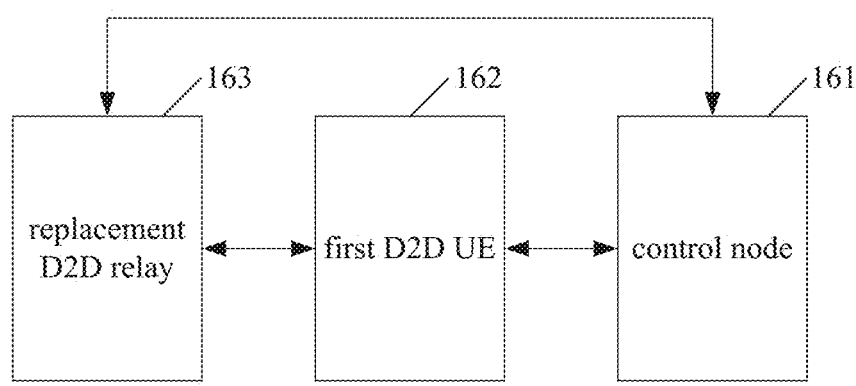
FIG. 16 is a diagram of a system for replacing a relay according to an embodiment 12 herein.

As shown in FIG. 16, a system for replacing a relay according to an embodiment herein includes a control node 161, first D2D UE 162, and a replacement D2D relay 163.

The control node 161 is arranged for sending, to the first D2D UE 162, a relay replacing indication.

The first D2D UE 162 is arranged for: receiving the relay replacing indication sent by the control node 161; and performing communication via the replacement D2D relay 163 according to the relay replacing indication.

The control node 161 may be a Base Station (BS), a D2D relay, a Proximity Service functional entity (ProSe function), a Proximity Service (ProSe) application server, a D2D relay managing Network Element (NE), etc.

The relay replacing indication may include information on at least one of: the ID of the first D2D UE 162; the ID of second D2D UE; the ID of the replacement D2D relay 163; configuration for D2D communication between the replacement D2D relay 163 and the first D2D UE 162 and/or the second D2D UE; a relay status indication; a relay suspending indication; a relay-connection releasing indication; and the IP address allocated by the replacement D2D relay 163 to the first D2D UE 162. The second D2D UE may be target D2D UE with which the first D2D UE 162 is to communicate.

The control node 161 may be further arranged for: before sending the relay replacing indication to the first D2D UE 162, determining, according to D2D-relay-related information, the replacement D2D relay; and/or determining that the first D2D UE is allowed to perform D2D communication relayed by the replacement D2D relay.

The control node 161 may be further arranged for: before determining the replacement D2D relay, receiving the D2D-relay-related information sent by the first D2D UE 162.

The D2D-relay-related information may be a result of D2D relay discovery or information measured for a D2D relay.

The D2D-relay-related information may include at least one of:

information on a D2D relay discovered by the first D2D UE 162; a result of measuring, by the first D2D UE 162, a received D2D relay discovery message; information on a geolocation of the first D2D UE 162; information on an ID of the first D2D UE 162; information on Quality of Service (QoS) required by a communication service of the first D2D UE 162; information on D2D security capability of the first D2D UE 162; information on a D2D-security-related parameter of the first D2D UE 162; information on an ID of a D2D communication group to which the first D2D UE 162 belongs; a D2D relay type requested by the first D2D UE 162; information on an ID of second D2D UE; information on a priority of the first D2D UE 162; information on a priority of the D2D communication group to which the first D2D UE 162 belongs; information on a priority of a D2D communication service of the first D2D UE 162.

The first D2D UE 162 may discover the information on the D2D relay according to a received D2D relay discovery message.

The control node 161 may be further arranged for: before receiving the D2D-relay-related information sent by the first D2D UE, sending, to the first D2D UE 162, information on relay discovery and/or measurement configuration for discovering, and/or performing measurement on, a candidate D2D relay.

The first D2D UE 162 may be further arranged for: determining the D2D-relay-related information according to the information on the relay discovery and/or measurement configuration.

The information on the relay discovery and/or measurement configuration may include at least one of:

information on a resource or a resource pool in a time domain and/or a frequency domain used by the candidate D2D relay for D2D discovery, and information on an identification (ID) of the candidate D2D relay.

The control node 161 may send, to the first D2D UE 162, the information on the relay discovery and/or measurement configuration via an interface-Uu system message, Radio Resource Control (RRC) dedicated signaling, a PC5 interface, etc.

The control node 161 may be further arranged for: before receiving the D2D-relay-related information sent by the first D2D UE, sending, to the first D2D UE, a relay-discovery trigger threshold. The relay-discovery trigger threshold may apply to measurement by the first D2D UE on the serving D2D relay being accessed by the first D2D UE.

The first D2D UE 162 may be further arranged for: in response to determining a measurement on the serving D2D relay that is lower than the relay-discovery trigger threshold, starting D2D relay discovery.

The control node 161 may be arranged for: determining that the first D2D UE is to perform D2D communication relayed by the replacement D2D relay by interacting with the replacement D2D relay.

The system may further include a central control node (not shown in FIG. 16).

The control node 161 may be arranged for: determining that the first D2D UE is to perform D2D communication relayed by the replacement D2D relay by interacting with the central control node and the replacement D2D relay.

A D2D relay may serve as the central control node, to acquire relay-related information related to a D2D relay near the central control node. The relay-related information related to a relay may include a relay type of the relay, a relay status of the relay, information on a geolocation of the relay, D2D UE connected to the relay, and information on a load of the relay. The central control node may acquire relay-related information related to a relay near the central control node by monitoring a relay discovery message or broadcast information. The central control node may acquire, from a relay, relay-related information related to the relay.

The control node may determine that the first D2D UE may perform D2D communication relayed by the replacement D2D relay by interacting with the replacement D2D relay as follows.

The control node 161 may send, to the replacement D2D relay, a relay access request.

The replacement D2D relay may return, to the control node 161, a relay access response indicating that the replacement D2D relay allows the first D2D UE to perform D2D communication relayed by the replacement D2D relay.

The relay access response may include an Internet Protocol (IP) address allocated by the replacement D2D relay to the first D2D UE.

The control node 161 may determine that the first D2D UE may perform D2D communication relayed by the replacement D2D relay by interacting with the central control node and the replacement D2D relay as follows.

The control node 161 may send, to the central control node, a relay access request.

The central control node may send, to the replacement D2D relay, a relay access request.

The replacement D2D relay 163 may determine that the replacement D2D relay allows the first D2D UE to perform D2D communication relayed by the replacement D2D relay. The replacement D2D relay may return, to the central control node, a relay access response.

The central control node may then forward, to the control node, the relay access response.

The relay access request may include information on at least one of:

the ID of the first D2D UE 162; the ID, or a list of IDs, of a second D2D UE; QoS required by a communication service of the first D2D UE 162; D2D security capability of the first D2D UE 162; a D2D-security-related parameter of the first D2D UE 162; the ID of a D2D communication group to which the first D2D UE 162 belongs; a D2D relay type requested by the first D2D UE 162; a priority of the first D2D UE 162; a priority of the D2D communication group to which the first D2D UE 162 belongs; a priority of a D2D communication service of the first D2D UE 162; configuration for D2D communication between the replacement D2D relay and the first D2D UE 162, etc.

The information on the configuration for D2D communication may include at least one of: information on configuration of a bearer of the D2D communication between the replacement D2D relay and the first D2D UE 162, and information on security related configuration.

The relay access response may include an Internet Protocol (IP) address allocated by the replacement D2D relay to the D2D UE.

The relay access response may include information on at least one of:

the ID of the first D2D UE 162, the ID, or a list of IDs, of target D2D UE accessible via the replacement D2D relay, configuration for D2D communication between the first D2D UE 162 and the replacement D2D relay, etc.

The D2D relay type may be UE-to-UE relay or UE-to-Network relay.

The D2D relay type may be UE-to-UE relay or UE-to-Network relay.

The first D2D UE 162 may be further arranged for, having received the relay replacing indication, returning, to the control node, a relay replacing acknowledgement.

The control node 161 may be further arranged for receiving the relay replacing acknowledgement.

The first D2D UE may be arranged for performing communication by accessing a cellular network via the replacement D2D relay.

The system may further include second D2D UE (not shown in FIG. 16).

The first D2D UE 162 may be arranged for performing D2D communication with the second D2D UE via the replacement D2D relay. The second D2D UE may be target D2D UE with which the first D2D UE is to communicate.

The first D2D UE 162 may be further arranged for: before performing D2D communication with the second D2D UE via the replacement D2D relay 163, sending, to the second D2D UE via the replacement D2D relay 163, information for relay update.

The second D2D UE may be further arranged for updating relay information maintained at the second D2D UE according to the information for relay update.

The control node 161 may be further arranged for sending, to the second D2D UE, information for relay update.

The second D2D UE may be arranged for updating relay information maintained at the second D2D UE according to the information for relay update.

The replacement D2D relay 163 may be further arranged for sending information for relay update to the second D2D UE.

The second D2D UE may be arranged for updating relay information maintained at the second D2D UE according to the information for relay update.

The information for relay update may include information on at least one of: the ID of the first D2D UE 162, the ID of the second D2D UE, the ID of the replacement D2D relay 163, configuration for D2D communication between the second D2D UE and the replacement D2D relay 163, etc.

The second D2D UE may be further arranged for, having received information for relay update, returning, to the replacement D2D relay 163, a relay update acknowledgement.

The relay update acknowledgement may include information on at least one of: the ID of the first D2D UE 162, the ID of the second D2D UE, the ID of the replacement D2D relay 163, etc.

The system may further include a serving D2D relay (not shown in FIG. 16) of the first D2D UE before the replacement. The serving D2D relay may be arranged for: in response to determining that the first D2D UE 162 performs communication via the replacement D2D relay 163, releasing a connection with the first D2D UE.

The serving D2D relay may release the connection with the first D2D UE 162 upon expiration of a timing period of a timer maintained at the serving D2D relay. The serving D2D relay may release the connection with the first D2D UE upon receiving information on a relay-connection releasing indication sent by the first D2D UE 132, The serving D2D relay may release the connection with the first D2D UE upon receiving information on a relay-connection releasing indication sent by the control node 161.

The serving D2D relay may start or restart the timer upon receiving D2D communication data sent by the first D2D UE 162 or upon sending D2D communication data to the first D2D UE 162.

The information on the relay-connection releasing indication may include information on at least one of:

a release indication, the ID of the first D2D UE, the ID of second D2D UE, a cause of release, etc.

The control node 161 may be further arranged for: before sending the information on the relay-connection releasing indication to the serving D2D relay, receiving a relay replacing acknowledgement sent by the first D2D UE 162, or receiving an indication of access by D2D UE (completed) sent by the replacement D2D relay 163.

With embodiments herein, a control node 161 sends, to first D2D UE 162, a relay replacing indication instructing to replace a serving D2D relay. The first D2D UE 162 receives the relay replacing indication sent by the control node 161. The first D2D UE 162 performs communication via a replacement D2D relay 163 according to the relay replacing indication. Accordingly, a serving relay for D2D UE in relayed transmission of D2D communication is replaced in time, allowing the D2D UE to access a proper replacement relay in time, ensuring smooth D2D communication.

Those skilled in the art will know that an embodiment herein may provide a method, system, or computer program product. Therefore, an embodiment herein may take on a form of hardware, software, or a combination thereof. In addition, an embodiment herein may take on a form of a computer program product implemented on one or more computer available storage media (including but not limited to, magnetic disk memory, optic memory, and the like) containing computer available program codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams.

What described are merely embodiments herein, and are not intended to limit the scope of the disclosure. Any equivalent structure or flow variation made using content of the specification and/or accompanying drawings of the present disclosure, or direct or indirect application in another related technical field, likewise falls within the scope of the present disclosure.

INDUSTRIAL APPLICABILITY

With the method for replacing a relay according to embodiments herein, first D2D UE receives a relay replacing indication sent by a control node. The relay replacing indication instructs to replace a serving D2D relay. The first D2D UE performs communication via a replacement D2D relay according to the relay replacing indication. A further method and system for replacing a relay, D2D UE and a control node are also disclosed herein,

The invention claimed is:

1. A method for replacing a relay, comprising:
receiving, by first Device-to-Device (D2D) User Equipment (UE), information on relay discovery and/or measurement configuration sent by a control node for discovering, and/or performing measurement on, a candidate D2D relay, wherein the information on the relay discovery and/or measurement configuration comprises information on a resource or a resource pool in a time domain and/or a frequency domain used by the candidate D2D relay for D2D discovery, and information on an identification (ID) of the candidate D2D relay;
determining, by the first D2D UE, D2D-relay-related information according to the information on the relay discovery and/or measurement configuration;
sending, by the first D2D UE to the control node, the D2D-relay-related information, such that the control node determines a replacement D2D relay according to the D2D-relay-related information;
receiving, by the first D2D UE, a relay replacing indication sent by the control node, the relay replacing indication instructing to replace a serving D2D relay; and
performing, by the first D2D UE, communication via the replacement D2D relay according to the relay replacing indication.

2. The method according to claim 1, wherein the performing, by the first D2D UE, communication via the replacement D2D relay comprises:
performing, by the first D2D UE, communication by accessing a cellular network via the replacement D2D relay; or
performing, by the first D2D UE, D2D communication with second D2D UE via the replacement D2D relay, the second D2D UE being target D2D UE with which the first D2D UE is to communicate.

3. The method according to claim 2, further comprising:
before the performing, by the first D2D UE, D2D communication with second D2D UE via the replacement D2D relay;
sending, by the first D2D UE to the second D2D UE via the replacement D2D relay, information for relay update, for updating, by the second D2D UE, relay information maintained at the second D2D UE,
wherein the information for relay update comprises at least one of:
information on an ID of the first D2D UE;
information on an ID of the second D2D UE;
information on an ID of the replacement D2D relay; and/or
information on configuration for D2D communication between the second D2D UE and the replacement D2D relay.

4. The method according to claim 3, further comprising:
receiving, by the first D2D UE via the replacement D2D relay, a relay update acknowledgement returned by the second D2D UE,
wherein the relay update acknowledgement comprises:
the information on the ID of the first D2D UE;
the information on the ID of the second D2D UE; and
the information on the ID of the replacement D2D relay.

5. The method according to claim 1, wherein the D2D-relay-related information comprises at least one of:
information on a D2D relay discovered by the first D2D UE;
a result of measuring, by the first D2D UE, a received D2D relay discovery message;
information on a geolocation of the first D2D UE;
information on an ID of the first D2D UE;
information on Quality of Service (QoS) required by a communication service of the first D2D UE;
information on D2D security capability of the first D2D UE;
information on a D2D-security-related parameter of the first D2D UE;
information on an ID of a D2D communication group to which the first D2D UE belongs;
a D2D relay type requested by the first D2D UE;
information on an ID of target D2D UE with which the first D2D UE is to communicate;
information on a priority of the first D2D UE;
information on a priority of the D2D communication group to which the first D2D UE belongs; and/or
information on a priority of a D2D communication service of the first D2D UE.

6. The method according to claim 1, further comprising:
before the sending, by the first D2D UE to the control node, the D2D-relay-related information;
receiving, by the first D2D UE, a relay-discovery trigger threshold sent by the control node, the relay-discovery trigger threshold applying to measurement by the first D2D UE on the serving D2D relay being accessed by the first D2D UE; and
in response to determining a measurement on the serving D2D relay that is lower than the relay-discovery trigger threshold, starting, by the first D2D UE, D2D relay discovery.

7. The method according to claim 1, further comprising:
after the receiving, by the first D2D UE, a relay replacing indication; and
returning, by the first D2D UE to the control node, a relay replacing acknowledgement.

8. A method for replacing a relay, comprising:
sending, by a control node to first Device-to-Device (D2D) User Equipment (UE), information on relay discovery and/or measurement configuration for discovering, and/or performing measurement on, a candidate D2D relay, wherein the information on the relay discovery and/or measurement configuration comprises information on a resource or a resource pool in a time domain and/or a frequency domain used by the candidate D2D relay for D2D discovery, and information on an identification (ID) of the candidate D2D relay, such that the first D2D UE determines D2D-relay-related information according to the information on the relay discovery and/or measurement configuration;

receiving, by the control node, the D2D-relay-related information sent by the first D2D UE; and sending, by the control node to the first D2D UE, a relay replacing indication instructing to replace a serving D2D relay, so that the first D2D UE performs communication via a replacement D2D relay according to the relay replacing indication.

9. The method according to claim 8, wherein the control node comprises at least one of:

a Base Station (BS), a D2D relay, a Proximity Service functional entity (ProSe function), a Proximity Service (ProSe) application server, and a D2D relay managing Network Element (NE), wherein the method further comprises:
before the sending, by the control node to the first D2D UE, a relay replacing indication;
determining, by the control node according to the D2D-relay-related information, the replacement D2D relay; and/or
determining, by the control node, that the first D2D UE is allowed to perform D2D communication relayed by the replacement D2D relay.

10. The method according to claim 9, wherein the D2D-relay-related information comprises at least one of:

information on a D2D relay discovered by the first D2D UE;
a result of measuring, by the first D2D UE, a received D2D relay discovery message;
information on a geolocation of the first D2D UE;
information on an ID of the first D2D UE;
information on Quality of Service (QoS) required by a communication service of the first D2D UE;
information on D2D security capability of the first D2D UE;
information on a D2D-security-related parameter of the first D2D UE;
information on an ID of a D2D communication group to which the first D2D UE belongs;
a D2D relay type requested by the first D2D UE;
information on an ID of target D2D UE with which the first D2D UE is to communicate;
information on a priority of the first D2D UE;
information on a priority of the D2D communication group to which the first D2D UE belongs; and/or
information on a priority of a D2D communication service of the first D2D UE,
wherein the sending, by the control node to the first D2D UE, the information on the relay discovery and/or measurement configuration comprises:
sending, by the control node to the first D2D UE, the information on the relay discovery and/or measurement configuration via an interface-Uu system message, Radio Resource Control (RRC) dedicated signaling, and/or a PC5 interface,
wherein the method further comprises:
before the receiving, by the control node, the D2D-relay-related information sent by the first D2D UE;
sending, by the control node to the first D2D UE, a relay-discovery trigger threshold applying to measurement by the first D2D UE on the serving D2D relay being accessed by the first D2D UE, such that the first D2D UE starts D2D relay discovery according to the relay-discovery trigger threshold,
wherein the determining, by the control node, that the first D2D UE is allowed to perform D2D communication relayed by the replacement D2D relay comprises:

determining, by the control node, that the first D2D UE is to perform D2D communication relayed by the replacement D2D relay, by interacting with the replacement D2D relay, or by interacting with a central control node and the replacement D2D relay, wherein the determining that the first D2D UE is to perform D2D communication relayed by the replacement D2D relay by interacting with the replacement D2D relay comprises:
sending, by the control node to the replacement D2D relay, a relay access request; and
receiving, by the control node, a relay access response returned by the replacement D2D relay indicating that the replacement D2D relay allows the first D2D UE to perform D2D communication relayed by the replacement D2D relay,
wherein the relay access response comprises an Internet Protocol (IP) address allocated by the replacement D2D relay to the first D2D UE,
wherein the determining, by the control node, that the first D2D UE is to perform D2D communication relayed by the replacement D2D relay by interacting with the central control node and the replacement D2D relay comprises:
sending, by the control node to the central control node, a relay access request; and
receiving, by the control node, a relay access response sent by the central control node,
wherein the replacement D2D relay receives a relay access request sent by the central control node, determines that the replacement D2D relay allows the first D2D UE to perform D2D communication relayed by the replacement D2D relay, and returns the relay access response to the central control node,
wherein the relay access response comprises an Internet Protocol (IP) address allocated by the replacement D2D relay to the first D2D UE,
wherein the relay access request comprises at least one of:
information on the ID of the first D2D UE;
information on an ID, or a list of IDs, of second D2D UE;
the information on the QoS required by the communication service of the first D2D UE;
the information on the D2D security capability of the first D2D UE;
the information on the D2D-security-related parameter of the first D2D UE;
the information on the ID of the D2D communication group to which the first D2D UE belongs;
the D2D relay type requested by the first D2D UE;
the information on the priority of the first D2D UE;
the information on the priority of the D2D communication group to which the first D2D UE belongs;
the information on the priority of the D2D communication service of the first D2D UE; and/or
information on configuration for D2D communication between the replacement D2D relay and the first D2D UE, the second D2D UE being the target D2D UE with which the first D2D UE is to communicate,
wherein the information on the configuration for D2D communication comprises at least one of:
information on configuration of a bearer of the D2D communication between the replacement D2D relay and the first D2D UE; and/or
information on security related configuration,
wherein the D2D relay type is UE-to-UE relay or UE-to-Network relay, and wherein the relay access response comprises at least one of:
the information on the ID of the first D2D UE;
the information on the ID of the second D2D UE accessible via the replacement D2D relay; and/or
the information on the configuration for D2D communication between the first D2D UE and the replacement D2D relay.

11. The method according to claim 9, further comprising:
sending, by the control node to second D2D UE, information for relay update, for updating, by the second D2D UE, relay information maintained at the second D2D UE, the second D2D UE being target D2D UE with which the first D2D UE is to communicate,
wherein the information for relay update comprises at least one of:
information on an identification (ID) of the first D2D UE;
information on an ID of the second D2D UE;
information on an ID of the replacement D2D relay; and/or
information on configuration for D2D communication between the second D2D UE and the replacement D2D relay.

12. A Device-to-Device (D2D) User Equipment (UE), comprising:
a processor; and
memory storing instructions executable by the processor,
wherein the processor is arranged for:
receiving information on relay discovery and/or measurement configuration sent by a control node for discovering, and/or performing measurement on, a candidate D2D relay, wherein the information on the relay discovery and/or measurement configuration comprises information on a resource or a resource pool in a time domain and/or a frequency domain used by the candidate D2D relay for D2D discovery, and information on an identification (ID) of the candidate D2D relay;
determining D2D-relay-related information according to the information on the relay discovery and/or measurement configuration;
sending, to the control node, the D2D-relay-related information, such that the control node determines a replacement D2D relay according to the D2D-relay-related information;
receiving a relay replacing indication sent by the control node instructing to replace a serving D2D relay; and
performing communication via the replacement D2D relay according to the relay replacing indication.

13. A control node, comprising:
a processor; and
memory storing instructions executable by the processor,
wherein the memory is arranged for storing a relay replacing indication, and
wherein the processor is arranged for:
sending, to first Device-to-Device (D2D) User Equipment (UE), information on relay discovery and/or measurement configuration for discovering, and/or performing measurement on, a candidate D2D relay, wherein the information on the relay discovery and/or measurement configuration comprises information on a resource or a resource pool in a time domain and/or a frequency domain used by the candidate D2D relay for D2D discovery, and information on an identification (ID) of the candidate D2D relay, such that the first D2D UE determines D2D-relay-related information according to the information on the relay discovery and/or measurement configuration;
receiving the D2D-relay-related information sent by the first D2D UE; and
sending, to the first D2D UE, the relay replacing indication instructing to replace a serving D2D relay, so that the first D2D UE performs communication via a replacement D2D relay according to the relay replacing indication.

14. A system for replacing a relay, comprising the control node according to claim 13, the first D2D UE, and the replacement D2D relay,
wherein the first D2D UE is arranged for:
receiving the information on relay discovery and/or measurement configuration sent by the control node for discovering, and/or performing measurement on, the candidate D2D relay;
determining the D2D-relay-related information according to the information on the relay discovery and/or measurement configuration;
sending, to the control node, the D2D-relay-related information; and
receiving the relay replacing indication sent by the control node; and performing communication via the replacement D2D relay according to the relay replacing indication.

15. The system according to claim 14, wherein the control node is further arranged for:
before sending the relay replacing indication to the first D2D UE;
determining, according to D2D-relay-related information, the replacement D2D relay; and/or
determining that the first D2D UE is allowed to perform D2D communication relayed by the replacement D2D relay,
wherein the control node is further arranged for:
before receiving the D2D-relay-related information sent by the first D2D UE, sending, to the first D2D UE, a relay-discovery trigger threshold applying to measurement by the first D2D UE on the serving D2D relay being accessed by the first D2D UE,
wherein the first D2D UE is further arranged for:
in response to determining a measurement on the serving D2D relay that is lower than the relay-discovery trigger threshold, starting D2D relay discovery,
wherein the control node is arranged for:
determining that the first D2D UE is to perform D2D communication relayed by the replacement D2D relay by interacting with the replacement D2D relay; alternatively,
wherein the system further comprises a central control node,
wherein the control node is arranged for:
determining that the first D2D UE is to perform D2D communication relayed by the replacement D2D relay by interacting with the central control node and the replacement D2D relay,
wherein the central control node is a D2D relay, and is arranged for acquiring information related to a D2D relay near the central control node,
wherein the central control node is arranged for:
acquiring information related to a relay near the central control node by monitoring a relay discovery message or broadcast information, or acquiring, from a relay, information related to the relay, wherein the first D2D UE is further arranged for:
before performing D2D communication with second D2D UE via the replacement D2D relay, sending, to the second D2D UE via the replacement D2D relay, information for relay update,
wherein the system further comprises the second D2D UE, the second D2D UE being target D2D UE with which the first D2D UE is to communicate,
wherein the control node is further arranged for sending, to the second D2D UE, information for relay update, and/or
wherein the replacement D2D relay is further arranged for sending information for relay update to the second D2D UE,
wherein the second D2D UE is arranged for updating relay information maintained at the second D2D UE according to the information for relay update,
wherein the second D2D UE is further arranged for, having received information for relay update, returning, to the replacement D2D relay, a relay update acknowledgement.

16. The system according to claim 14, wherein the first D2D UE is further arranged for, having received the relay replacing indication, returning, to the control node, a relay replacing acknowledgement, and
wherein the control node is further arranged for receiving the relay replacing acknowledgement.

17. The system according to claim 14, wherein the first D2D UE is arranged for performing communication by accessing a cellular network via the replacement D2D relay; alternatively,
wherein the system further comprises second D2D UE, and
wherein the first D2D UE is arranged for performing D2D communication with the second D2D UE via the replacement D2D relay, the second D2D UE being target D2D UE with which the first D2D UE is to communicate.

18. The system according to claim 14, further comprising the serving D2D relay arranged for:
in response to determining that the first D2D UE performs communication via the replacement D2D relay, releasing a connection with the first D2D UE.

19. The system according to claim 18, wherein the serving D2D relay is arranged for releasing the connection with the first D2D UE upon expiration of a timing period of a timer maintained at the serving D2D relay, or upon receiving information on a relay-connection releasing indication sent by the first D2D UE or the control node,
wherein the serving D2D relay is further arranged for starting or restarting the timer upon receiving D2D communication data sent by the first D2D UE or upon sending D2D communication data to the first D2D UE,
wherein the information on the relay-connection releasing indication comprises at least one of: a release indication, information on an ID of the first D2D UE, information on an ID of second D2D UE, and a cause of release, the second D2D UE being target D2D UE with which the first D2D UE is to communicate, and
wherein the control node is further arranged for: before sending the information on the relay-connection releasing indication to the serving D2D relay, receiving a relay replacing acknowledgement sent by the first D2D UE, or receiving an indication of access by the first D2D UE sent by the replacement D2D relay.

20. A non-transitory computer-readable storage medium having stored therein instructions that when executed by a processor, cause the processor to perform at least one of:
a method for replacing a relay, comprising:
receiving, by first Device-to-Device (D2D) User Equipment (UE), information on relay discovery and/or measurement configuration sent by a control node for discovering, and/or performing measurement on, a candidate D2D relay, wherein the information on the relay discovery and/or measurement configuration comprises information on a resource or a resource pool in a time domain and/or a frequency domain used by the candidate D2D relay for D2D discovery, and information on an identification (ID) of the candidate D2D relay;
determining, by the first D2D UE, D2D-relay-related information according to the information on the relay discovery and/or measurement configuration;
sending, by the first D2D UE to the control node, the D2D-relay-related information, such that the control node determines a replacement D2D relay according to the D2D-relay-related information;
receiving, by the first D2D UE, a relay replacing indication sent by the control node, the relay replacing indication instructing to replace a serving D2D relay; and
performing, by the first D2D UE, communication via the replacement D2D relay according to the relay replacing indication; or
a method for replacing a relay, comprising:
sending, by the control node to the first D2D UE, the information on relay discovery and/or measurement configuration for discovering, and/or performing measurement on, the candidate D2D relay;
receiving, by the control node, the D2D-relay-related information sent by the first D2D UE;
determining, by the control node, the replacement D2D relay according to the D2D-relay-related information; and
sending, by the control node to the first D2D UE, the relay replacing indication, so that the first D2D UE performs communication via the replacement D2D relay according to the relay replacing indication.

* * * * *